(12) United States Patent
Morii et al.

(10) Patent No.: US 7,910,186 B2
(45) Date of Patent: Mar. 22, 2011

(54) MULTILAYERED VOLUME HOLOGRAM STRUCTURE AND LABEL FOR MAKING MULTILAYERED VOLUME HOLOGRAM STRUCTURE

(75) Inventors: Akio Morii, Tokyo (JP); Satoru Hamada, Tokyo (JP); Hiroyuki Ohtaki, Tokyo (JP); Kenji Ueda, Tokyo (JP); Shingo Nishikawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 593 days.

(21) Appl. No.: 10/279,761

(22) Filed: Oct. 24, 2002

(65) Prior Publication Data

US 2003/0134072 A1 Jul. 17, 2003

Related U.S. Application Data

(62) Division of application No. 09/489,061, filed on Jan. 21, 2000, now Pat. No. 6,506,468, and a division of application No. 09/077,060, filed as application No. PCT/JP97/03242 on Sep. 12, 1997, now Pat. No. 6,066,378.

(30) Foreign Application Priority Data

| Sep. 19, 1996 | (JP) | 8-248022 |
| Sep. 24, 1996 | (JP) | 8-251986 |
| Sep. 24, 1996 | (JP) | 8-251987 |
| Sep. 24, 1996 | (JP) | 8-251988 |
| Sep. 24, 1996 | (JP) | 8-252107 |
| Oct. 25, 1996 | (JP) | 8-283709 |
| Oct. 29, 1996 | (JP) | 8-286752 |
| Nov. 26, 1996 | (JP) | 8-314613 |

(51) Int. Cl.
*B32B 9/00* (2006.01)
*B32B 33/00* (2006.01)
*B32B 7/14* (2006.01)
*B32B 7/06* (2006.01)
*G03H 1/00* (2006.01)

(52) U.S. Cl. ............. 428/40.1; 428/42.1; 428/42.2; 428/42.3; 428/201; 428/202; 428/203; 428/915; 359/1

(58) Field of Classification Search .......... 428/40.1, 428/42.1, 42.2, 42.3, 201, 202, 203, 915; 359/1; 286/86

See application file for complete search history.

(56) References Cited

U.S. PATENT DOCUMENTS

| 5,656,360 | A * | 8/1997 | Faykish et al. | 428/195.1 |
| 5,858,150 | A * | 1/1999 | Yarusso et al. | 156/163 |
| 6,066,378 | A * | 5/2000 | Morii et al. | 428/40.2 |
| 6,506,468 | B1 * | 1/2003 | Morii et al. | 428/40.2 |
| 6,887,546 | B2 * | 5/2005 | Morii et al. | 428/40.1 |

FOREIGN PATENT DOCUMENTS

JP 08305262 A * 11/1996

* cited by examiner

*Primary Examiner* — Victor S Chang
(74) *Attorney, Agent, or Firm* — patenttm.us

(57) ABSTRACT

A multilayered volume hologram structure of the invention comprises a substrate 2 for a certificate or the like, and an adhesive layer 5, a volume hologram layer 5 and a surface protective film 7 laminated on the substrate in the described order. When a multilayer structure consisting of the volume hologram layer 5 and surface protective layer 5 is forcibly released from the substrate for the purpose of making a photograph replacement or falsifying a personal information area, the volume hologram image can break down certainly, thereby ensuring prevention of falsification. A multilayered volume hologram structure-making label is useful for making a multilayered volume hologram structure.

2 Claims, 17 Drawing Sheets

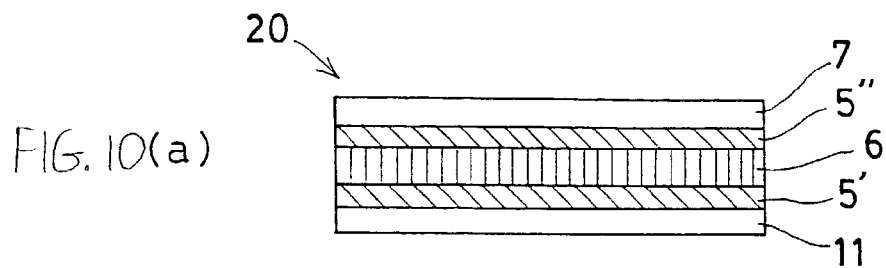
FIG. 10(a)
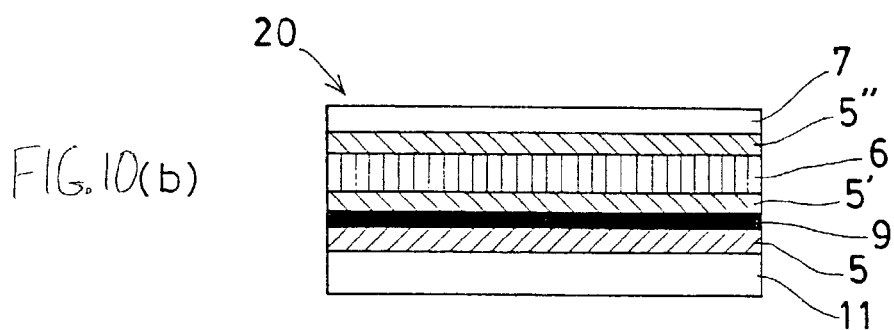
FIG. 10(b)
FIG. 11
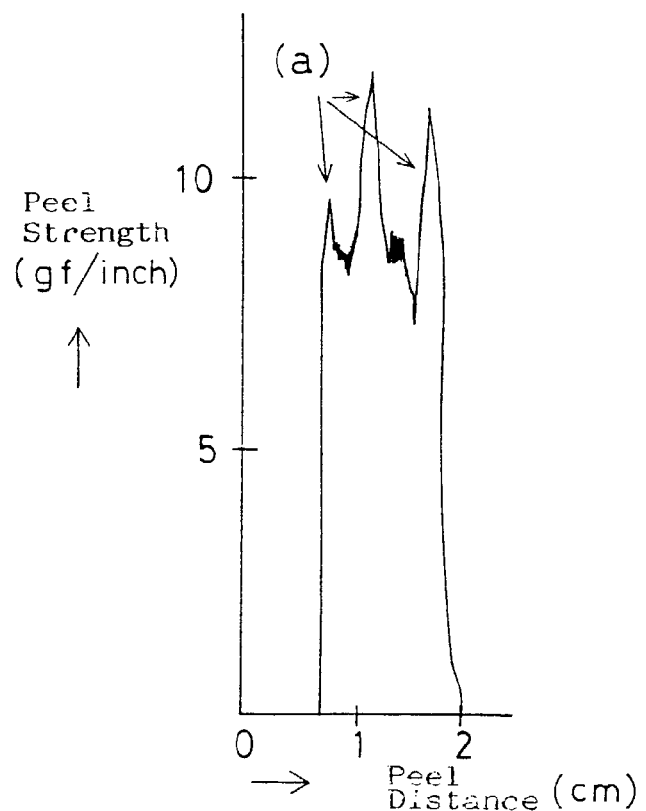

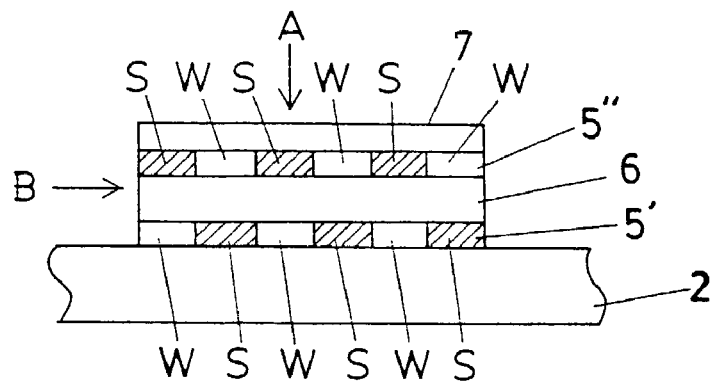
FIG. 17(a)
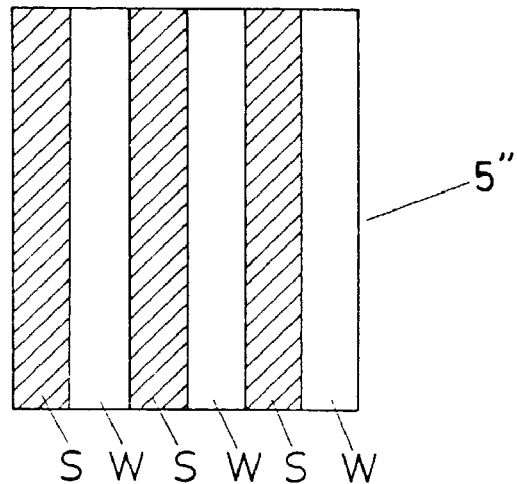
FIG. 17(b)
FIG. 18
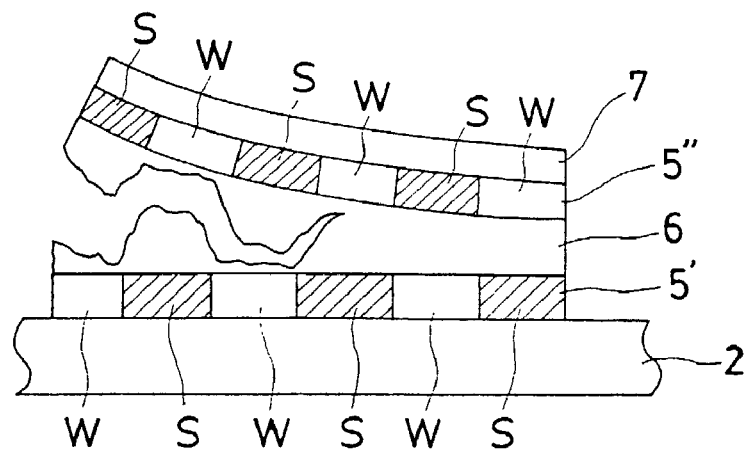

MULTILAYERED VOLUME HOLOGRAM STRUCTURE AND LABEL FOR MAKING MULTILAYERED VOLUME HOLOGRAM STRUCTURE

This is a divisional of copending application Ser. No. 09/489,061 filed Jan. 21, 2000, which is a divisional of Ser. No. 09/077,060 filed on Mar. 15, 1999, now U.S. Pat. No. 6,066,378 issued May 23, 2000; International Application PCT/JP97/03242 filed on Sep. 12, 1997, and which designated the U.S.

TECHNICAL FIELD

The present invention relates generally to a multilayered volume hologram structure comprising a transparent image bearing hologram, which is pasted on a surface of a photograph or personal information area attached to ID cards, exam cards, passports, etc. for the purpose of ensuring security and a label for making such a multilayered volume hologram structure, and more particularly to a multilayered volume hologram structure which cannot possibly be fraudulently altered or otherwise falsified, and a label for making such a multilayered volume hologram structure.

In recent years, means for preventing fraudulent alternation or falsification of identity cards, etc. have been strongly demanded, for instance, so as to certainly identify who carries an ID card as who is characterized by identifying data born thereon. Such falsification preventive techniques, for instance, are disclosed in JM-B 5-48215 and JP-A 5-201181 wherein an image bearing hologram is used. The image of the image bearing hologram has the same function as an engraving or the like on a conventional ID card or the like.

Especially according to the means disclosed in the latter publication, when the protective film is stripped off for the purpose of falsification or the like, the hologram layer fractures due to its softness to make it impossible to reconstruct the hologram image, thereby preventing falsification as by making a photograph replacement. When a rigid plastic film is used as the surface protective film, however, the hologram layer is often perfectly stripped off following the surface protective film. In this case, there is no sign of a photograph replacement or falsification of information. It is thus strongly demanded to improve this prior art means in such a way that the function of preventing falsification is much more improved for the purpose of ensuring security.

DISCLOSURE OF THE INVENTION

According to a first aspect of the invention, there is provided a multilayered volume hologram structure comprising a substrate for a certificate or the like, and a first adhesive layer, a volume hologram layer and a surface protective film laminated on said substrate in the described order, characterized in that a peel strength, with which a multilayer structure consisting of said volume hologram layer and said surface protective film is peeled from said substrate, is greater than a breaking strength or a tensile strength at 1% elongation of said multilayer structure consisting of said volume hologram layer and said surface protective film.

The multilayered volume hologram structure according to the first aspect of the invention is further characterized in that the peel strength, with which said multilayer structure consisting of said volume hologram layer and said surface protective film is peeled from said substrate (e.g., a photograph), is 0.1 Kg/25 mm to 5.0 Kg/25 mm, and a multilayer structure comprising said first adhesive layer, said volume hologram layer and said surface protective film laminated on said substrate in the described order has a breaking strength or a tensile strength at 1% elongation of 0.01 Kg/mm$^2$ to 5.0 Kg/mm$^2$.

The multilayered volume hologram structure according to the first aspect of the invention is further characterized in that another adhesive layer is interleaved between said volume hologram layer and said surface protective film.

The multilayered volume hologram structure according to the first aspect of the invention is further characterized in that said surface protective film is subjected to a hard coat treatment on a surface thereof.

The multilayered volume hologram structure according to the first aspect of the invention is further characterized in that said surface protective film is subjected to a release treatment on a surface thereof.

The present invention also provides a label for making the multilayered volume hologram structure according to the first aspect of the invention, characterized by comprising a release paper and a first adhesive layer, a volume hologram layer and a surface protective film laminated on said release paper in the described order, said label being pasted on a substrate for a certificate or the like upon removal of said release paper.

The label for making the multilayered volume hologram structure according to the first aspect of the invention is further characterized in that a peel strength, with which a multilayer structure consisting of said volume hologram layer and said surface protective film is peeled from said substrate, is 0.1 Kg/25 mm to 5.0 Kg/25 mm, and a multilayer structure comprising said first adhesive layer, said volume hologram layer and said surface protective film laminated in the described order has a breaking strength or a tensile strength at 1% elongation of 0.01 Kg/mm$^2$ to 5.0 Kg/mm$^2$.

The label for making the multilayered volume hologram structure according to the first aspect of the invention is further characterized in that said volume hologram layer and said surface protective film are laminated together with said first adhesive layer interleaved therebetween.

The volume hologram structure according to the first aspect of the invention ensures prevention of falsification because, immediately upon making a photograph replacement or falsification of the information area, the volume hologram image breaks down certainly. With the label for making the multilayered volume hologram structure according to the first aspect of the invention, it is easy to make the multilayered volume hologram structure according to the first aspect of the invention.

According to a second aspect of the invention, there is provided a multilayered volume hologram structure comprising a substrate, and a first adhesive layer, a volume hologram layer, a second adhesive layer and a surface protective film laminated on said substrate in the described order, characterized in that said second adhesive layer is weaker in adhesion than said first adhesive layer, and when said surface protective film is released from said multilayered volume hologram structure in a given releasing direction, a releasing line is produced in a direction at right angles with respect to said releasing direction.

According to the second aspect of the invention, there is also provided a multilayered volume hologram structure comprising a substrate, and a third adhesive layer, a colored sheet, a first adhesive layer, a volume hologram layer, a second adhesive layer and a surface protective film laminated on said substrate in the described order, characterized in that said second adhesive layer is weaker in adhesion than said first adhesive layer and said third adhesive layer, and when said surface protective film is released from said multilayered volume hologram structure in a given releasing direction, a releasing line is produced in a direction at right angles with respect to said release direction.

The second multilayered volume hologram structure of the invention is also characterized in that a peel strength, with which said surface protective film is released from said multilayered volume hologram structure, is 0.001 Kg/25 mm to 0.1 Kg/25 mm, and a peel strength between said substrate and said volume hologram layer is 0.1 Kg/25 mm to 5.0 Kg/25 mm.

The second multilayered volume hologram structure of the invention is further characterized in that said volume hologram layer is made up of a photosensitive material used for recording a dry type of volume phase hologram, which comprises a matrix polymer, a photopolymerizable compound, a photopolymerization initiator and a sensitizing dye.

One label for making the second multilayered volume hologram structure of the invention is a multilayered volume hologram structure comprising a release paper, and a first adhesive layer, a volume hologram layer, a second adhesive layer and a surface protective film laminated on said release paper in the described order, characterized in that said second adhesive layer is weaker in adhesion than said first adhesive layer, and when said surface protective film is released from said multilayered volume hologram structure in a given releasing direction, a releasing line is produced in a direction at right angles with respect to said releasing direction.

Another label for making the second multilayered volume hologram structure of the invention is a multilayered volume hologram structure comprising a release paper, and a third adhesive layer, a colored sheet, a first adhesive layer, a volume hologram layer, a second adhesive layer and a surface protective film laminated on said substrate in the described order, characterized in that said second adhesive layer is weaker in adhesion than said first adhesive layer and said third adhesive layer, and when said surface protective film is released from said multilayered volume hologram structure in a given releasing diretion, a releasing line is produced in a direction at right angles with respect to said releasing direction.

When the surface protective film is released from the second multilayered volume hologram structure of the invention, releasing layers are produced. When the recorded hologram is copied, the copy can be distinguished from the original hologram because the releasing layers are copied at the same time. Even when a hologram with the releasing lines formed thereon is pasted on another substrate for forging purposes, the hologram can be distinguished from the original hologram because of the presence of the releasing lines. Thus, prevention of falsification can be ensured. With the label for making the second multilayered volume hologram structure of the invention, the second multilayered volume hologram structure of the invention can be easily prepared.

According to a third aspect of the invention, there is provided one multilayered volume hologram structure comprising a substrate for a certificate or the like, and a heat sealing layer, a volume hologram layer, an adhesive layer and a surface protective film laminated on said substrate, characterized in that the whole surface of said multilayered volume hologram structure is heat-sealed.

According to the third aspect of the invention, there is provided another multilayered volume hologram structure comprising a certificate for a certificate or the like, and an adhesive layer, a volume hologram layer, a heat sealing layer and a surface protective layer laminated on said substrate, characterized in that said volume hologram layer and an end portion thereof are coated with said surface protective film, said volume hologram layer is laminated on said substrate, and only the overall peripheral end of said multilayered volume hologram structure including the overall peripheral end of said volume hologram layer is heat-sealed.

The third multilayered volume hologram structure of the invention is characterized in that heat sealing has been done at 100° C. to 180° C.

One label for making the third multilayered volume hologram structure of the invention is characterized by comprising a release paper, and a heat sealing layer, a volume hologram layer, an adhesive layer and a surface protective layer laminated on said release paper in the described order.

Another label for making the third multilayered volume hologram structure of the invention is characterized by comprising a release paper, and an adhesive layer, a volume hologram layer, a heat sealing layer and a surface protective film laminated on said release paper in the described order, a size of said surface protective film being such that, upon said label laminated on a substrate for a certificate or the like, said surface protective film covers said volume hologram layer including a whole periphery of an end thereof.

When the third multilayered volume hologram structure of the invention is forcibly delaminated, the volume hologram display layer breaks down certainly, thereby ensuring prevention of falsification as by making a photograph replacement. With the label for making the third multilayered volume hologram layer of the invention, the third multilayered volume hologram structure can be easily prepared.

A fourth multilayered volume hologram structure of the invention is characterized by comprising a substrate and a hologram layer pasted on said substrate, said hologram layer being provided with a surface protective film on a surface thereof, and further including a second adhesive layer for bonding together said surface protective film and said hologram layer and a first adhesive layer for bonding together said hologram layer and said substrate, either one of said adhesive layers having an adhesion force profile in its own plane.

A label for making the fourth multilayered volume hologram structure of the invention is a label used for making the fourth multilayered volume hologram structure of the invention characterized by comprising a release paper, and a first adhesive layer, a volume hologram layer, a second adhesive layer and a surface protective film laminated on said release paper in the described order, said label being pasted on a substrate for a certificate or the like upon removal of said release paper therefrom, and either one of said first adhesive layer and said second adhesive layer having an adhesive force profile in its own plane.

When the fourth multilayered volume hologram structure of the invention is forcibly delaminated, the volume hologram display layer breaks down certainly, thereby ensuring prevention of falsification as by making a photograph replacement. With the label for making the fourth multilayered volume hologram layer of the invention, the fourth multilayered volume hologram structure can be easily prepared.

One embodiment of a fifth multilayered volume hologram structure of the invention comprises a substrate, and a first adhesive layer, a volume hologram layer, a second adhesive layer and a surface protective film laminated on said substrate in the described order, and is characterized in that microcapsules, each encapsulated with a material capable of breaking said hologram layer, are incorporated in said adhesive layers, so that said microcapsules can break down upon delamination of said multilayered volume hologram structure.

Another embodiment of the fifth multilayered volume hologram structure of the invention comprises a substrate, and a third adhesive layer, a coloring sheet, a first adhesive layer, a volume hologram, a second adhesive layer and a surface protective film laminated on said substrate in the described order, and is characterized in that microcapsules, each encapsulated with a material capable of breaking said volume hologram layer, are incorporated in said first and second adhesive layers disposed adjacent to said hologram layer, so that said microcapsules can break down upon delamination of said multilayered volume hologram structure.

The fifth multilayered volume hologram structure of the invention is also characterized in that a material forming said volume hologram layer comprises a matrix polymer, a photopolymerizable compound, a photopolymerization initiator and a sensitizing dye, and said material capable of breaking said volume hologram layer comprises an organic solvent having a solubilizing action on said volume hologram layer forming material and/or a plasticizer having a swelling action on said volume hologram layer forming material.

One embodiment of a label for making the fifth multilayered volume hologram structure of the invention is a label used for making the first embodiment of the aforesaid fifth multilayered volume hologram structure. This label comprises a release paper, and a first adhesive layer, a volume hologram layer, a second adhesive layer and a surface protective film laminated on said release paper in the described order, and is characterized in that microcapsules, each encapsulated with a material capable of breaking said volume hologram layer, are incorporated in said adhesive layers, so that said microcapsules can break down upon delamination of said multilayered volume hologram structure.

Another embodiment of the label for making the fifth multilayered volume hologram structure of the invention is a label for making the second embodiment of the fifth multilayered volume hologram structure. This label comprises a release paper, and a third adhesive layer, a coloring sheet, a first adhesive layer, a volume hologram, a second adhesive layer and a surface protective film laminated on said release paper in the described order, and is characterized in that microcapsules, each encapsulated with a material capable of breaking said volume hologram layer, are incorporated in said adhesive layers disposed adjacent to said volume hologram layer, so that said microcapsules can break down upon delamination of said multilayered volume hologram structure.

The label for making the aforesaid fifth multilayered volume hologram structure is characterized in that a material forming said volume hologram layer comprises a matrix polymer, a photopolymerizable compound, a photopolymerization initiator and a sensitizing dye, and said material capable of breaking said volume hologram layer comprises an organic solvent having a solubilizing action on said volume hologram layer forming material and/or a plasticizer having a swelling action on said volume hologram layer forming material.

When, upon a release from the adhesive layers, the fifth multilayered volume hologram structure of the invention is re-laminated thereon, the volume hologram layer breaks down on contact with the volume hologram layer breaking material coming out of the microcapsules upon a breakdown. As a result, even when the photograph pasted on the multilayered volume hologram structure is replaced by another photograph, such a photograph replacement can be detected by identifying the presence of the broken hologram. It is thus possible to make sure of prevention of falsification. With the label for making the fifth multilayered volume hologram structure, the fifth multilayered volume hologram structure can be easily prepared.

One embodiment of a sixth multilayered volume hologram structure of the invention is characterized by comprising a substrate for a certificate or the like, and an adhesive layer, a volume hologram layer containing fine particles having an average primary particle size of 1 nm to 100 nm and used in an amount of 10 parts by weight to 100 parts by weight per 100 parts by weight of a photosensitive material, and a surface protective film laminated on said substrate in the described order.

This structure is also characterized in that said fine particles are each a fluorescent fine particle emitting fluorescence upon irradiation with ultraviolet radiation.

Another embodiment of the sixth multilayered volume hologram structure of the invention is characterized by comprising a substrate for a certificate or the like, and an adhesive layer, a volume hologram layer containing plastic particles or glass beads having a refractive index substantially equal to that of a photosensitive material and used in an amount of 10 parts by weight to 100 parts by weight per 100 parts by weight of said photosensitive material, and a surface protective film laminated on said substrate in the described order.

The aforesaid sixth multilayered volume hologram structure is also characterized in that said volume hologram layer and said surface protective film are laminated together with an additional adhesive layer interleaved therebetween.

One embodiment of a label for making the sixth multilayered volume hologram structure is characterized by comprising a release paper, and an adhesive layer, a volume hologram layer containing fine particles having an average primary particle size of 1 nm to 100 nm and used in an amount of 10 parts by weight to 100 parts by weight per 100 parts by weight of a photosensitive material, and a surface protective film laminated on said release paper in the described order.

This label is also characterized in that said fine particles are each a fluorescent fine particles emitting fluorescence upon irradiation with ultraviolet radiation.

Another embodiment of the label for making the sixth multilayered volume hologram structure of the invention is characterized by comprising a release paper, and an adhesive layer, a volume hologram layer containing plastic particles or glass beads having a refractive index substantially equal to that of a photosensitive material and used in an amount of 10 parts by weight to 100 parts by weight per 100 parts by weight of said photosensitive material, and a surface protective film laminated on said substrate in the described order.

This label is also characterized in that said volume hologram layer and said surface protective film are laminated together with an additional adhesive layer interleaved therebetween.

When the sixth multilayered volume hologram structure of the invention is forcibly delaminated, the volume hologram layer breaks sown. It is thus possible to make sure of prevention of falsification as by making a photograph replacement. With the label for making the sixth multilayered volume hologram structure, the sixth multilayered volume hologram structure can be easily prepared.

One embodiment of a seventh multilayered volume hologram structure of the invention is characterized by comprising a substrate for a certificate or the like, and an adhesive layer, a volume hologram layer, a resin layer containing a monomer or a plasticizer and a surface protective film laminated on said substrate in the described order.

This multilayered volume hologram structure is also characterized in that said resin layer containing a monomer or a plasticizer and said surface protective film are laminated together with an additional adhesive layer interleaved therebetween.

Another embodiment of the seventh multilayered volume hologram structure of the invention is characterized by comprising a substrate for a certificate or the like, and an adhesive layer, a volume hologram layer, a brittle layer, an adhesive layer and a surface protective film laminated on said substrate in the described order.

One embodiment of a label for making the seventh multilayered volume hologram structure of the invention is characterized by comprising a release paper, and an adhesive layer, a volume hologram layer, a resin layer containing a monomer or a plasticizer and a surface protective film laminated on said release paper in the described order.

This multilayered volume hologram structure is also characterized in that said monomer or plasticizer-containing resin layer and said surface protective film are laminated together with an additional adhesive layer interleaved therebetween.

Another embodiment of the label for making the seventh multilayered volume hologram structure of the invention is characterized by comprising a release paper, and an adhesive layer, a volume hologram layer, a brittle layer, an adhesive layer and a surface protective film laminated on said release paper in the described order.

When the seventh multilayered volume hologram structure of the invention is forcibly delaminated, the volume hologram layer remains on the substrate such as a photograph. It is thus possible to make use of the brittleness of the hologram layer to ensure prevention of falsification as by making a photograph replacement. With the label for making the seventh multilayered volume hologram structure, the seventh multilayered volume hologram structure can be easily prepared.

One embodiment of an eighth multilayered volume hologram structure of the invention is characterized by comprising a substrate for a certificate or the like, and a first adhesive layer, a volume hologram layer and a surface protective film laminated on said substrate in the described order, and further including between said volume hologram layer and said surface protective film a patterned area for varying relative adhesion between said volume hologram layer and said surface protective film in a site-dependent manner, so that upon an intentional release of a multilayer structure from said substrate, said volume hologram layer is broken or elongated while said volume hologram layer is separated into a portion adhering to said substrate and a portion adhering to said surface protective film.

This multilayered volume hologram structure is also characterized in that upon irradiation with ultraviolet radiation or heating, one of said volume hologram layer or said surface protective film shows adhesion to the other or the relative adhesion between said volume hologram layer and said surface protective film decreases.

Another embodiment of the eighth multilayered volume hologram structure of the invention is characterized by comprising a substrate for a certificate or the like, and a first adhesive layer, a volume hologram layer, a second adhesive layer and a surface protective film laminated on said substrate in the described order, and further including between said second adhesive layer and said surface protective film a patterned area for varying mutual adhesion between said second adhesive layer and said surface protective film in a site-dependent manner, so that upon an intentional release of an multilayer structure from said substrate, said volume hologram layer is broken or elongated while said volume hologram layer is separated into a portion adhering to said substrate and a portion adhering to said surface protective film.

This multilayered volume hologram structure is also characterized in that said patterned area for varying said adhesion in a site-dependent manner is a pattern of release agent layer.

Further, this multilayered volume hologram structure is characterized in that said patterned area for varying said adhesion in a site-dependent manner is an adhesion-enhancing pattern of primer layer.

Furthermore, this multilayered volume hologram structure is characterized in that said patterned area for varying said adhesion in a site-dependent manner is obtained by treating a surface of said surface protective film to be laminated in such a way that said surface is easily bondable.

Yet another embodiment of the eighth multilayered volume hologram structure of the invention is characterized by comprising a substrate for a certificate or the like, and a first adhesive layer, a volume hologram layer, a second adhesive layer and a surface protective film laminated on said substrate in the described order, and further including between said first adhesive layer and said volume hologram layer a patterned area for varying relative adhesion between said first adhesive layer and said volume hologram layer in a site-dependent manner, so that upon an intentional release of a multilayer structure from said substrate, said volume hologram layer is broken or elongated while said volume hologram layer is separated into a portion adhering to said substrate and a portion adhering to said surface protective film.

One embodiment of a label for making the eighth multilayered volume hologram structure of the invention is a label used for making the aforesaid eighth multilayered volume hologram structure. The aforesaid label is characterized by comprising a release paper, and a first adhesive layer, a volume hologram layer and a surface protective film laminated on said substrate in the described order, and further including between said volume hologram layer and said surface protective film a patterned area for varying relative adhesion between said volume hologram layer and said surface protective film in a site-dependent manner. This label is pasted on a substrate for a certificate or the like upon a release of said release paper therefrom.

Another embodiment of the label for the eighth multilayered volume hologram structure of the invention is a label used for making the second embodiment of the eighth multilayered volume hologram structure. The aforesaid label is characterized by comprising a release paper, and a first adhesive layer, a volume hologram layer, a second adhesive layer and a surface protective film laminated on said substrate in the described order, and further including between said second adhesive layer and said surface protective film a patterned area for varying relative adhesion between said second adhesive layer and said surface protective film in a site-dependent manner. This label is pasted on a substrate for a certificate or the like upon a release of said release paper therefrom.

Yet another embodiment of the label for the eighth multilayered volume hologram structure of the invention is a label used for making the third embodiment of the eighth multilayered volume hologram structure. The aforesaid label is characterized by comprising a release paper, and a first adhesive layer, a volume hologram layer, a second adhesive layer and a surface protective film laminated on said substrate in the described order, and further including between said first adhesive layer and said volume hologram layer a patterned area for varying relative adhesion between said second adhesive layer and said volume hologram layer in a site-dependent manner. This label is pasted on a substrate for a certificate or the like upon a release of said release paper therefrom.

With the eighth multilayered volume hologram layer according to the invention, the volume hologram layer can break down certainly upon an intentional photograph replacement or falsification of an personal information area. It is thus possible to make sure of prevention of falsification. With the label for making the eighth multilayered volume hologram structure, the eighth multilayered volume hologram structure can be easily prepared.

BRIEF DESCRIPTION OF THE DRAWINGS

FIGS. 10(a) and 10(b) are sectional schematics illustrative of the label for making the second multilayered volume hologram structure of the invention.

FIG. 11 shows the results of measuring the state of changes in the peeling strength with which the surface protective film is released from the multilayered volume hologram structure of the invention.

FIGS. 17(a) and 17(b) are schematics illustrative of the first embodiment of the fourth multilayered volume hologram structure of the invention.

FIG. 18 is a schematic illustrative of how the hologram 3 is released from the structure shown in FIG. 17(a) from a direction shown by B.

BEST MODE FOR CARRYING OUT THE INVENTION

The first multilayered volume hologram structure of the invention and the label for making the same are first explained.

Figure 1:
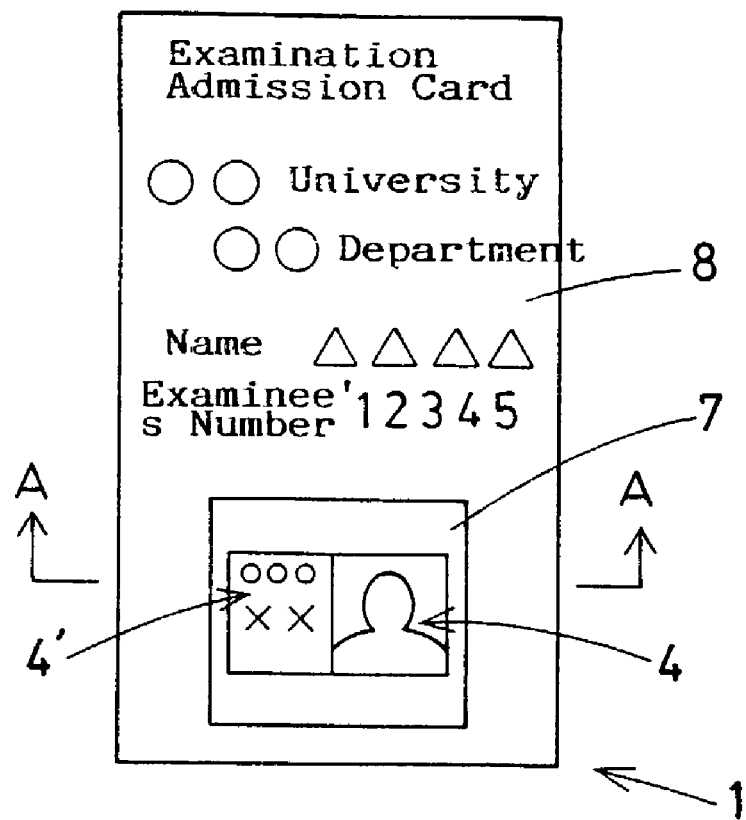
FIG. 1 is a front schematic of one embodiment of the first multilayered volume hologram structure of the invention.
Figure 2:
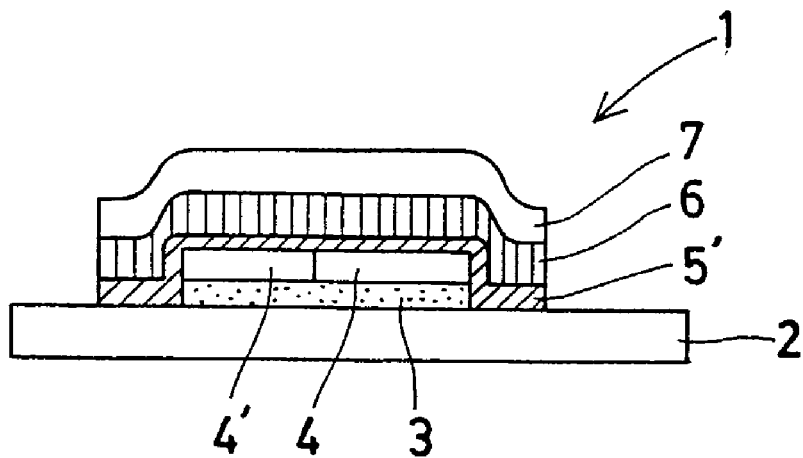
FIG. 2 is a sectional schematic taken along the line A-A in FIG. 1, showing the first multilayered volume hologram structure of the invention.

FIG. 1 is a front schematic illustrative of the first multilayered volume hologram structure of the invention, and FIG. 2 is a sectional schematic taken along the A-A line in FIG. 1. Reference numeral 1 represents a first multilayered volume hologram structure, 2 a substrate for a certificate or the like, 3 paste for pasting a photograph or an information area on the multilayered volume hologram structure, 4 a photograph of face, 4' a personal information area, 5' a first adhesive layer, 6 a volume hologram layer, 7 a surface protective film, and 8 personal information.

The multilayered volume hologram structure shown in FIG. 1 takes the form of a certificate for examination. The personal information 8 such as a name and an examinee's number is put down on the substrate 2, and the photograph of face 4 and information area 4' are pasted on the substrate 2. Identifying data about the individual who carries the certificate are born on the information area 4. The information area 4 in a seal form is pasted on the substrate 2, as in the case of the photograph. A school name or badge bearing hologram image is recorded on the volume hologram layer 6 with interference fringes corresponding to a hologram interference pattern.

In this regard, it is to be noted that the personal information 8 may be recorded at a position on which the hologram 3 is to be pasted or other position. In other words, the personal information may be recorded at any desired position on the substrate 2 as occasion arises. This information may be recorded on the substrate 2 by known means such as handwriting, typing, and printing using toner, a thermal transfer ribbon, a type ribbon, and printing ink, for instance. The information may also be magnetically recorded. When the substrate 2 is formed of plastic or metal material, the information may be recorded thereon by embossing.

In the first multilayered volume hologram structure of the invention, the photograph of face 4 and information area 4' are pasted on the substrate 2 with photographic paste 3, as can be seen from FIG. 2. The first adhesive layer 5', volume hologram layer 6 and surface protective film 7 are laminated on the substrate 2 and astride the photograph of face 4 and information area 4' in the described order.

For the substrate 2, a sheet or film form of paper, synthetic paper, synthetic resin or metal may be used. Use may also be made of a card such as an ID card or a booklet form of credit card or passport, on which given pieces of information are recorded. The photographic paste 3 may have an adhesion strength with which the photograph 4 or information area 4' cannot be detached from the substrate 2 when a multilayer structure composed of the volume hologram layer and surface protective film is forcibly stripped from the substrate, and so may be generally available starch paste or synthetic paste.

For the photograph of face 4, known photographic materials represented by silver salt, sublimation transfer images, etc. may be used. Instead of the face of an individual, an image indicating the finger print, palm print, etc. of the individual may be used. When, for instance, the certificate is an admission certificate for a sport event or the like, monochromatic or polychromatic numerals, characters, etc. may be indicated on the information area 4' of the certificate. Furthermore, the name of the site, whether or not the individual who carries the certificate is a player, qualifications, sponsor's instructions, etc. may be indicated on the information area 4'.

The first adhesive layer 5' is re-bondable to the substrate 2 upon removal of the release paper (to be described later) from the label for making the first multilayered volume hologram structure of the invention. For instance, this adhesive layer 5' is formed of acrylic resin, acrylic ester resin, and vinyl acetate resin or their copolymers as well as styrene-butadiene copolymer, natural rubber, casein, gelatin, rosin ester, terpene resin, phenolic resin, styrene resin, coumarone-indene resin, polyvinyl ether, and silicone resin. The adhesive layer 5' may also be formed of adhesives based on α-cyanoacrylate, silicone, maleimide, styrol, polyolefin, resorcinol, and polyvinyl ether as well as heat-sealing adhesives such as ethylene-vinyl acetate copolymer resin, polyamide resin, polyester resin, polyethylene resin, ethylene-isobutyl acrylate copolymer resin, butyral resin, polyvinyl acetate and its copolymer resin, cellulose derivatives, polymethyl metacrylate resin, polyvinyl ether resin, polyurethane resin, polycarbonate resin, polypropylene resin, epoxy resin, phenol resin, thermoplastic elastomers such as SBS, SIS, SEBS and SEPS, or reaction hot-melt resins. The adhesive layer has preferably a thickness of 4 μm to 20 μm.

Known volume hologram recording materials such as silver halide materials, bichromated gelatin emulsions, photopolymerizable resins, and photo-crosslinking materials may be used for the recording material in the volume hologram layer 6. For the multilayered volume hologram structure of the invention, however, it is preferable to use a photosensitive material employed in dry type volume phase hologram recording applications, which comprises a matrix polymer, a photo-polymerizable compound, a photopolymerization initiator and a sensitizing dye, because it is excellent in softness.

The photopolymerizable compounds used herein include photopolymerizable and photo-crosslinkable monomers, oligomers, and prepolymers having at least one ethylenically unsaturated bond per molecule as will be described later, and their mixtures. For instance, mention is made of unsaturated carboxylic acids and their salts, esters of unsaturated carboxylic acids and aliphatic polyhydric alcohol compounds, and amide combinations of unsaturated carboxylic acids and aliphatic polyvalent amine compounds.

Exemplary monomers of the unsaturated carboxylic acids are acrylic acid, methacrylic acid, itaconic acid, crotonic acid, isocrotonic acid, and maleic acid, which may have halogen substituents as in the case of chlorinated unsaturated carboxylic acids, brominated unsaturated carboxylic acids, and fluorinated unsaturated carboxylic acids. Exemplary salts of unsaturated carboxylic acids are sodium, and potassium salts of the aforesaid acids.

Exemplary monomers for the esters of aliphatic polyhydric alcohol compounds and unsaturated carboxylic acids are acrylic esters such as ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetra-acrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, o-biphenyl methacrylate, and o-biphenyl acrylate.

Exemplary monomers for the esters of aliphatic polyhydric alcohol compounds and unsaturated carboxylic acids are acrylic esters such as ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane acrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetra-acrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, and polyester acrylate oligomer.

Exemplary methacrylic esters are tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetra-methacrylate, dipentaerythritol dimethacrylate, dipenta-erythritol hexamethacrylate, sorbitol trimethacrylate, sorbitol tetramethacrylate, bis-[p-(3-methacryloxy-2-hydroxy-propoxy)phenyl]dimethylmethane, bis-[p-(acryloxyethoxyphenyl]dimethylmethane, 2,2-bis(4-methacryloyloxyphenyl) propane, and methacrylic acid-2-naphthyl.

Exemplary itoconic esters are ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Exemplary crotonic esters are ethylene glycol dicrotonate, tetramethylene glycol dicrotonate, pentaerythritol dicrotonate, and sorbitol tetracrotonate.

Exemplary isocrotonic esters are ethylene glycol diisocrotonate, pentaerythritol diisocrotonate, and sorbitol tetraisocrotonate.

Exemplary maleic esters are ethylene glycol dimaleate, triethylene glycol dimaleate, pentaerythritol dimaleate, and sorbitol tetramaleate.

Exemplary halogenated unsaturated carboxylic acids are 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, methacrylic acid-2,4,6-tribromophenyl, dibromoneopentyl dimethacrylate (NK Ester DBN, the trade name of the product made by Shin Nakamura Chemical Co., Ltd.), dibromopropyl acrylate (NK Ester A-DBP, the trade name of the product made by Shin Nakamura Chemical Co., Ltd.), dibromopropyl methacrylate (NK Ester DBP, the trade name of the product made by Shin Nakamura Chemical Co., Ltd.), methacrylic acid chloride, methacrylic acid-2,4,6-trichlorophenyl, p-chlorostyrene, methyl-2-chloroacrylate, ethyl-2-chloroacrylate, n-butyl-2-chloroacrylate, tribromophenyl acrylate, and tetrabromophenol acrylate.

Exemplary monomers for the amides of unsaturated carboxylic acids and aliphatic polyhydric amine compounds are methylene-bis(acrylamide), methylene-bis(methacrylamide), 1,6-hexamethylene-bis(acrylamide), 1,6-hexamethylene-bis(methacrylamide), diethylenetriamine-tris(acrylamide), xylylene-bis(acrylamide), xylylene-bis (methacrylamide), N-phenylmethacrylamide, and diacetonacrylamide.

Use may also be made of polyisocyanate compounds having at least two isocyanate groups per molecule as set forth in JP-B 48-41708, and vinyl urethane compounds obtained by the addition of vinyl monomers having a hydroxyl group and containing at least two polymerizable vinyl groups per molecule, as represented by the following general formula:

CH$_2$=C(R)COOCH$_2$CH(R')OH where R and R' each stands for hydrogen or a methyl group.

Further, use may be made of urethane acrylates as set forth in JP-A 51-37193, and polyfunctional acrylates and methacrylates such as polyester acrylates, epoxy resins and (meth) acrylic acids set forth in JP-A 48-64183 and JP-B's 49-43191 and 52-30490.

Still further, use may be made of photopolymerizable monomers, and oligomers introduced in "Japan Bonding Industry Association", Vol. 20, No. 7, pp. 300 to 308.

Still further, use may be made of phosphorus-containing monomers such as mono(2-acryloyloxyethyl) acid phosphate, (Light Ester PA, the trade name of the product made by Kyoei-Sha Fats & Oils Chemical Co., Ltd.) and mono(2-methacryloyl-oxyethyl) acid phosphate (Light Ester PA, the trade name of the product made by Kyoei-Sha Fats & Oils Chemical Co., Ltd.), and epoxy acrylates such as Lipoxy VR-60 (the trade name of the product made by Showa Polymer Co., Ltd.) and Lipoxy VR-90 (the trade name of the product made by Showa Polymer Co., Ltd.).

Still further, use may be made of NK Ester M-230G (the trade name of the product made by Shin Nakamura Chemical Co., Ltd.), and NK Ester 23G (the trade mane of the product made by Shin Nakamura Chemical Co., Ltd.).

Still further, use may be made of triacrylates having the following structural formula:

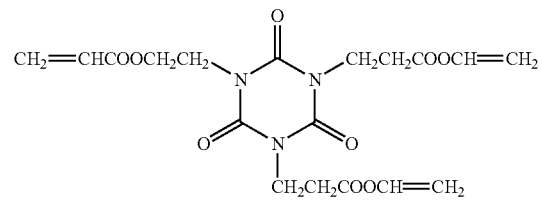

(Alonix M-315, the trade name of the product made by Toa Synthesis Chemical Co., Ltd., and having the following structural formula:

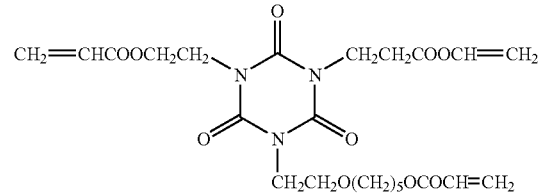

(Alonix M-325, the trade name of the product made by Toa Synthesis Chemical Co., Ltd.). Use may also be made of 2,2'-bis(4-acryloxy.diethoxyphenyl)propane (NK Ester A-BPE-4, the trade name of the product made by Shin-Nakamura Chemical Co., Ltd.), and tetramethylolmethane tetraacrylate (NK Ester A-TMMT, the trade name of the product made by Shin-Nakamura Chemical Co., Ltd.).

Exemplary photopolymerization initiators used in initiator systems are 1,3-di(t-buthyldioxycarbonyl)benzo-phenone, 3,3',4,4'-tetrakis(t-buthyldioxycarbonyl)benzo-phenone, N-phenylglycine, 2,4,6-tris(trichloromethyl)-s-triazine, 3-phenyl-5-isooxazolone, 2-mercaptobenzimidazole, and imidazole dimers. In view of the stabilization of the recorded hologram, the photopolymerization initiator should preferably be decomposed after the recording of the hologram. For instance, an organic peroxide type initiator is easily decomposed by irradiation with ultraviolet radiation, and so is preferably used in the practice of the invention.

Exemplary sensitizing dyes are thiopyrylium salt dyes, merocyanine dyes, quinoline dyes, styrylquinoline dyes, keto-coumarin dye, thioxanthene dyes, xanthene dyes, oxonol dyes, cyanine dyes, rhodamine dyes, pyrylium ion dyes, and diphenyliodonium ion dyes, all showing light absorption at 350 to 600 nm wavelengths. Sensitizing dyes showing light absorption at wavelength of up to 350 nm, and at least 600 nm, too, may be used.

Examples of the polymer matrix that is a binder resin are polymethacrylic ester or its partial hydrolyzate, polyvinyl acetate or its hydrolyzate, polyvinyl alcohol or its partially acetalized product, triacetyl cellulose, polyisoprene, polybutadiene, polychloroprene, silicone rubber, polystyrene, polyvinyl butyral, polyvinyl chloride, chlorinated polyethylene, chlorinated polypropylene, poly-N-vinylcarbazole or its derivative, poly-N-vinylpyrrolidone or its derivative, a copolymer of styrene and maleic anhydride or its half ester, and a copolymer containing at least one polymerization component selected from the group consisting of copolymerizable monomers such as acrylic acid, acrylic ester, methacrylic acid, methacrylic ester, acrylamide, acrylnitrile, ethylene, propylene, vinyl chloride and vinyl acetate, or mixtures thereof. Among these, it is preferable to use polyisoprene, polybutadiene, polychloroprene, polyvinyl alcohol, polyvinyl acetal that is partially acetalized product of polyvinyl alcohol, polyvinyl buryral, polyvinyl acetate, an ethylene-vinyl acetate copolymer, a vinyl chloride-vinyl acetate copolymer or mixtures thereof.

The recorded hologram is stabilized at a monomer migration step by heating. To this end, the matrix polymer has preferably a relatively low glass transition temperature at which monomer migration takes place readily.

The photopolymerizable compound is used in an amount of 10 parts by weight to 1,000 parts by weight, and preferably 10 parts by weight to 100 parts by weight per 100 parts by weight of binder resin.

The photopolymerization initiator is used in an amount of 1 part by weight to 10 parts by weight, and preferably 5 parts by weight to 10 parts by weight per 100 parts by weight of binder resin.

The sensitizing dye is used in an amount of 0.01 part by weight to 1 part by weight, and preferably 0.01 part by weight to 0.5 parts by weight per 100 parts by weight of binder resin.

Other photosensitive material components, for instance, are plasticizers, glycerin, diethylene glycol, triethylene glycol, various nonionic surfactants, anionic surfactants, and cationic surfactants.

The hologram recording material is dissolved in acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, and isopropanol or a mixed solvent thereof to form a coating solution having a solids content of 15% to 25%.

For such a coating solution, for instance, Omnidex 352 and Omnidex 706, Du Pont, are used.

The hologram recording layer has a thickness of 0.1 μm to 50 μm, and preferably 5 μm to 20 μm.

Before the hologram recording layer is built in the multilayered volume hologram structure, it is coated on a provisional substrate at a post-drying thickness of 1 μm to 100 μm, and preferably 4 μm to 20 μm. Used for the provisional substrate are a glass plate, an acrylic plate, a polycarbonate plate, a polyethylene plate, a polypropylene plate, a polyethylene terephthalate plate, and a polystyrene plate, all having a thickness of 0.01 mm to 100 mm, and preferably 1 mm to 5 mm. Among these, it is preferable to use the glass, acrylic, and polycarbonate plate because they have sufficient mechanical strength, a low index of double refraction, and high transparency. For the provisional plate, a film previously coated with a photosensitive material may also be used.

A protective layer is provided on the hologram recording layer. The protective layer may be formed by laminating together transparent resin films that are of good weather resistance and have a thickness of 0.001 mm to 10 mm, and preferably 0.01 mm to 0.1 mm, typically polyethylene terephthalate films, polyethylene films, polypropylene films, polyvinyl chloride films, acrylic films, polyacetyl cellulose films, and cellulose acetate butyrate films, using rubber rollers. Alternatively, the protective layer may be formed by the spin coating of film forming materials such as triacetyl cellulose, polyvinyl alcohol, and polymethyl methacrylate.

As is the case with a conventional dry hologram-making process, a hologram is recorded in the volume hologram layer by steps of recording interference fringes in the hologram recording layer, using two-beam laser light such as argon light, and laser light (of 514.5 nm wavelength) with a Lippmann type hologram making system, decomposing a photopolymerization initiator by irradiation with ultraviolet radiation of 0.1 mJ/cm$^2$ to 10,000 mJ/cm$^2$, and preferably 10 mJ/cm$^2$ to 1,000 mJ/cm$^2$ from a light source such as an ultra high pressure-mercury-vapor lamp, a high pressure mercury-vapor lamp, a carbon arc lamp, a xenon arc lamp, and a metal halide lamp, and thermally treating a photopolymerizable compound (e.g., at 120° C. for 120 minutes) for diffusion and migration, so that a stable hologram can be formed.

To record the hologram in the hologram recording layer, the aforesaid volume hologram recording material is coated on a substrate film, so that interference fringes corresponding to the wavefront of light from an object is recorded in the layer in the form of transmittance modulation or refractive index modulation. Alternatively, while an original volume hologram plate is in close contact with the hologram recording layer, the hologram recording layer is exposed to light and developed, so that the volume hologram is replicated and thereby recorded therein.

The hologram is preferably free of surface asperities, and so it is preferable to use a reflection type volume hologram (Lippmann hologram) or a transmission type volume hologram.

Figure 37A:
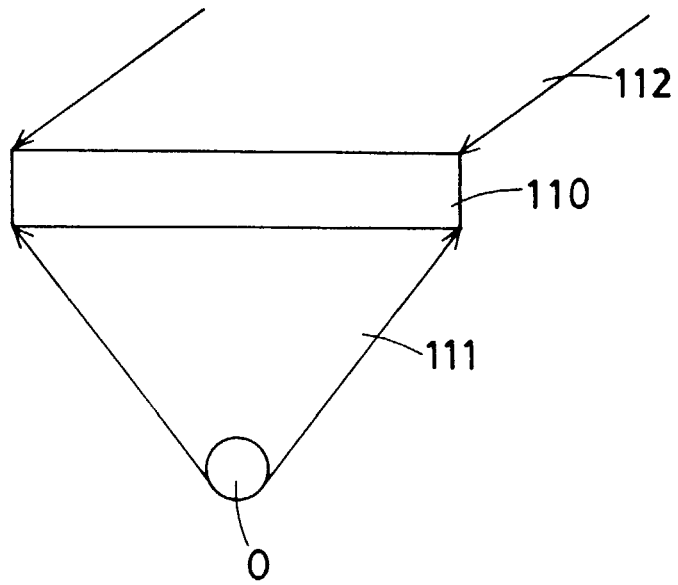
FIGS. 37(a) and 37(b) are sectional schematics illustrative of how to record and reconstruct a Lippmann hologram.
Figure 37B:
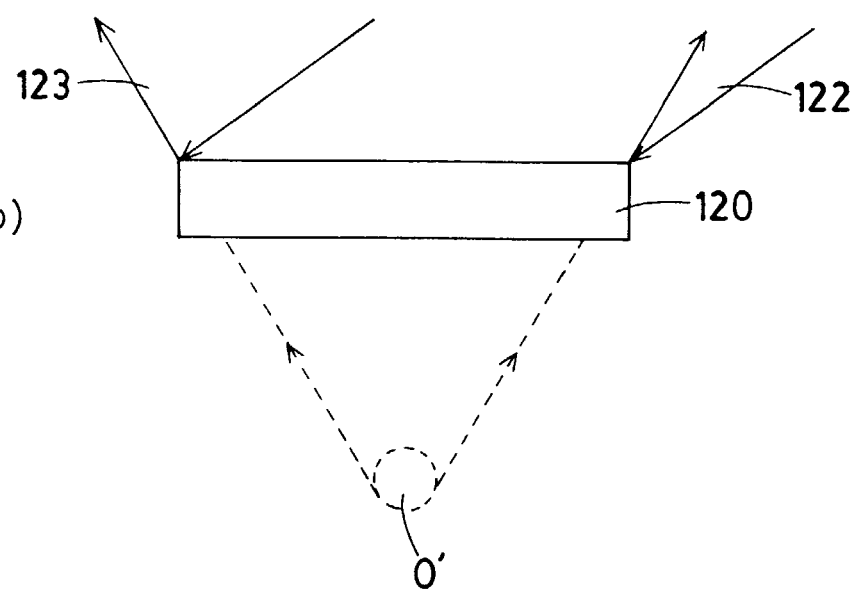

A Lippmann hologram is here explained. The Lippmann hologram is recorded using such an arrangement as shown in FIG. 37(a), and reconstructed on such principles as illustrated in FIG. 37(b). More specifically, coherent object light 111 bearing information about the object O to be recorded is incident on one side of a hologram photosensitive material 110 and, at the same time, coherent reference light 112 of the same wavelength is incident on the opposite side of the material 110 at a given angle of incidence. There-upon, the object light 111 and the reference light 112 interfere with each other in the hologram photosensitive material 110, so that the Lippmann hologram (a volume type hologram interference fringes) is recorded therein. To reconstruct this hologram, one side of a material 120 with the Lippmann hologram recorded therein (the hologram photosensitive material 110) is irradiated with reconstructing illumination light 122 from the same direction as that of the reference light 112 used for recording the hologram. Thereupon, the incident light is diffracted by the recorded volume type hologram interference fringes. The diffracted light 123 is diffracted in the same direction as that of the light emitted from the position of the object O to be recorded, so that an image O' is reconstructed at the original position of the object O. Alternatively, the opposite side of the material 120 is irradiated with the reconstructing illumination light 122 propagating in an opposite direction to the reference light 112 used for recording the hologram, so that the image O' is reconstructed at the original position of the object O. In either case, the Lippmann hologram can reconstruct an image of a three-dimensional object recorded therein or a two-dimensional pattern recorded therein in a given space.

Such a Lippmann hologram has some characteristic features of being capable of reconstructing the recorded image by ambient light such as indoor illumination light, recording and reconstructing a three-dimensional object and recording an object in a multiple manner, and having wave-length selectivity and angle selectivity.

When the Lippmann hologram is used, therefore, the pattern recorded therein can be observed by illumination light as a specific colored pattern existing in the air.

Figure 38A:
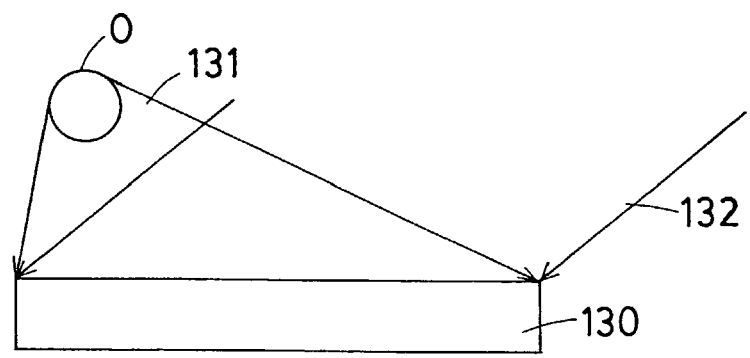
FIGS. 38(a) and 38(b) are sectional schematics illustrative of how to record and reconstruct a transmission type volume hologram.
Figure 38B:
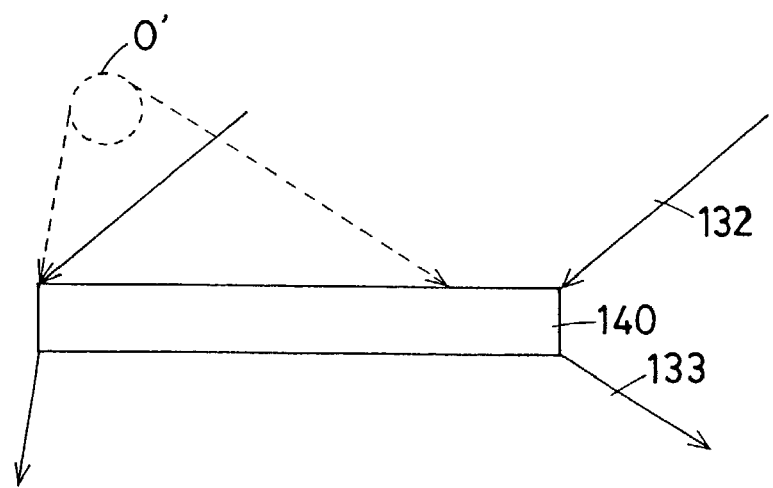

Then, a transmission type volume hologram is explained. The transmission type volume hologram is recorded using such an arrangement as shown in FIG. 38(a), and reconstructed on such principles as illustrated in FIG. 38(b). An image is recorded by striking coherent object light 131 bearing information about the object O to be recorded on one side of a hologram photosensitive material 130 of some thickness and, at the same time, striking coherent reference light 132 of the same wavelength on the same side of the material 130 at a given angle of incidence, so that the object light 131 and the reference light 132 interfere with each other in the material 130 to record a volume type of hologram interference fringes therein.

For hologram reconstruction, a material 140 with the image recorded therein (the hologram photosensitive material 130) is irradiated with reconstructing illumination light 132 from the same direction as that of the reference light 132 used for recording the image. Thereupon, the incident light is diffracted by the recorded volume type hologram interference fringes. The diffracted light 133 is diffracted in the same direction as that of the light emitted from the position of the object O to be recorded, so that an image O' is reconstructed at the original position of the object O. Alternatively, the opposite side of the material 140 is irradiated with the reconstructing illumination light 132 propagating in an opposite direction to the reference light 132 used for recording the hologram, so that the image O' is reconstructed at the original position of the object O.

In the invention, it is acceptable to use a reflection type hologram obtained by evaporating a reflecting layer on the back side of the transmission type volume hologram.

The surface protective film 7, for instance, may be formed of polyethylene, polypropylene, polyethylene fluoride, polyvinylidene fluoride, polyvinyl chloride, polyvinylidene chloride, ethylene-vinyl alcohol, polyvinyl alcohol, polymethyl methacrylate, polyether sulfone, polyether ketone, polyamide, tetrafluoroethylene-perfluoroalkylvinyl ether copolymers, polyethylene terephthalate, and polyimide, and has a thickness of 2 μm to 200 μm, and preferable 10 μm to 50 μm.

Although not illustrated, it is preferable that the surface protective film 7 is subjected thereon with a hard coat treatment, if required, for the purpose of improving the surface protective properties of the surface protective film 7. The hard coat treatment is preferably carried out by the dipping, spray, and roll coating of materials based on silicone, fluorine-containing silicone, melamine alkyd, and urethane acrylate (of the ultraviolet radiation curing type), thereby obtaining a post-drying film thickness of 1 μm to 50 μm, and preferably 3 μm to 25 μm.

Although not illustrated, the surface of the surface protective film 7 or the surface of the hard coat film is preferably subjected to a releasing treatment for the purpose of prevent any intentional release thereof. The surface protective film or the hard coat film thereof may otherwise be released by pasting a high rigidity film thereon and peeling off it. For this purpose, release agents such as fluorine release agents, silicone release agents, stearate release agents, and wax release agents may be provided by suitable coating techniques such as dipping coating, spray coating, and roll coating.

Although again not illustrated, the surface or hard coat treated surface of the surface protective film 7 is preferably subjected to a release treatment for the purpose of preventing a release thereof by peeling a high rigidity film applied thereon, thereby preventing falsification. The release treatment may be carried out by the dipping coating, spray coating, and roll coating of a fluorine release agent, a silicone release agent, a stearate release agent, and a wax release agent.

Preferably, the adhesive layers, volume hologram layer and surface protective film should be all transparent.

The object of the first multilayered volume hologram structure of the invention that has such a multilayer structure as mentioned above is to certainly break the volume hologram layer, for instance, upon an intentional release of the surface protective film, thereby ensuring prevention of falsification such as a photograph replacement.

When the peeling strength between the surface protective film 7 and the volume hologram layer 6 is weak, the volume hologram layer is exposed upon a release of the surface protective film 7. Since the volume hologram layer 6 is composed of acrylic resin or gelatin and so is brittle, it can break down immediately after the photograph is stripped off, thereby achieving reliable prevention of falsification. If this peeling strength should be strong, however, the volume hologram layer would be released following the release of the surface protective film.

Figure 3:
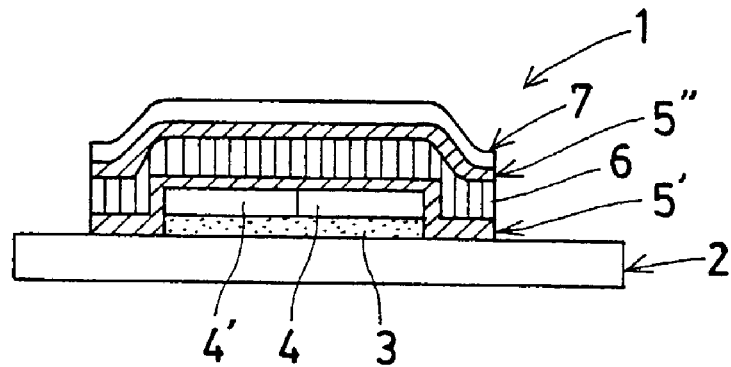
FIG. 3 is a schematic illustrative of another embodiment of the first multilayered volume hologram structure of the invention.

When the surface protective film contains a plasticizer, a second adhesive layer 5″ is interleaved between the surface protective film 7 and the volume hologram layer 6 as shown in FIG. 3, thereby preventing the migration of the plasticizer from having any influence on the hologram recorded in the volume hologram layer. If the adhesive strength of the second adhesive layer 5″ should be stronger than that of the first adhesive layer 5′, however, the volume hologram layer would be released following a release of the surface protective film, as mentioned just above.

To achieve the aforesaid object, the peeling strength, with which the multilayer structure comprising first adhesive layer 5′/volume hologram layer 6/surface protective layer 7 as shown in FIG. 2 or the multilayer structure comprising first adhesive layer 5′/volume hologram layer 6/second adhesive layer 5″/surface protective layer 7 as shown in FIG. 3 is released from the associated substrate 2, should be greater than the breaking strength or tensile strength at 1% elongation of each multilayer structure. In the present disclosure, each multilayer structure will be called the multilayer structure to be released.

The peeling strength (Kg/25 mm) with which the multilayer structure is released from the substrate is determined by the 180° peeling test according to JIS Z0237 (using a tensile compression testing machine, e.g., model SV-201-E made by Konno Seisakusho Co., Ltd.) under the following measuring conditions:

Measuring atmosphere: 20° C.×65% RH
Test piece: 25 mm width
Lamination: Press lamination by one reciprocation of rubber roller
Lamination time: 60 minutes after lamination
Peel angle: 180°
Peeling rate: 250 mm/min.

In the invention, it is preferable that the peeling strength of the multilayer structure is in the range of 0.1 Kg/25 mm to 5.0 Kg/25 mm, and especially 1 Kg/25 mm to 3 Kg/25 mm. A multilayer structure having a peeling strength of lower than 0.1 Kg/25 mm is practically unacceptable, because it is too brittle to be laminated on a photograph in view of its breaking strength, as will be described later. The upper limit of 5.0 Kg/25 mm is determined by an upper limit on the adhesive force of the adhesive agent having re-bondability.

When the multilayer structure is released from the substrate, it is required that the multilayer structure break down or show an elongation of at least 1%. The breaking strength or tensile strength at 1% elongation of the multilayer structure to be released is measured according to JIS K7127-1989, using a tensile compression testing machine, e.g., model SV-201-E made by Konno Seisakusho Co., Ltd. under the following measuring conditions:

Measuring atmosphere: 25° C.×RH 50%
Test piece: 25 mm width
Rate of pulling: 200 mm/min.

Figure 4:
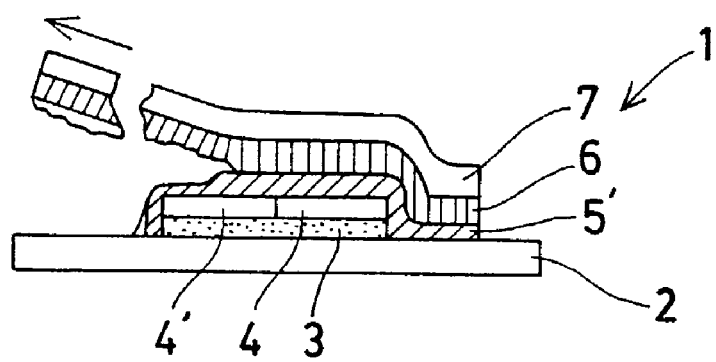
FIG. 4 is a schematic illustrative of how to release the first multilayered volume hologram structure of the invention.
Figure 5:
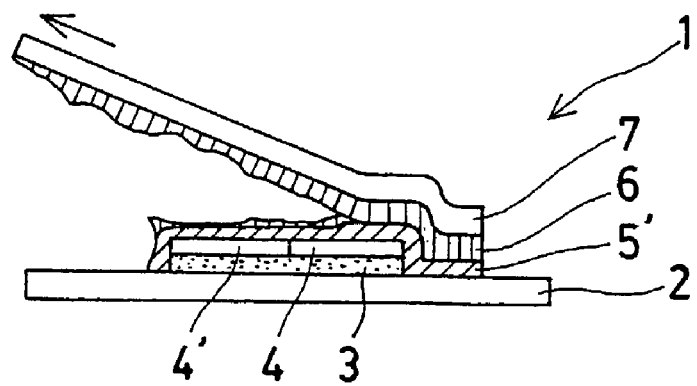
FIG. 5 is a schematic illustrative of how to release the first multilayered volume hologram structure of the invention.

In the first multilayered volume hologram structure of the invention, the breaking strength or tensile strength at 1% elongation of the multilayer structure to be released is in the range of 0.01 Kg/mm$^2$ to 5 Kg/mm$^2$, and preferably 0.03 Kg/mm$^2$ to 3 Kg/mm$^2$, as can be seen from FIG. 4 wherein the breakdown of the multilayer structure is indicated by an arrow, and as can be seen from FIG. 5 wherein how the multilayer structure is elongated is indicated by an arrow. When the breaking strength or tensile strength at 1% elongation is below 0.01 Kg/mm$^2$, the multilayer structure to be released is too brittle to be laminated on a photograph. When the upper limit of 5.0 Kg/mm$^2$ is exceeded, on the other hand, it is impossible to achieve a complete breakdown of the volume hologram layer because the volume hologram layer follows a release of the surface protective film.

In the first multilayered volume hologram structure of the invention, it is essentially required that the peeling strength, with which the multilayer structure comprising a volume hologram layer and a surface protective film is released from the substrate, be in the range of 0.1 Kg/25 mm to 5.0 Kg/25 mm, the breaking strength or tensile strength at 1% elongation of the multilayer structure be in the range of 0.01 Kg/mm$^2$ to 5.0 Kg/mm$^2$ and the peeling strength, with which the multilayer structure comprising a volume hologram layer and a surface protective film is released from the substrate, be greater than the breaking strength or tensile strength at 1% elongation of the multilayer structure comprising a volume hologram layer and a surface protective film. This ensures a complete breakdown or an at least 1% elongation of the multilayer structure comprising a volume hologram layer and a surface protective film upon a release of the multilayer structure from the substrate, so that a complete breakdown of the recorded hologram is achievable. In the invention, either one of the breaking strength or tensile strength at 1% elongation of the multilayer structure to be released may be in the aforesaid range.

It is here to be noted that both the adhesive layer and volume hologram layer in the multilayer structure are very soft, and so the breaking strength or tensile strength at 1% elongation of the multilayer structure depends on the breaking strength or tensile strength at 1% elongation of the surface protective film 7. When the multilayer structure is designed, therefore, it is preferable to take the breaking strength or tensile strength at 1% elongation of the surface protective film into consideration.

For the surface protective film 7, for instance, any one of polyethylene film (PE), polypropylene film (PP), ethylene-vinyl alcohol copolymer film (EVOH), polyvinyl alcohol film-(PVA), polymethyl methacrylate film (PMMA), polyether sulfone film (PES), polyamide film (nylon film), and tetrafluoroethylene-perfluoroalkylvinyl ether copolymer film (PFA) is preferably selected from the surface protective films already mentioned while care is taken of peeling strength. It is thus possible to impart preferable breaking strength or tensile strength at 1% elongation to the multilayer structure to be released.

For reference, the breaking strength (Kg/mm$^2$) and tensile strength at 1% elongation (Kg/mm$^2$) of these plastic films are shown in Table 1 given below. However, it is to be noted that these values vary slightly depending on the degree of elongation. If required, consult generally available data. In Table 1, MD and TD are values as measured in the lengthwise and widthwise directions of film, respectively. The breaking strength and tensile strength at 1% elongation of polyimide film (PI), polyethylene terephthalate film (PET) and polyether ether ketone film (PEEK) are also shown in Table 1.

TABLE 1

|  | Breaking Strength | Tensile Strength at 1% Elongation |
| --- | --- | --- |
| PE | MD: 2.14 TD: 2.05 | — |
| PP | MD: 5.0 TD: 2.5 | MD: 0.65 TD: 0.5 |
| EVOH | MD: 9.0 TD: 4.0 | MD: 2.2 TD: 2.2 |
| PVA | MD: 5.5 TD: 5.5 | MD: 0.25 TD: 0.25 |
| PMMA | 3.0 | 1.2 |
| PES | 8.5 | 2.2 |
| Nylon | MD: 22 TD: 28 | MD: 1.6 TD: 1.1 |
| PFA | MD: 4.0 TD: 3.5 | MD: 0.49 TD: 0.47 |
| PI | 17.6 | 3.0 |
| PET | MD: 20 TD: 22 | MD: 4.0 TD: 4.1 |
| PEEK | 13 | 3.0 |

One exemplary layer structure in section of the label used for the fabrication of the first multilayered volume hologram structure of the invention is explained with reference to FIGS. 6(a) and 6(b).

In the drawings, 10 represents a multilayered volume hologram structure-making label, and 11 stands for a release paper. The same numerals as in FIGS. 2 and 3 indicate the same parts.

Figure 6:
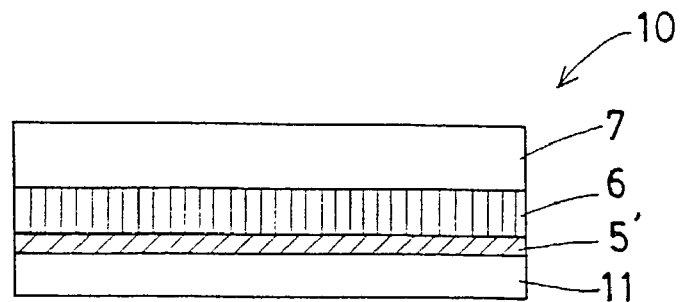
FIGS. 6(a) and 6(b) are sectional schematics; illustrative of the label for making the first multilayered volume hologram structure of the invention.
Figure 6:
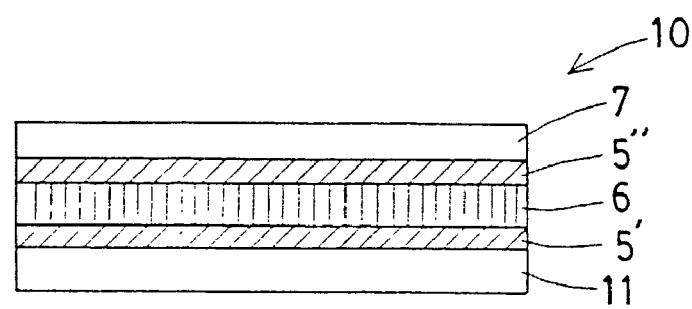

The label 10 shown in FIG. 6(a) is a label for the fabrication of the first multilayered volume hologram structure, which comprises a first adhesive layer 5', a volume hologram layer 6 and a surface protective film 7 laminated on the release paper 11 in the described order.

For the release paper 11, not only ordinary release paper but also a releasable film obtained by the release treatment of the surface of a polyethylene terephthalate film with a fluorine or silicone release agent may be used. Preferably but not exclusively, the back surface of the release paper that does not oppose to the adhesive layer is subjected to a release treatment to avoid blocking due to a portion of the adhesive agent forced out of the side of the label. To release a multilayer structure of suitable size from the release paper, the release paper may be subjected to so-called "half die cutting" at only an area with the multilayer structure laminated thereon. Alternatively, it is acceptable to provide perforations or other cuts in the release paper.

Upon removal of the release paper 11, the exposed first adhesive layer 5' of the label 10 is put on a substrate 2 with a photograph, etc. pasted thereon, so that a multilayered volume hologram structure as shown in FIG. 2 can be fabricated.

The label shown in FIG. 6(b) comprises a first adhesive layer 5', a volume hologram layer 6, a second adhesive layer 5" and a surface protective layer 7 laminated on the release paper 11 in the described order. As in FIG. 6(a), the release paper 11 is removed from the label 10 to put the exposed first adhesive layer 5' of the label 10 on a substrate 2 with a photograph, etc. pasted thereon, so that a multilayered volume hologram structure as shown in FIG. 3 can be fabricated.

Thus, the label for the fabrication of the first multilayered volume hologram structure is useful for the fabrication of the first multilayered volume hologram structure.

In what follows, the first multilayered volume hologram structure of the invention and the label for making the same will be explained with reference to illustrative examples 1 to 3, and comparative example 1.

Illustrative Example 1

Preparation of Hologram-Recorded Material

A Lippmann hologram was recorded on a hologram recording medium obtained by laminating a hologram recording material layer (a 20 μm thick Omnidex 706 made by Du Pont) and a polyvinyl chloride film on a polyethylene terephthalate film in the described order.

Preparation of Silicone Separator/Adhesive Layer

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm.

Preparation of Surface Protective Film/Adhesive Layer/Silicone Separator

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm, and a non-stretched ethylene-vinyl alcohol copolymer film (a 12 μm thick Eval EF-F made by Kuraray Co., Ltd.) was then laminated on the surface of the adhesive layer.

The surface of the ethylene-vinyl alcohol copolymer film was spray coated with a fluorine release agent (Mold Spat K681 made by Asahi Glass Co., Ltd.) for release treatment.

Preparation of Multilayered Volume Hologram Structure-Making Label

The polyvinyl chloride film was removed from the aforesaid hologram recording material, and the aforesaid silicone separator/adhesive layer was laminated on the hologram recording material to obtain a PET film/hologram layer/adhesive layer/silicone separator multilayered structure.

The PET film was removed from this multilayered structure while the silicone separator was removed from the aforesaid surface protective layer/adhesive layer/silicone separator structure. Then, lamination was carried out to obtain a label for the fabrication of the multilayered volume hologram structure of the invention, which comprised a surface protective film/adhesive layer/hologram layer/adhesive layer/silicone separator structure.

The breaking strength of this label from which the silicone separator was removed was found to be MD=10 Kg/mm$^2$ and TD=5.2 Kg/mm$^2$ as measured according to JIS K7127-1989.

For reference, the breaking strength of the non-stretched ethylene-vinyl alcohol copolymer film (a 12 μm thick Eval EF-F made by Kuraray Co., Ltd.) used as the surface protective film was MD=8.7 Kg/mm$^2$ and TD=4.1 Kg/mm$^2$, as similarly measured.

Preparation of Multilayered Volume Hologram Structure

The label, from which the silicone separator was removed, was laminated at the adhesive layer on a photograph and information area-bearing substrate. After the obtained multilayered structure was permitted to stand alone for 24 hours, a surface protective film/volume hologram layer structure was forcibly removed from the multilayered structure. However, it was found that the surface protective film fractured with a breakdown of the volume hologram layer.

Measurement of Peeling Strength

A label for the fabrication of the multilayered volume hologram structure was prepared as in illustrative example 1 with the exception that the following structure was used instead of the aforesaid surface protective film/adhesive layer/silicone separator structure. That is, an adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm, and an easily bondable polyester film (a 50 μm thick HP-7 made by Teijin Limited) was laminated on the surface of the adhesive agent layer. As in illustrative example 1, release treatment was applied to the surface of this polyester film.

This label, from which the silicone separator was removed, was laminated on a photograph and information area-bearing substrate, and allowed to stand alone for 24 hours. The peeling strength of the multilayered structure was found to be 3.1 Kg/25 mm, as measured by the 180° peeling test according to JIS Z0237. It is here to be noted that the volume hologram layer peeled off following the PET film.

Illustrative Example 2

A label for the fabrication of the multilayered volume hologram structure was prepared as in illustrative example 1 with the exception that the following structure was used instead of the aforesaid surface protective film/adhesive layer/silicone separator structure. That is, an adhesive agent (Nissetsu KP-981 made by Nippon Carbide Co., Ltd.) was coated on a silicone separator (a 50 μm thick SP-PET made by Tokyo Cellophane Paper Co., Ltd.) at a dry thickness of 10 μm, and a non-stretched polypropylene film (a 50 μm thick Torcero CP-SC made by Tokyo Cellophane Paper Co., Ltd.) was laminated on the surface of the adhesive layer. As in illustrative example 1, release treatment was applied to the surface of this polypropylene film.

The tensile strength at 1% elongation of the label, from which the silicone separator was removed, was found to be MD=0.78 Kg/mm$^2$, as measured according to JIS K7127-1989. For reference, the tensile strength at 1% elongation of the non-stretched polypropylene film (a 50 μm thick Torcero CP-SC made by Tokyo Cellophane Paper Co., Ltd.) used as the surface protective film was 0.11 Kg/mm$^2$, as similarly measured.

Preparation of Multilayered Volume Hologram Structure

The label, from which the silicone separator was removed, was laminated at the adhesive layer on a photograph and information area-bearing substrate. After the obtained multilayered structure was permitted to stand alone for 24 hours, a surface protective film/volume hologram layer structure was forcibly removed from the multilayered structure. However, it was found that the surface protective film elongated with an elongation of the volume hologram layer; it was absolutely impossible to achieve hologram reconstruction.

Illustrative Example 3

A label for the fabrication of the multilayered volume hologram structure was prepared as in illustrative example 1 with the exception that the following structure was used instead of the aforesaid surface protective film/adhesive layer/silicone separator structure. That is, an adhesive agent (Nissetsu KP-981 made by Nippon Carbide Co., Ltd.) was coated on a silicone separator (a 50 μm thick SP-PET made by Tokyo Cellophane Paper Co., Ltd.) at a dry thickness of 10 μm, and an extruded polyvinyl chloride film (a 50 μm thick film made by Riken Vinyl Industries Co., Ltd.) was laminated on the surface of the adhesive layer. As in illustrative example 1, release treatment was applied to the surface of this polyvinyl chloride film.

The tensile strength at 1% elongation of the label, from which the silicone separator was removed, was found to be MD=0.11 Kg/mm$^2$, as measured according to JIS K7127-1989. For reference, the tensile strength at 1% elongation of the extruded polyvinyl chloride film (a 50 μm thick film made by Riken Vinyl Industries Co., Ltd.) used as the surface protective film was 0.03 Kg/mm$^2$, as similarly measured.

Preparation of Multilayered Volume Hologram Structure

The label, from which the silicone separator was removed, was laminated at the adhesive layer on a photograph and information area-bearing substrate. After the obtained multilayered structure was permitted to stand alone for 24 hours, a surface protective film/volume hologram layer structure was forcibly removed from the multilayered structure. However, it was found that the surface protective film elongated with an elongation of the volume hologram layer; it was absolutely impossible to achieve hologram reconstruction.

Comparative Example 1

A label for the fabrication of the multilayered volume hologram structure was prepared as in illustrative example 1 with the exception that the following structure was used instead of the aforesaid surface protective film/adhesive layer/silicone separator structure. That is, an adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm, and an easily bondable polyester film (a 50 μm thick HP-7 made by Teijin Limited) was laminated on the surface of the adhesive agent layer. As in illustrative example 1, release treatment was applied to the surface of this polyester film.

The breaking strength of the label, from which the silicone separator was removed, was found to be 21.9 Kg/mm$^2$, as measured according to JIS K7127-1989. For reference, the breaking strength of the bondable polyester film (a 50 μm thick HP-7 made by Teijin Limited) used as the surface protective film was 21 Kg/mm$^2$, as measured in a similar manner.

Preparation of Multilayered Volume Hologram Structure

The label, from which the silicone separator was removed, was laminated at the adhesive layer on a photograph and information area-bearing substrate. After the obtained multilayered structure was permitted to stand alone for 24 hours, the surface protective film/volume hologram layer structure was forcibly stripped from the multilayered structure. The multilayer structure could barely be released from the latter although it was difficult to release the former from the adhesive layer interface due to the rigidity of the surface protective film. However, there was no significant damage to the hologram layer.

Then, the second multilayered volume hologram structures of the invention and the label for making the same are explained.

The second multilayered volume hologram structure of the invention is explained with reference to FIG. 1 that is a front view of the first multilayered volume hologram structure of the invention. It is here to be noted that FIG. 7 is a sectional view of the second multilayered volume hologram structure as taken along the A-A line in FIG. 1, and FIG. 8 is a sectional view illustrative of another embodiment of the second multilayered volume hologram structure.

Figure 7:
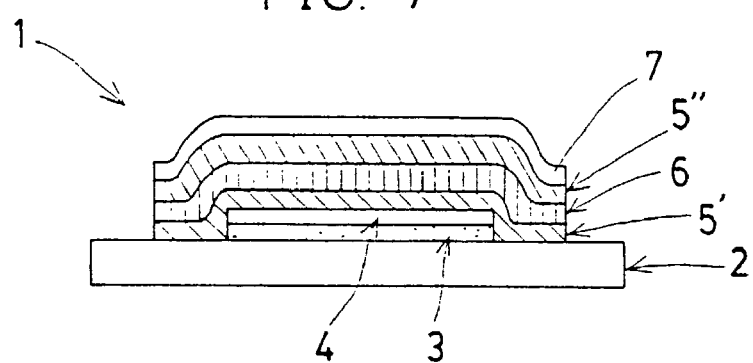
FIG. 7 is a sectional schematic illustrative of one embodiment of the second multilayered volume hologram structure of the invention.
Figure 8:
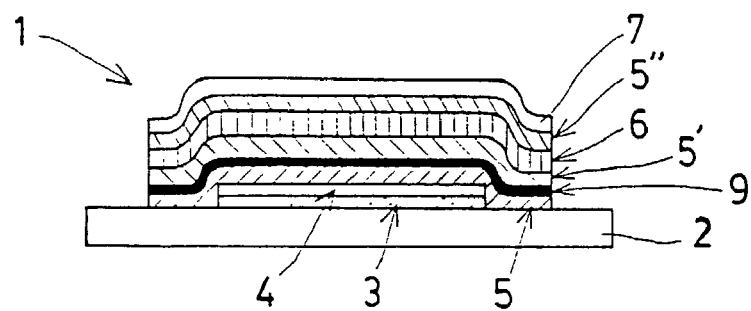
FIG. 8 is a sectional schematic illustrative of one embodiment of the second multilayered volume hologram structure of the invention.

In FIGS. 7 and 8, a third adhesive layer and a colored sheet are indicated at 5 and 9, respectively, and other reference numerals have the same meanings as mentioned in conjunction with the first multilayered volume hologram structure of the invention.

What is explained in conjunction with FIG. 1 is the same as explained in conjunction with the first multilayered volume hologram structure of the invention.

As shown in FIG. 7, the second multilayered volume hologram structure comprises a substrate 2 and a photograph of face or information area 4 pasted on the substrate 2 with a photographic paste 3. A first adhesive layer 5', a volume hologram layer 6, a second adhesive layer 5" and a surface protective film 7 are laminated on the substrate 2 and astride the photograph of face 4 in the described order.

The substrate 2, photographic paste 3, photograph of face or information area 4, volume hologram layer 6 and surface protective film 7 are the same as those used with the first multilayered volume hologram structure of the invention.

For the first adhesive layer 5' in the second multilayered volume hologram structure of the invention, for instance, use may be made of acrylic resin, acrylic ester resin, and vinyl acetate resin or their copolymers as well as styrene-butadiene copolymer, natural rubber, casein, gelatin, rosin ester, terpene resin, phenolic resin, styrene resin, coumarone-indene resin, polyvinyl ether, and silicone resin. The adhesive layer 5' may also be formed of adhesives based on α-cyanoacrylate, silicone, maleimide, styrol, polyolefin, resorcinol, and polyvinyl ether as well as heat sealing adhesives such as ethylene-vinyl acetate copolymer resin, polyamide resin, polyester resin, polyethylene resin, ethylene-isobutyl acrylate copolymer resin, butyral resin, polyvinyl acetate and its copolymer resin, cellulose derivatives, polymethyl methacrylate resin, polyvinyl ether resin, polyurethane resin, polycarbonate resin, polypropylene resin, epoxy resin, phenol resin, thermoplastic elastomers such as SBS, SIS, SEBS and SEPS, or reaction hot-melt resins.

The second adhesive layer 5", for instance, may again be formed of acrylic resin, and acrylic ester resin or their copolymers as well as styrene-butadiene copolymer, natural rubber, casein, gelatin, rosin ester, terpene resin, phenolic resin, styrene resin, coumarone-indene resin, polyvinyl ether, and silicone resin. The adhesive layer 5" may also be formed of adhesives based on α-cyanoacrylate, silicone, maleimide, styrol, polyolefin, resorcinol, and polyvinyl ether.

Each adhesive layer may be formed by coating and have a thickness of 4 μm to 20 μm.

The second multilayered volume hologram structure of the invention is characterized in that the adhesion of the second adhesive layer 5" is weaker than the adhesion of the first adhesive layer 5' so that the surface protective film 7 can be released from the volume hologram layer 6 upon delamination thereof. To make the adhesion of the second adhesive layer 5" weaker than the adhesion of the first adhesive layer 5', a sensible selection may be made from materials that form the first adhesive layer and materials that form the second adhesive layer.

The adhesion used herein may be given by the peeling strength (Kg/25 mm) of the multilayer structure, and estimated by the 180° peeling test according to JIS Z0237 (using a tensile compression testing machine, e.g., model SV-201-E manufactured by Konno Seisakusho Co., Ltd.). The measuring conditions are the same as mentioned in conjunction with the first multilayered volume hologram structure of the invention.

The adhesion of the second adhesive layer 5" may be estimated by the peeling strength with which the surface protective film 7 is released from the multilayer structure, and may be in the range of 0.001 Kg/25 mm to 0.1 Kg/25 mm, and preferably 0.01 Kg/25 mm to 0.1 Kg/25 mm. The adhesion of the first adhesive layer 5' is stronger than the adhesion of the second adhesive layer 5|, and may be estimated by the peeling strength with which the volume hologram layer 6 is released from the substrate 2 or photograph 4. The peeling strength may be in the range of 0.1 Kg/25 mm to 5.0 Kg/25 mm, and preferably 0.5 Kg/25 mm to 3.0 Kg/25 mm.

Figure 9A:
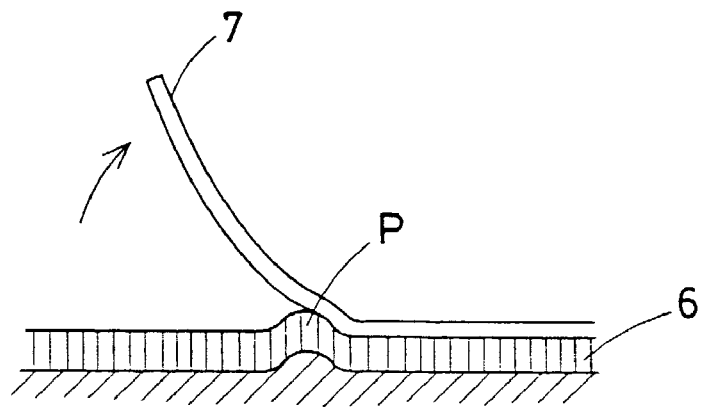
FIG. 9(a) is a sectional view illustrative of how to release the surface protective film from the second multilayered volume hologram structure of the invention.
Figure 9B:
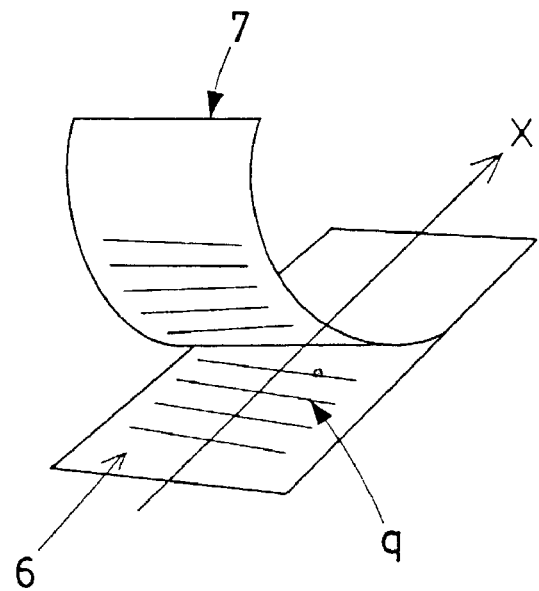
FIG. 9(b) is a perspective view illustrative of the same.

When the adhesion of the second adhesive layer 5| is weaker than the adhesion of the first adhesive layer 5', the volume hologram layer 6 is undulated at a constant interval following a release of the surface protective film 7 therefrom, as shown at p in a schematic representation of FIG. 9(a) with no adhesive layers illustrated. In this case, as shown in a perspective representation of FIG. 9(b), releasing lines q or so-called chatter marks are formed on the volume hologram layer 6 at a constant interval in a direction perpendicular to a releasing direction X.

The second multilayered volume hologram structure of the invention makes use of this phenomenon to prevent falsification. When the hologram recorded in the volume hologram is copied after a release of the surface protective film, the releasing lines are copied at the same time. It is thus possible to tell whether the copy is genuine or spurious. This is also true of when the hologram layer with the releasing lines formed thereon is pasted on another substrate; it is possible to tell whether the hologram layer is genuine or spurious due to the presence of the releasing lines.

Another embodiment of the second multilayered volume hologram structure of the invention is explained with reference to FIG. 8 wherein a colored sheet and a third adhesive layer are indicated at 9 and 5, respectively, and the same numerals as in FIG. 7 indicates the same parts.

As shown in FIG. 8, the second embodiment of the second multilayered volume hologram structure of the invention comprises a colored sheet laminated on a substrate with a third adhesive layer 5 interleaved therebetween. A first adhesive layer 5', a volume hologram layer 6, a second adhesive layer 5" and a surface protective film 7 are laminated on the colored sheet in the described order.

For the colored sheet 9, for instance, use may be made of a polyester, triacetyl cellulose, polypropylene or acrylic film colored with a dye or pigment having no adverse influence on the volume hologram layer. When it is required to see a photograph 4 or the like through the colored sheet, a transparent colored sheet may be used, and when it is not required, an opaque colored sheet may be used. The colored sheet may have a thickness of 10 μm to 100 μm. If the colored sheet 9 having a color different from or in complementary relation to the color of the hologram or a black color is interleaved in the multilayered structure, it is then possible to enhance the contrast of a hologram image.

The third adhesive layer 5 may be formed of the same material for the first adhesive layer, and have an adhesion equivalent to that of the first adhesive layer 5'.

In this embodiment, it is preferable that the first and second adhesive layers, volume hologram layer and surface protective film are all transparent.

A label for making the second multilayered volume hologram structure of the invention is explained with reference to FIGS. 10(a) and 10(b) that are sectional views thereof.

In FIGS. 10(a) and 10(b), a label for making the multilayered volume hologram structure and a release paper are indicated at 20 and 11, respectively. The same numerals as in FIGS. 7 and 8 indicate the same parts.

A label 20 of FIG. 10(a) comprises a first adhesive layer 5', a volume hologram layer 6, a second adhesive layer 5" and a surface protective layer 7 laminated on the release paper 11 in the described order.

For the release paper 11, use may be made of the same release paper as mentioned in conjunction with the label for making the first multilayered volume hologram structure of the invention. The label, from which the release paper is removed, is laminated at the first adhesive layer 5' on a substrate 2 with a photograph or the like pasted thereon, so that the multilayered volume hologram structure shown in FIG. 7 can be fabricated.

A label 20 of FIG. 10(b) comprises a third adhesive layer 5, a colored sheet 9, a first adhesive layer 5', a volume hologram layer 6, a second adhesive layer 5" and a surface protective film 7 laminated on the release paper 11 in the described order.

To laminate the label 20 on a substrate 2 such as a certificate or credit card, the label 20, from which the release paper is removed, is laminated at the third adhesive layer 5 on the substrate 2, so that the multilayered volume hologram structure shown in FIG. 8 can be obtained.

In what follows, the second multilayered volume hologram structure of the invention and the label for making the same will be explained with reference to illustrative examples 4 and 5.

Illustrative Example 4

Preparation of Hologram-Recorded Material

A Lippmann hologram was recorded on a hologram recording medium obtained by laminating a hologram recording material layer (a 20 μm thick Omnidex 706 made by Du Pont) and a polyvinyl chloride film on a polyethylene terephthalate film in the described order.

Preparation of Silicone Separator/First Adhesive Layer 5'

An adhesive agent (Nissetsu PE-118 made by Nippon Carbide Co., Ltd.) was coated by die coating on a silicone separator (a 50 μm thick SP-PET made by Tokyo Cellophane Paper Co., Ltd.) at a dry thickness of 20 μm.

Surface Protective Film/Second Adhesive Layer 5"/Silicone Separator

A PET/acrylic adhesive layer/silicone separator (Sanitechto H225E made by Sanei Kaken Co., Ltd.) structure was provided.

Preparation of Label for Multilayered Volume Hologram Structure-Making Label

The polyvinyl chloride film was removed from the hologram-recorded material, and the aforesaid silicone separator/first adhesive layer 5' was laminated on the hologram-recorded material to obtain a PET film/hologram layer/silicone separator multilayer structure.

The PET film was removed from this multilayer structure while the silicone separator was removed from the aforesaid surface protective layer/second adhesive layer 5"/silicone separator structure. Then, lamination was carried out to obtain a label for the fabrication of the multilayered volume hologram structure of the invention, which comprised a surface protective film/second adhesive layer 5"/hologram layer 6/first adhesive layer 5'/silicone separator structure, and is shown in FIG. 10(a).

Preparation of Multilayered Volume Hologram Structure

The label, from which the silicone separator was removed, was laminated at the first adhesive layer 5' on a paper substrate with a photograph pasted thereon, as shown in FIG. 7.

After this multilayered volume hologram structure was allowed to stand alone for 24 hours, the surface protective film 7 was stripped therefrom.

FIG. 11 is a graphical representation illustrative of the state of a peeling strength change upon a release of the surface protective film from the multilayered volume hologram structure. The state shown at (a) in FIG. 11 corresponds to areas with releasing lines formed at intervals of 2 to 4 mm. Even after the surface protective film-was re-laminated at the original position, the releasing lines were clearly visible.

Illustrative Example 5

The second multilayered volume hologram structure and a label for making the same were prepared as in illustrative example 4 with the exception that the following silicone separator/third adhesive layer 5/colored sheet/first adhesive layer 5' structure was used in place of the silicone separator/first adhesive layer 5' used for the fabrication of the aforesaid multilayered volume hologram structure-making label.

Preparation of Silicone Separator/Third Adhesive Layer 5/Colored Sheet/First Adhesive Layer 5'

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm, and a transparent colored sheet (a 50 μm thick PET film dyed in red) was laminated on the adhesive layer. Then, an adhesive agent (Nissetsu PE-118 made by Nippon Carbide Co., Ltd.) was coated on the transparent colored sheet at a thickness of 20 μm.

The thus obtained label for making the second multilayered volume hologram structure, from which the silicone separator was removed, was laminated at the third adhesive layer on a substrate comprising a paper substrate with a photograph pasted thereon, as shown in FIG. 8.

After the multilayered volume hologram structure was allowed to stand alone for 24 hours, the surface protective film 7 was stripped therefrom.

After the release of the film 7, the surface of the hologram layer was found to have releasing lines at intervals of 2 to 4 mm. Even after the surface protective film was re-laminated at the original position, the releasing lines were clearly visible.

Then, the third multilayered volume hologram structure of the invention and the label for making the same is explained.

The third multilayered volume hologram structure of the invention is explained with reference to FIG. 1 that is a front view of the first multilayered volume hologram structure of the invention. It is here to be noted that FIG. 12 is a sectional view one embodiment of the third multilayered volume hologram structure as taken along the A-A line in FIG. 1, and FIG. 13 is a sectional view illustrative of another embodiment of the third multilayered hologram structure.

Figure 12:
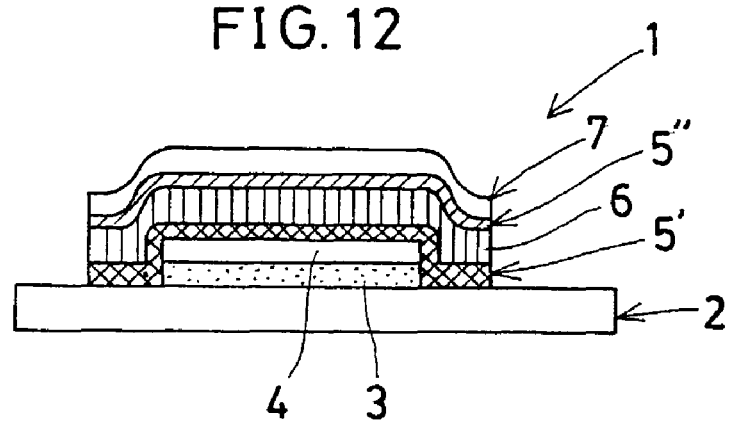
FIG. 12 is a sectional schematic illustrative of one embodiment of the third multilayered volume hologram structure of the invention.
Figure 13:
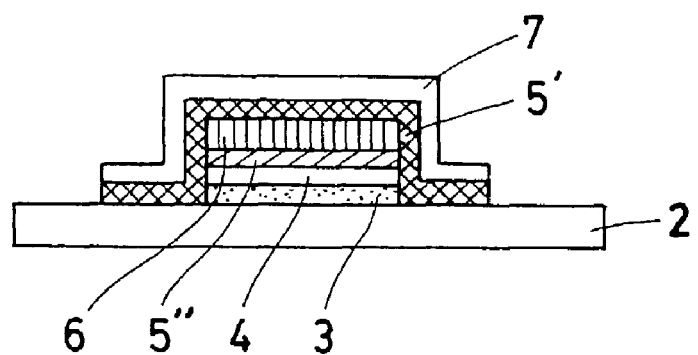
FIG. 13 is a sectional schematic illustrative of another embodiment of the third multilayered volume hologram structure of the invention.

In FIGS. 12 and 13, reference numerals 5' and 5" represent a heat sealing layer and an adhesive layer, respectively, and the same numerals as in FIG. 2 indicate the same part.

As shown in FIG. 12, the third multilayered volume hologram structure comprises a substrate 2 and a photograph of face or information area 4 pasted on the substrate 2 with a photographic paste 3. A heat sealing layer 5', a volume hologram layer 6, an adhesive layer 5" and a surface protective film 7 are laminated on the substrate 2 and astride the information area or photograph of face 4 in the described order.

The substrate 2, photographic paste 3, photograph of face or information area 4, volume hologram layer 6 and surface protective film 7 are the same as those used with the first multilayered volume hologram structure of the invention.

The heat sealing layer 5, for instance, may comprise ethylene-vinyl acetate copolymer resin, polyamide resin, polyester resin, polyethylene resin, ethylene-isobutyl acrylate copolymer resin, butyral resin, polyvinyl acetate and its copolymer resin, cellulose derivatives, polymethyl methacrylate resin, polyvinyl ether resin, polyurethane resin, polycarbonate resin, polypropylene resin, epoxy resin, phenol resin, thermoplastic elastomers such as SBS, SIS, SEBS and SEPS, or reaction hot-melt resins, and has preferably a thickness of 4 μm to 20 μm.

The adhesive layer 5", for instance, may again be formed of acrylic resin, and acrylic ester resin or their copolymers as well as styrene-butadiene copolymer, natural rubber, casein, gelatin, rosin ester, terpene resin, phenolic resin, styrene resin, coumarone-indene resin, polyvinyl ether, and silicone resin. The adhesive layer 5" may also be formed of adhesives based on α-cyanoacrylate, silicone, maleimide, styrol, polyolefin, resorcinol, and polyvinyl ether. This adhesive layer has preferably a thickness of 4 μm to 20 μm.

What has been described in conjunction with the first multilayered volume hologram structure holds for the surface protective film 7. As a matter of course or in view of thermal deformation temperature, melting point, etc., however, this surface protective film should be stable with respect to the heat applied for heat sealing.

Upon lamination, a heating roll or the like is used to heat seal the third multilayered volume hologram structure of the invention all over the surface thereof, but preferably only at the whole peripheral end portion thereof. The heat sealing is carried out under a temperature condition of 100° C. to 180° C., and preferably 120° C. to 160° C., at which the influence of heating on the volume hologram layer is substantially reduced.

The adhesive force between the volume hologram and the substrate obtained by the heat sealing layer 5' is so high that the volume hologram layer can be bonded to the substrate while it is embedded in the heat sealing layer. If the surface protective film should be forcibly stripped from the multilayered volume hologram structure, therefore, the volume hologram layer would fracture into two portions, one opposing to the surface protective film and the other opposing to the substrate. It is thus absolutely impossible to falsify the volume hologram layer, and the substrate such as a photograph.

Then, another embodiment of the third multilayered volume hologram structure of the invention is explained with reference to FIG. 13 that is a sectional view thereof, and FIG. 14 that is a plan view of a heat-sealed portion.

As can be seen from FIG. 13, the second embodiment of the third multilayered volume hologram structure comprises a surface protective film 7 and a volume hologram layer 6 having an area smaller than that of the surface protective film 7, so that the volume hologram layer can be laminated on substrates 2 and 4 such as a certificate while it is entirely covered by the surface protective film. As hatched in FIG. 14, only the whole peripheral end portion of the multilayered volume hologram structure including the whole peripheral portion of the volume hologram layer 5 is heat sealed.

In this multilayered structure, the adhesive force between the volume hologram layer and the substrates obtained by the heat-sealed portion is very high, and so is the adhesive force between the heat-sealed portion and the volume hologram layer. If the surface protective film should be forcibly stripped from the multilayered structure, therefore, the volume hologram layer would break down certainly. Thus, if the photographic substrate should be falsified, a partial release of the volume hologram layer would be so easily detected that the falsification of the substrate would be absolutely impossible.

In this embodiment, it is preferable that the heat sealing layer, adhesive layer, volume hologram layer and surface protective film are all transparent.

A label for making the third multilayered volume hologram structure of the invention is explained with reference to FIG. 15 that is a sectional view illustrative of the layer construction thereof.

Figure 14:
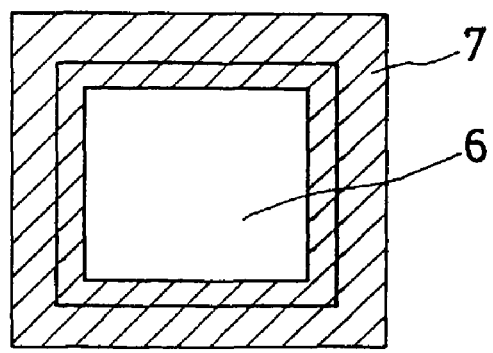
FIG. 14 is a schematic illustrative of the heat-sealed portion in the second embodiment of the third multilayered volume hologram structure of the invention.
Figure 15:
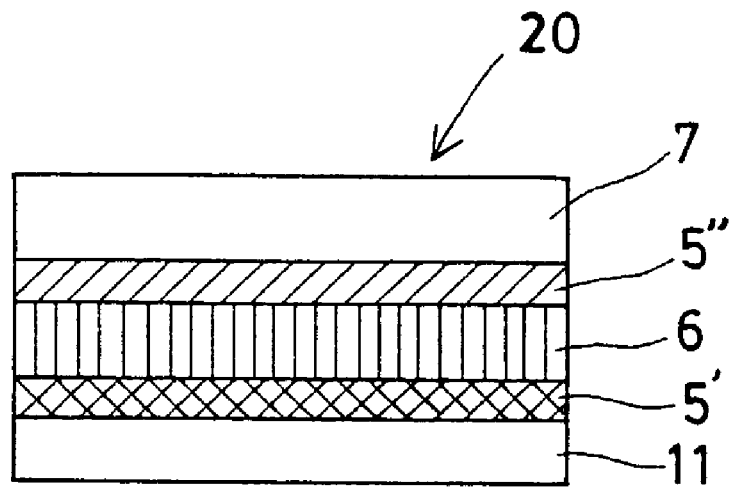
FIG. 15 is a schematic illustrative of one embodiment of the label for making the third multilayered volume hologram structure of the invention.

In FIG. 15, reference numerals 20 and 11 represent a label for making the third multilayered volume hologram structure and a release paper, respectively, and the same numerals as in FIGS. 12 to 14 indicate like the same parts.

A label 20 of FIG. 15 comprises a heat sealing layer 5', a volume hologram layer 6, an adhesive layer 5" and a surface protective film 7 laminated on the release paper 11 in the described order. When the heat sealing layer 5 is free of adhesion, the release paper 11 may be dispensed with.

For the release paper 11, use may be made of the same materials as mentioned in conjunction with the label for making the first multilayered volume hologram structure of the invention. The label, from which the release paper is removed, is laminated at the heat sealing layer 5' on a substrate 2 with a photograph, etc. pasted thereon, so that the multilayered volume hologram structure shown in FIG. 12 can be fabricated.

Figure 16:
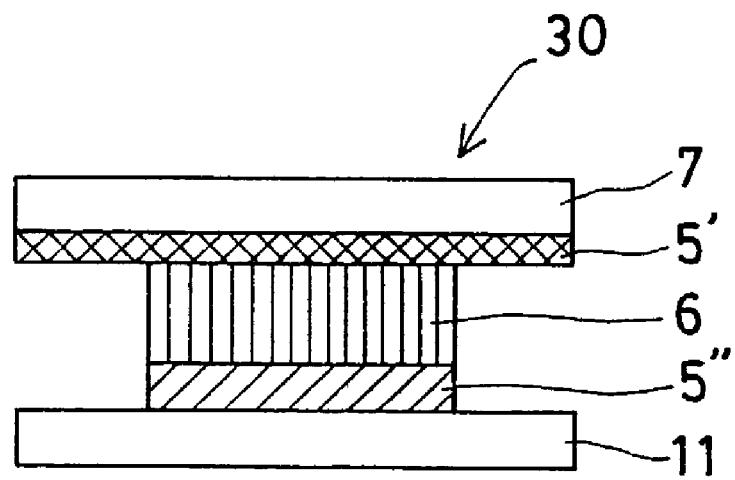
FIG. 16 is a schematic illustrative of another embodiment of the label for making the third multilayered volume hologram structure of the invention.

A label 30 shown in FIG. 16 comprises an adhesive layer 5", a volume hologram layer 6, a heat sealing layer 5' and a surface protective film 7 laminated on the release paper 11 in the described order. The surface protective film 7 is of such size that the hologram layer 6 is covered thereby to the whole periphery, as shown in FIG. 13. Upon a release of the release paper 11, the label 30 is laminated at the adhesive layer 5" on a substrate 2 with a photograph, etc. pasted thereon, and then heat sealed, so that the multilayered volume hologram structure shown in FIG. 13 can be fabricated.

In what follows, the third multilayered volume hologram structure of the invention and the label for making the same will now be explained with reference to illustrative examples 6, 7 and 8.

Illustrative Example 6

Preparation of Hologram-Recorded Material

A Lippmann hologram was recorded on a hologram recording medium obtained by laminating a hologram recording material layer (a 20 μm thick Omnidex 706 made by Du Pont) and a polyvinyl chloride film on a polyethylene terephthalate film in the described order.

Preparation of Silicone Separator/Heat Sealing Layer

A heat sealing film [polyethylene film or Lix Film LIX-2 (30 μm) made by Toyobo Co., Ltd.] was laminated on a silicone separator (a 50 μm thick SP-PET made by Tokyo Cellophane Paper Co., Ltd.).

Surface Protective Film/Adhesive Layer/Silicone Separator

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm, and a non-stretched ethylene-vinyl alcohol copolymer film (a 25 μm thick Eval EF-F made by Kuraray Co., Ltd.) was then laminated on the surface of the adhesive layer.

Preparation of Multilayered Volume Hologram Structure-Making Label

The polyvinyl chloride film was removed from the hologram-recorded material, and the aforesaid silicone separator/heat sealing layer was laminated on the hologram-recorded material to obtain a PET film/hologram layer/heat sealing layer/silicone separator multilayered structure.

The PET film was removed from this multilayered structure while the silicone separator was removed from the aforesaid surface protective layer/adhesive layer/silicone separator structure. Then, lamination was carried out to obtain a label for the fabrication of the multilayered volume hologram structure of the invention, which comprised a surface protective film/adhesive layer/hologram layer/heat sealing layer/silicone separator structure.

Preparation of Multilayered Volume Hologram Structure

Upon removal of the silicone separator, the label was laminated at the heat sealing layer on a substrate with a photograph pasted thereon, as shown in FIG. 12.

Using a heating roll, the multilayered volume hologram structure was heat sealed all over the surface at 150° C. for 15 seconds.

After the multilayered volume hologram structure was allowed to stand alone, the hologram layer broken down into a hologram layer piece released together with the surface protective film and a hologram layer piece heat sealed onto the substrate. The photograph could not be released from the substrate without a breakdown of the substrate.

Illustrative Example 7

The third multilayered volume hologram structure was prepared as in illustrative example 6 with the exception that the following surface protective film/adhesive layer/silicone separator structure was used.

Surface Protective Film/Adhesive Layer/Silicone Separator

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm, and a tetrafluoroethylene-perfluoroalkylvinyl ether copolymer film (a 25 μm thick Toyofulone made by Toray Industries, Inc.) was then laminated on the surface of the adhesive layer.

The obtained label for making the multilayered volume hologram structure was used as in illustrative example 6 to prepare a multilayered volume hologram structure.

The multilayer was forcibly stripped from the multilayered structure as in illustrative example 6. The hologram layer broken down into a hologram layer piece released together with the surface protective film and a hologram layer piece heat sealed onto the substrate. The photograph could not be stripped from the substrate without a breakdown of the substrate.

Illustrative Example 8

Preparation of Hologram-Recorded Material

A Lippmann hologram was recorded on a hologram recording medium obtained by laminating a hologram recording material layer (a 20 μm thick Omnidex 706 made by Du Pont) and a polyvinyl chloride film on a polyethylene terephthalate film in the described order.

Preparation of Silicone Separator/Adhesive Layer

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm.

Preparation of Surface Protective Film/Heat Sealing Layer/Silicone Separator

A heat sealing film [a biaxially stretched polypropylene film or Trefan BOM114 made by Toray Industries, Inc.] and a non-stretched ethylene-vinyl alcohol copolymer film (a 12 μm thick Eval EF-F made by Kuraray Co., Ltd.) were laminated on the silicone separator (a 50 μm thick SP-PET made by Tokyo Cellophane Paper Co., Ltd.) in the described order.

Preparation of Multilayered Volume Hologram Structure-Making Label

The aforesaid silicone separator/adhesive layer structure was laminated on the aforesaid hologram-recorded material from which the polyvinyl chloride film was removed to obtain a PET film/hologram layer/adhesive layer/silicone separator multilayer structure.

The PET film was released from the multilayer structure while the silicone separator was released from the surface protective film/heat sealing layer/silicone separator structure. Lamination was carried out as in FIG. 16 to obtain the multilayered volume hologram structure-making label shown in FIG. 16 comprising a surface protective film/heat sealing layer/hologram layer/adhesive layer/silicone separator structure.

Preparation of Multilayered Volume Hologram Structure

Upon removal of the silicone separator, the label was laminated at the adhesive layer on a substrate with a photograph pasted thereon, as shown in FIG. 13.

After this lamination, heat sealing was carried out at 140° C. for 20 seconds, so that the volume hologram layer was covered with the surface protective film to the whole peripheral end thereof and the surface protective film was laminated on a substrate for a certificate or the like, whereby only the whole peripheral end of the multilayered volume hologram structure including the whole peripheral end of the volume hologram layer was heat sealed.

After the multilayered volume hologram structure was allowed to stand alone, the hologram layer broken down into a hologram layer piece released together with the surface protective film and a hologram layer piece remaining heat-sealed onto the substrate.

Then, the fourth multilayered volume hologram structure of the invention and the label for making the same is explained.

One embodiment of the fourth multilayered volume hologram structure of the invention is now explained with reference to FIG. 17($a$) that is a sectional view thereof.

In FIG. 17($a$), the same numerals as in FIG. 2 indicate the same parts. Between a substrate 2 and a first adhesive layer 5' there are interleaved a photograph and a personal information area although not illustrated. Regions indicated at S have strong adhesive force while regions indicated at W have weak adhesive force.

The substrate 2, a volume hologram layer 6 and a surface protective film 7 are the same as those in the first multilayered volume hologram structure of the invention.

Each of the first and second adhesive layers 5' and 5" has an adhesive force profile in its own plane rather than is uniformly coated thereon with only one adhesive agent. In other words, the adhesive layer is divided into regions (S) having strong adhesive force and regions (W) having weak adhesive force.

Shown in FIG. 17($b$) is such an adhesive force profile. FIG. 17($a$) is a view of the second adhesive layer 5" as taken along a direction shown by A in FIG. 17($a$). For instance, hatched regions S are formed of an adhesive agent having strong adhesive force while unhatched regions W are formed of an adhesive agent having weak adhesive force. That is, the second adhesive layer 5" has a striped adhesive force profile in its own plane. Since the adhesive agent is transparent or of the same color, however, such a striped adhesive force profile as depicted in FIG. 17($b$) is invisible.

This also holds for the first adhesive layer 5'. As shown in FIG. 17($a$), it is preferable that regions of the layer 5' opposing to the regions of the layer 5" having strong adhesive force are formed of an adhesive agent having weak adhesive force while regions of the layer 5" opposing to the regions of the layer 5" having weak adhesive force are formed of an adhesive agent having strong adhesive force.

For the adhesive agents used herein various adhesive agents are known, for instance, elastomer adhesives such as those based on natural rubber, reclaimed rubber, chloroprene rubber, nitrile rubber, styrene-butadiene rubber and thermoplastic elastomer; synthetic resin adhesives such as those based on epoxy resin and polyurethane; reaction type acrylic adhesives; chemical reaction type adhesives such as those based on cyanoacrylate; UV curing type adhesives; EB curing type adhesives; hot melt adhesives such as those based ethylene-vinyl acetate copolymer resins; hot melt adhesives such as those based on polyamide, polyester, thermoplastic elastomer and reaction type hot melts; aqueous adhesives or water-soluble adhesives; emulsion adhesives; latex adhesives; and inorganic adhesives. To make a difference in the adhesive force of the adhesive agent, it is preferable to vary the composition, and composition ratio of the adhesive agent.

For instance, the first adhesive layer 5' and the second adhesive layer 5" are each allowed to have an adhesive force profile in its own plane by the pattern-wise coating of an acrylic adhesive agent and a silicone adhesive agent. By reducing or increasing the amount of a tackifier resin known-as an adhesion improver, too, it is possible to impart an adhesive force profile to each adhesive layer.

When, for instance, the volume hologram layer 6 is forcibly stripped from the multilayered volume hologram structure in a direction indicated by B in FIG. 17(*a*), the volume hologram layer breaks down as shown in FIG. 18, because the volume hologram layer is attracted by the adhesive layer having stronger adhesive force. Regarding FIG. 18, it is to be noted that the hatched regions (S) of the first adhesive layer 5', and the second adhesive layer 5" are stronger in adhesive force than the unhatched regions (W).

If the volume hologram layer 6 should be forcibly stripped from the multilayered volume hologram structure, the volume hologram layer would break down or otherwise deform. Thus, even when such a defective volume hologram layer is copied or pasted on another substrate for falsification, it is possible to easily tell whether it is genuine or spurious.

Thus, the ability of the fourth multilayered volume hologram structure to prevent falsification is much higher than would be achievable so far in the art.

Another embodiment of the fourth multilayered volume hologram structure is explained below. However, the same parts as in FIG. 17 are indicated by the reference numerals, and so are not explained.

Figure 19:
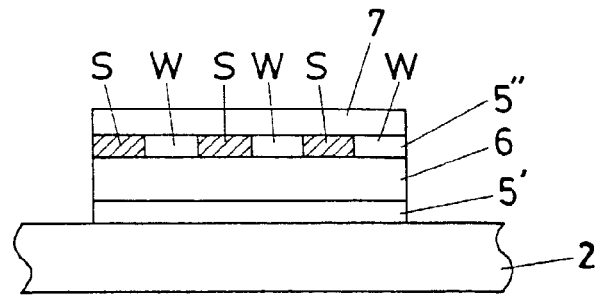
FIG. 19 is a schematic illustrative of the second embodiment of the fourth multilayered volume hologram structure of the invention.

FIG. 19 is a sectional view of the second embodiment of the fourth multilayered volume hologram structure, which is identical with the first embodiment of FIG. 17(*a*) with the exception that a first adhesive layer 5' is uniformly formed by the coating of a single adhesive agent.

Figure 20:
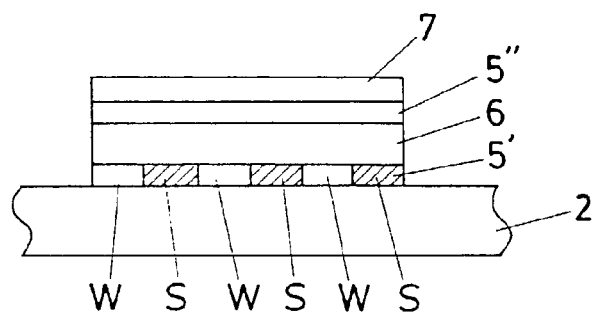
FIG. 20 is a schematic illustrative of the third embodiment of the fourth multilayered volume hologram structure of the invention.

FIG. 20 is a sectional view of yet another embodiment of the fourth multilayered volume hologram structure, which is identical with the first embodiment of FIG. 17(*a*) with the exception that a second adhesive layer 5' is uniformly formed by the coating of a single adhesive agent.

In these embodiments, either one of the first and second adhesive layers may have an adhesive force profile in its own plane. Alternatively, both the first and second adhesive layers have an adhesive force profile in their own planes.

In the foregoing embodiments, the adhesive layer(s) is allowed to have an adhesive force profile in its own plane by a striped array of adhesive agents having strong, and weak adhesive force. Alternatively, the adhesive force profile in the plane of the adhesive layer may be obtained as shown in FIG. 21.

Figure 21A:
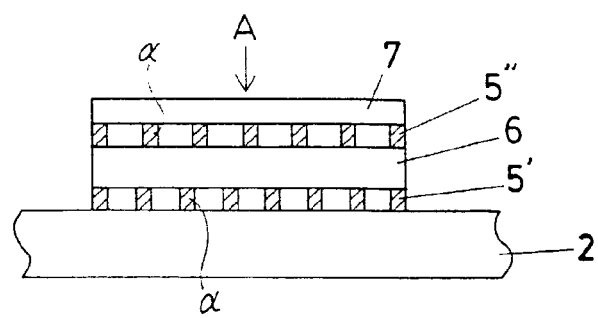
FIGS. 21(a) and 21(b) are schematics illustrative of the fourth embodiment of the fourth multilayered volume hologram structure of the invention.
Figure 21B:
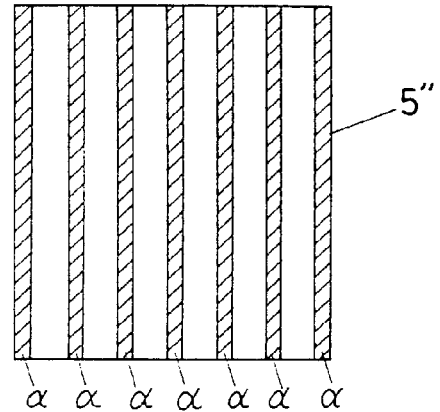

FIG. 21(*a*) is a sectional view of a further embodiment of the fourth multilayered volume hologram structure, wherein a first adhesive layer 5' and a second adhesive layer 5" are each coated with a striped array of adhesives only at hatched regions α. FIG. 21(*b*) is a sectional view of the second adhesive layer 5" as taken along a direction shown by A in FIG. 21(*a*). This also holds for the first adhesive layer 5'.

Even with this arrangement, it is evident that the adhesive force profile can be imparted to the plane of the first adhesive layer 5', and the second adhesive layer 5". If the volume hologram layer 6 should be forcibly stripped from the multilayered volume hologram structure, therefore, the volume hologram layer break down or the pattern of the adhesive layers would break down. Thus, even when such a defective volume hologram layer is copied or pasted on another substrate for falsification, it is possible to easily tell whether it is genuine or spurious.

In FIG. 21, the adhesive force profile is imparted to the planes of both the adhesive layers. As a matter of course, however, it is acceptable to impart the adhesive force profile to the plane of either one of the adhesive layers. While the four embodiments of the fourth multilayered volume hologram structure have been described, it is to be understood that the invention is not limited thereto, and so many modifications may be made without departing from the scope of the invention. For instance, the profile pattern of the adhesive force in the plane of the adhesive layer is not limited to those mentioned above, and so may be determined as desired.

In these embodiments, it is preferable that the adhesive layers, volume hologram layer and surface protective film in the fourth multilayered volume hologram structure are all transparent.

When the fourth multilayered volume hologram structure of the invention is fabricated, a label for making the same is used.

The label for making the fourth multilayered volume hologram structure of the invention comprises a release paper 11, and a first adhesive layer, a volume hologram layer, a second adhesive layer and a surface protective film laminated on the release paper 11 in the described order, wherein at least one of said first and second adhesive layers is allowed to have an adhesive force profile in its own plane.

The release paper 11 used herein may be the same as that for the first multilayered volume hologram structure of the invention. Upon removal of this release paper, the label is laminated at the first adhesive layer 5' on a substrate 2 with a photograph, etc. pasted thereon, so that the fourth multilayered volume hologram structure can be fabricated.

Next, the fifth multilayered volume hologram structure of the invention and the label for making the same are explained.

The fifth multilayered volume hologram structure of the invention is explained with reference to FIG. 1 that is a front view of the first multilayered volume hologram structure of the invention as well as FIG. 22 that is a sectional view of the fifth multilayered volume hologram structure as taken along the A-A line in FIG. 1 and FIG. 23 that is a sectional view of another embodiment of the fifth multilayered volume hologram structure.

Figure 22:
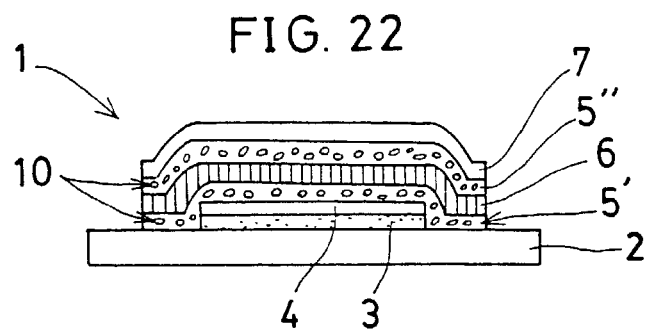
FIG. 22 is a schematic illustrative of one embodiment of the fifth multilayered volume hologram structure of the invention.
Figure 23:
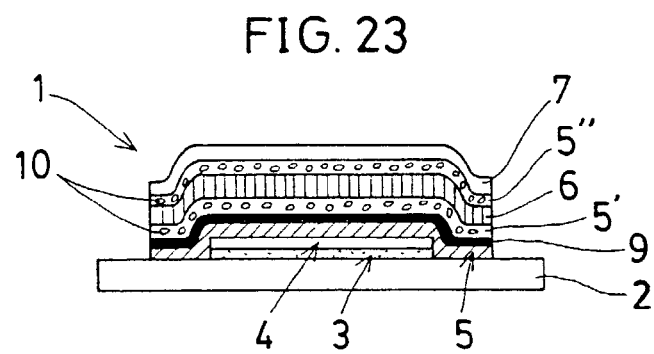
FIG. 23 is a schematic illustrative of another embodiment of the fifth multilayered volume hologram structure of the invention.

In FIGS. 22 and 23, a third adhesive layer, a first adhesive layer, a second adhesive layer, a colored sheet, and a microcapsule are indicated at 5, 5', 5", 9, and 10 respectively, and the same numerals as in FIG. 2 indicate the same parts.

As can be seen from FIG. 22, the fifth multilayered volume hologram structure comprises a personal information area and photograph of face 4 pasted on a substrate 2 with a photographic paste 3. The first adhesive layer 5' containing microcapsules 10, volume hologram layer 6, adhesive layer 5" containing microcapsules 10 and surface protective layer 7 are laminated on the substrate 2 and astride photograph 4 in the described order.

The substrate 2, photographic paste 3, photograph of face and personal information area 4, volume hologram layer 6 and surface protective film 7 are the same as those in the first multilayered volume hologram structure of the invention.

In the fifth multilayered volume hologram structure of the invention, the first and second adhesive layers 5' and 5" are each comprised of an adhesive agent and a microcapsule in which a volume hologram layer-breaking material is encapsulated in a skin material selected from various polymer materials.

The adhesive layer used herein is formed of acrylic resin, acrylic ester resin, and vinyl acetate resin or their copolymers as well as styrene-butadiene copolymer, natural rubber, casein, gelatin, rosin ester, terpene resin, phenolic resin, styrene resin, coumarone-indene resin, polyvinyl ether, and silicone resin. The adhesive layer 5 may also be formed of adhesives based on α-cyanoacrylate, silicone, maleimide, styrol, polyolefin, resorcinol, and polyvinyl ether.

Each or the microcapsule has a capsule structure in which the volume hologram layer-breaking material is encapsulated in the skin material selected from various polymer materials. The microcapsule breaks down simultaneously with a release of the volume hologram layer, and the volume hologram layer-breaking material therein is released in the adhesive layer to solubilize or swell the volume hologram layer, so that the hologram recorded in the volume hologram layer can break down.

When the volume hologram layer-forming material is composed of the matrix polymer, photopolymerizable compound, photopolymerization initiator and sensitizing dye, all already explained in detail, it is preferable to use as the volume hologram layer-breaking material an organic solvent in which the volume hologram layer-forming material is soluble and/or a plasticizer that has a swelling action on the volume hologram layer.

Exemplary such organic solvents are acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, and isopropanol, or mixtures thereof.

The plasticizers having a swelling action on the volume hologram layer, for instance, include polyhydric alcohols such as ethylene glycol, diethylene glycol, triethylene glycol, glycerin, and trimethylolpropane; and phthalic ester plasticizers such as dimethyl phthalate (DMP), diethyl phthalate (DEP), dibutyl phthalate (DBP), heptylnonyl phthalate (HNP), di(2-ethylhexyl) phthalate (DOP), di(n-octyl) phthalate (DNOP), di(i-octyl) phthalate (DCapP), (79 alkyl) phthalate (D79P), di(i-decyl) phthalate (DIDP), di-tridecyl phthalate (DTDP), dicyclohexyl phthalate (DCHP), butylbenzyl phthalate (BDP), ethyl phthalyl ethyl glycolate (DPEG), and butyl phthalyl butyl glycolate (BPBG); aliphatic dibasic acid ester plasticizers such as di(2-ethylhexyl) adipate (DOA), di(methylcyclohexyl) adipate, di-isodecyl adipate (DIDA), di(n-hexyl) azelate (DNHZ), di-2-ethylhexyl azelate (DOZ), dibutyl sebacate (DBS) and di(2-ethylhexyl) sebacate (DOS); citric ester plasticizers such as triethyl citrate (TEC), tributyl citrate (TBC), acetyl triethyl citrate (ATEC) and acetyl tributyl citrate (ATBC); epoxy plasticizers such as epoxidized soy bean oil; and phosphoric ester plasticizers such as tributyl phosphate (TBP), triphenyl phosphate (TPP), tricresyl phosphate (YCP) and tripropylene glycol phosphate. Mixtures of the plasticizers mixed with or dissolved in the organic solvents may also be used.

The skin materials used herein for microcapsule formation, for instance, include gum arabic; acrylic high-molecular compounds such as polyacrylamide, polyacryldextrin, poly (alkylcyano) acrylate and polymethyl methacrylate; agar and agarose; albumin; alginates such as calcium alginate and sodium alginate; aluminum monostearate; carboxy monostearate; carboxyvinyl high-molecular compounds; epoxy resin; cellulose derivatives such as cellulose acetate, cellulose acetate butyrate, cellulose acetate phthalate, cellulose nitrate, ethyl cellulose, hydroxypropyl cellulose, hydroxypropylmethyl cellulose, hydroxypropylmethyl cellulose phthalate, methyl cellulose, sodium carboxymethyl cellulose and nitrocellulose; cetyl alcohol; dextrin; gelatin; hydrogenated tallow; hydrogenated castor oil; 12-hydroxystearyl alcohol; gluten; glycerin monopalmitate and glycerin dipalmitate; glycerin monostearate, glycerin distearate and glycerin tristearate; myristyl alcohol; nylon 6, nylon 7, nylon 8, nylon 9 and nylon 10; poly(adipyl L-lysine); polyterephtalamide; poly(terephthaloyl L-lysine); polyurea; polyurethane; polyisoprene; polyether; polyethylene; polypropylene; poly(α-caprolactone); polydimethylsiloxane; polyester; polyethylene glycol; poly(ethylene-vinyl acetate); polyglycolic acid; polylactic acid; polyglutamic acid; polysiloxane; polybutadiene; polylysine; poly(methyl vinyl ethermaleic anhydride); polystyrene; polyvinyl acetate phthalate; polyvinyl alcohol; polyvinyl pyrrolidone; shellac; starch and its derivatives; stearic acid; stearyl alcohol; waxes such as beewax, carnauba wax, Japan wax, paraffin wax and spermaceti; and inorganic silicates.

As a matter of course, these materials to form the skin material of the microcapsule should not be dissolved in the volume hologram layer-breaking material or the adhesive layer component. Another requirement for the materials is to have such a strength that they break down upon a release of the adhesive layer.

The microcapsule may be prepared by known polymerization processes such as interface polymerization, in situ polymerization, and coacervation, and have a diameter of 0.001 µm to 20 µm, and preferably 0.01 µm to 1 µm. A microcapsule having too small a diameter is not preferable because it fails to break down effectively. A microcapsule having too large a diameter is again not preferred because it renders the formation of the adhesive layer by coating difficult, or it may often break down.

The microcapsules are used in an amount of 1 part by weight to 100 parts by weight, and preferably 10 parts by weight to 50 parts by weight per 100 parts by weight of the adhesive agent. The adhesive layer may be formed by the mixing and dispersion of the microcapsules with and in the adhesive layer-forming material. For coating, use may be made of suitable coating processes such as dip coating, die coating, spray coating, roll coating, and gravure coating.

Each adhesive layer has preferably a thickness of 4 µm to 20 µm as measured upon coating.

Next, another embodiment of the fifth multilayered volume hologram structure according to the invention is explained with reference to FIG. 23. In FIG. 23, reference numerals 9 and 5 represent a colored sheet and a third adhesive layer, respectively, and the same reference numerals as in FIG. 22 indicate the same parts or elements.

As can be seen from FIG. 23, the second embodiment of the fifth multilayered volume hologram structure according to the invention comprises a substrate and a colored sheet 9 with the third adhesive layer 5 interleaved therebetween. A first adhesive layer 5' containing microcapsules, a volume hologram layer 6, a second adhesive layer 5" containing microcapsules and a surface protective film 7 are laminated on the colored sheet 9 in the described order.

For the colored sheet 9 use may be made of a polyester, triacetyl cellulose, polypropylene or acrylic film dyed with a dye or pigment that has no adverse influence on the volume hologram recorded layer. When it is required to see something through the colored sheet as in the case where it is laminated on the photograph as shown in FIG. 3, the colored sheet must be transparent although depending on the type of the substrate on which the colored sheet is to be laminated. When this is not required, an opaque colored sheet may be used. The colored sheet has preferably a thickness of 10 μm to 100 μm.

When a black colored sheet having a color different from or in complementary relation to the color of the hologram is used as the colored sheet 9, it is possible to enhance the contrast of the hologram image.

It is not always required to incorporate microcapsules in the third adhesive layer 5 between the colored sheet 9 and the substrate 2; the third adhesive layer 5 may be formed of the aforesaid adhesive layer-forming material as is the case with the first adhesive layer 5', and the second adhesive layer 5".

In this embodiment of the fifth multilayered volume hologram structure, it is preferred that the first and second adhesive layers, each containing microcapsules, volume hologram layer and surface protective film are all transparent.

Figure 24A:
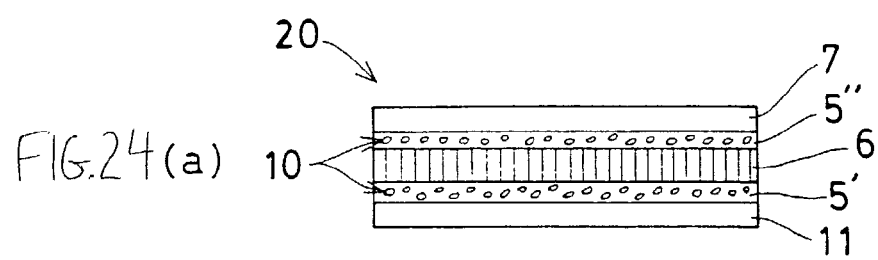
FIGS. 24(a) and 24(b) are schematics illustrative of the label for making the fifth multilayered volume hologram structure of the invention.

Next, a label for making the fifth multilayered volume hologram structure according to the invention is explained with reference to FIGS. 24(*a*) and 24(*b*) that are sectional views of the multilayered construction thereof. In FIGS. 24(*a*) and 24(*b*), reference numerals 20 and 11 represent a label for making the multilayered volume hologram structure and a release paper, respectively, and the same reference numerals as in FIGS. 22 and 23 indicate the same parts.

A label 20 of FIG. 24(*a*) comprises a first adhesive layer 5' containing microcapsules, a volume hologram layer 6, a second adhesive layer 5" containing microcapsules and a surface protective film 7 laminated on the release paper 11 in the described order.

The release paper 11 may be the same as mentioned in conjunction with the label for making the first multilayered volume hologram structure of the invention. Upon removal of the release paper, the label is laminated at the first adhesive layer 5' on a substrate 2 with a photograph, etc. pasted thereon, so that the fifth multilayered volume hologram structure can be prepared.

A label 20 of FIG. 24(*b*) comprises a third adhesive layer 5, a colored sheet 9, a first adhesive layer 5' containing microcapsules, a volume hologram layer 6, a second adhesive layer 5" and a surface protective film 7 laminated on the release paper 11 in the described order.

The release paper 11 may be the same as mentioned in conjunction with the label for making the first multilayered volume hologram structure of the invention. Upon removal of the release paper, the label is laminated at the third adhesive layer 5 on a substrate 2 with a photograph, etc. pasted thereon, so that another embodiment of the fifth multilayered volume hologram structure can be prepared.

In what follows, the fifth multilayered volume hologram structure of the invention and the label for making the same will be explained with reference to illustrative examples 9 and 10.

Illustrative Example 9

Preparation of Hologram-Recorded Layer

A Lippmann hologram was recorded on a hologram recording medium obtained by laminating a hologram recording material layer (a 20 μm thick Omnidex 706 made by Du Pont) and a polyvinyl chloride film on a polyethylene terephthalate film in the described order.

Preparation of Silicone Separator/First Adhesive Layer 5'

Fifteen (15) wt. % of microcapsules prepared by an interface polymerization process and having a diameter of 0.5 μm, wherein chloroform was encapsulated in a polyurethane skin material, was dispersed in an adhesive agent (Nissetsu PE-118 made by Nippon Carbide Co., Ltd.), and the thus obtained adhesive layer was then coated by a die coating process on a silicone separator (a 50 μm thick SP-PET made by Tokyo Cellophane Paper Co., Ltd.) at a dry film thickness of 20 μm.

Surface Protective Film/Second Adhesive Layer 5"/Silicone Separator

Fifteen (15) wt. % of microcapsules prepared by an interface polymerization process and having a diameter of 0.5 μm, wherein chloroform was encapsulated in a polyurethane skin material, was dispersed in an adhesive agent (Nissetsu PE-118 made by Nippon Carbide Co., Ltd.), and the thus obtained adhesive layer was then coated by a die coating process on a silicone separator (a 50 μm thick SP-PET made by Tokyo Cellophane Paper Co., Ltd.) at a dry film thickness of 20 μm. Then, a non-stretched ethylene-vinyl alcohol copolymer film (a 25 μm thick Eval EF-F made by Kuraray Co., Ltd.) were laminated on the surface of the adhesive layer.

Preparation of Multilayered Volume Hologram Structure-Making Label

The silicone separator/first adhesive layer 5' structure was laminated on the hologram-recorded material from which the polyvinyl chloride film was removed to obtain a PET film/hologram layer/first adhesive layer 5'/silicone separator multilayered structure.

The PET film was released from the multilayered structure while the silicone separator was released from the surface protective film/second adhesive layer 5"/silicone separator structure. Lamination was carried out to obtain the multilayered volume hologram structure-making label shown in FIG. 24(*a*) comprising a surface protective film/second adhesive layer 5"/hologram layer 6/first adhesive layer 5'/silicone separator structure.

Preparation of Multilayered Volume Hologram Structure

Upon removal of the silicone separator from the label, the label was laminated at the first adhesive layer 5' on a paper substrate with a photograph pasted thereon, as shown in FIG. 22.

After the multilayered structure was allowed to stand alone for 24 hours, the volume hologram layer 6 was released from the first adhesive layer 5'.

The volume hologram layer was again laminated at the original position and allowed to stand alone for a further 24 hours to observe the recorded hologram. Consequently, it was clearly found that the original hologram image was partly disturbed and broken by the solvent flowing out of the broken microcapsules.

Illustrative Example 10

Figure 24B:
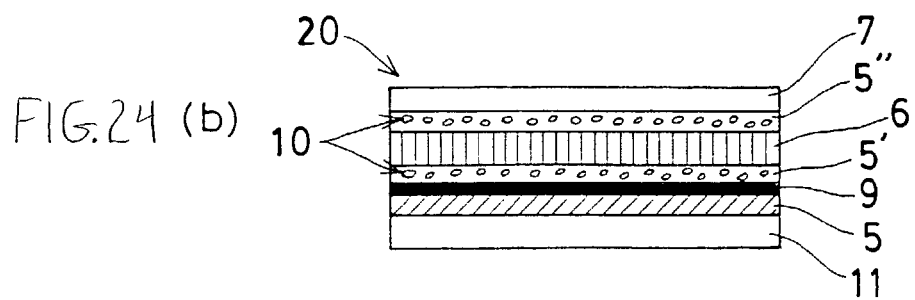

A multilayered volume hologram structure as shown in FIG. 23 and a multilayered volume hologram structure-making label as shown in FIG. 24(b) were prepared as in illustrative example 9 with the exception that the following silicone separator/third adhesive layer 5/colored sheet/first adhesive layer 5' structure was used instead of the silicone separator/first adhesive layer 5' structure.

Preparation of Silicone Separator/Third Adhesive Layer 5/Colored Sheet/First Adhesive Layer 5'

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry film thickness of 10 μm, and a transparent colored sheet (a 50 μm thick PET film dyed in red) was then laminated on the thus obtained adhesive layer. Fifteen (15) wt. % of microcapsules prepared by an interface polymerization process and having a diameter of 0.5 μm, wherein chloroform was encapsulated in a polyurethane skin material, was dispersed in an adhesive agent (Nissetsu PE-118 made by Nippon Carbide Co., Ltd.), and the thus obtained adhesive layer was then coated by a die coating process on the transparent colored sheet at a dry film thickness of 20 μm.

After the multilayered structure of FIG. 23 was allowed to stand alone for 24 hours, the volume hologram layer 6 was released from the second adhesive layer 5".

The volume hologram layer was again laminated at the original position and allowed to stand alone for a further 24 hours to observe the recorded hologram. Consequently, it was clearly found that the original hologram image was partly disturbed and broken by the solvent flowing out of the broken microcapsules.

Next, the sixth multilayered volume hologram structure of the invention and the label for making the same are explained.

Figure 25:
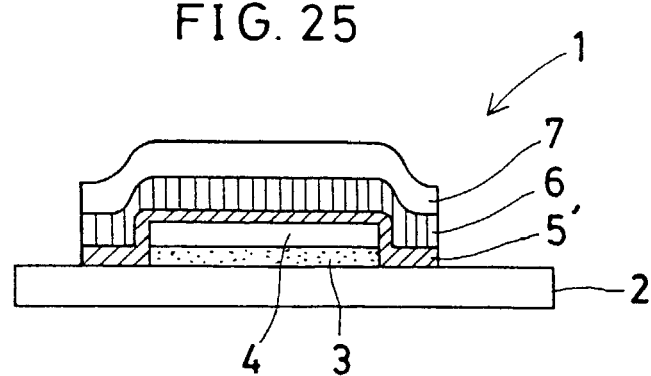
FIG. 25 is a schematic illustrative of the sixth multilayered volume hologram structure of the invention.
Figure 26:
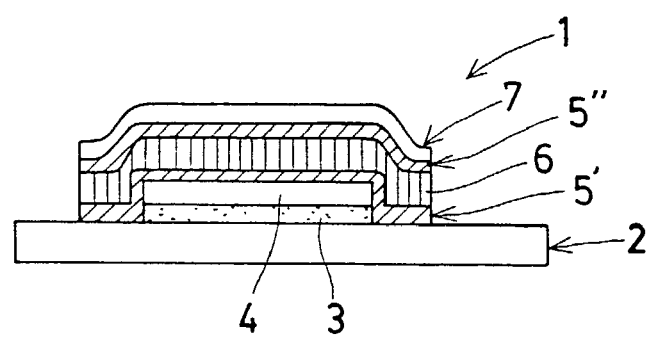
FIG. 26 is a schematic illustrative of the third embodiment of the sixth multilayered volume hologram structure of the invention.

The sixth multilayered volume hologram structure of the invention is explained with reference to FIG. 1 that is a front view of the first multilayered volume hologram structure as well as FIG. 25 that is a sectional view of the sixth multilayered volume hologram structure as taken along the A-A line in FIG. 1 and FIG. 26 that is a sectional view of another embodiment of the sixth multilayered volume hologram structure. In FIGS. 25 and 26, the same reference numerals as in FIG. 2 indicate the same parts.

As shown in FIG. 25, one embodiment of the sixth multilayered volume hologram structure comprises a substrate 2 and a personal information area or photograph of face 4 pasted on the substrate with a photographic paste 3. A first adhesive layer 5', a volume hologram layer 6 containing fine particles and a surface protective film 7 are laminated on and astride the substrate 2 and personal information area or photograph of face 4 in the described order.

The substrate 2, photographic paste 3, photograph of face or personal information area 4 and surface protective film 7 may be the same as mentioned in conjunction with the first multilayered volume hologram structure.

For instance, the adhesive agents used herein are acrylic resin, acrylic ester resin, and vinyl acetate resin or their copolymers as well as styrene-butadiene copolymer, natural rubber, casein, gelatin, rosin ester, terpene resin, phenolic resin, styrene resin, coumarone-indene resin, polyvinyl ether, and silicone resin. The adhesive agent may also be adhesives based on α-cyanoacrylate, silicone, maleimide, styrol, polyolefin, resorcinol, and polyvinyl ether as well as heat-sealing adhesives such as ethylene-vinyl acetate copolymer resin, polyamide resin, polyester resin, polyethylene resin, ethylene-isobutyl acrylate copolymer resin, butyral resin, polyvinyl acetate and its copolymer resin, cellulose derivatives, polymethyl methacrylate resin, polyvinyl ether resin, polyurethane resin, polycarbonate resin, polypropylene resin, epoxy resin, phenol resin, thermoplastic elastomers such as SBS, SIS, SEBS and SEPS, or reaction hot-melt resins. The adhesive layer has preferably a thickness of 4 μm to 20 μm.

The recording material for the volume hologram layer 6 may be the same as explained in conjunction with the first multilayered volume hologram structure. For the purpose of making the volume hologram layer brittle or fragile, however, fine particles having an average primary particle diameter of 1 nm to 100 nm are used in an amount of 10 parts by weight to 100 parts by weight, and preferably 30 parts by weight to 60 parts by weight per 100 parts by weight of photosensitive material.

For the fine particles, for instance, use may be made of inorganic fine particles such as calcium carbonate, talc, china clay, kaolin, microsilica, titanium dioxide, glass flakes, asbestos, agalmatolite powders, silica powders, barium sulfate, and chamotte, and for a fluorescent material emitting fluorescence upon irradiation with ultraviolet radiation, use may be made of a so-called synthetic resin solid solution type of daylight fluorescent pigment. Such a daylight fluorescent pigment may be obtained by dissolving a fluorescent dye, e.g., Brilliant sulfoflavine FF (C.I. 56205), Basic yellow (C.I. 46060), Eosine (C.I. 45380), Rhodamine 6G (C.I. 45160), and Rhodamine B (C.I. 45170) in a carrier resin, e.g., methacrylic ester, polyvinyl chloride, vinyl chloride-vinyl acetate copolymer, polyamide resin, alkyd resin, aromatic sulfonamide, urea resin, melamine resin, benzoguanamine resin, and a resin obtained by the cocondensation and copolymerization of these resins, and granulating the resulting solution to the aforesaid particle diameter. As the carrier resin used with the fluorescent dye in this case, however, it is necessary to employ a resin incompatible with the hologram-recorded material or the solvent used for the formation of such a hologram layer as will be described later.

Fine particles having an average primary particle diameter of small than 1 nm are insufficient for a brittle breakdown of the hologram-recorded layer, and so are not preferable. Fine particles having an average primary particle size exceeding 100 nm are again not preferable because they act as a sort of noise with respect to the recorded hologram. When the amount of the fine particles is smaller than 10 parts by weight per 100 parts by weight of photosensitive material, the objects of the invention are unachievable. On the other hand, the fine particles used in an amount exceeding 100 parts by weight act as a sort of noise with respect to the recorded hologram, and so are not preferable.

By the incorporation of fluorescent fine particles in the volume hologram layer, it is possible not only to embrittle the volume hologram layer but also to make use of fluorescent emission upon irradiation with ultraviolet radiation, thereby increasing the security of the mutlilayered volume hologram structure of the invention.

The hologram recording material may be formed by dispersing the aforesaid fine particles in the coating solution referred to in conjunction with the first multilayered volume hologram structure of the invention, and applying the coating solution onto a substrate at a post-drying thickness of 1 μm to 100 μm, and preferably 4 μm to 20 μm.

In the second embodiment of the sixth multilayered volume hologram structure, plastic particles or glass beads having a refractive index almost equal to that of the photosensitive material in the hologram recording layer are used in an amount of 10 parts by weight to 100 parts by weight per 100 parts by weight per the photosensitive material instead of the aforesaid fine particles. The plastic particles or glass beads in an amount exceeding 100 parts by weight act as a sort of noise with respect to the recorded hologram, and so are not preferable.

The photosensitive material forming part of the volume hologram layer has usually a refractive index of 1.4 to 1.7. For instance, divinylbenzene type plastic particles, benzoguanamine type plastic particles, polystyrene particles, silica particles, and glass beads, all having a refractive index of 1.5, are exemplified as the plastic particles, and glass beads having a corresponding refractive index. It is thus preferable to make a sensible selection from materials having a refractive index substantially equal to that of the photosensitive material. Preferable particle diameters of the plastic particles or glass beads range from 1 μm to 20 μm. Diameters exceeding 20 μm make noises with respect to the recorded hologram, and so are not preferable. A brittle breakdown of the sixth multilayered volume hologram structure may be caused by decreasing the film strength of the volume hologram layer as is the case with the first multilayered volume hologram structure of the invention.

The hologram may be recorded in the same manner as explained in conjunction with the first multilayered volume hologram structure of the invention.

Yet another embodiment of the sixth multilayered volume hologram structure is shown in FIG. 26 wherein reference numerals 5' and 5" represent a first adhesive layer and a second adhesive layer, respectively, and the same numerals as in FIG. 25 indicate the same parts.

As can be seen from FIG. 26, the third embodiment of this multilayered structure comprises a volume hologram layer 6 and a surface protective film 7 laminated on the volume hologram layer with the second adhesive layer 5" interleaved therebetween. It is here to be noted that the first and second adhesive layers 5' and 5" may be formed either of the same adhesive agent or of different adhesive agents. When the heat sealing agent is used as the adhesive agent, a heating roll or the like may be used to heat seal the whole surface of the multilayered structure, but preferably only the whole peripheral end portion thereof. The heat sealing is carried out at a temperature of 100° C. to 180° C., and preferably 120° C. to 160° C. at which the influence of heating on the volume hologram layer can be reduced.

For the sixth multilayered volume hologram structure of the invention, it is preferable that the adhesive layers, volume hologram layer and surface protective film are all transparent.

A label for making the sixth multilayered volume hologram structure of the invention is explained with reference to FIGS. 27(a) and 27(b) that are sectional views thereof.

Figure 27A:
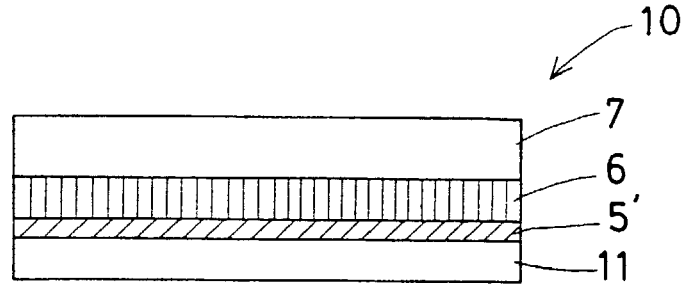
FIGS. 27(a) and 27(b) are sectional schematics illustrative of the label for making the sixth multilayered volume hologram structure of the invention.
Figure 27B:
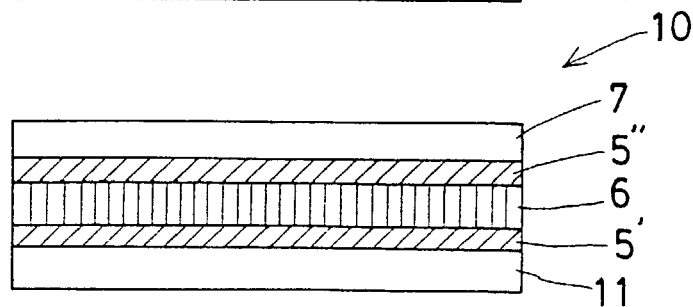

In FIGS. 27(a) and 27(b), reference numerals 10 and 11 represent a multilayered volume hologram structure-making label and a release paper, respectively, and the same numerals as in FIGS. 25 and 26 indicate the same parts.

A label 10 of FIG. 27(a) comprises an adhesive layer 5, a volume hologram layer 6 and a surface protective film 7 laminated on the release paper 11 in the described order. When the first adhesive layer 5 is a heat sealing layer, the release paper 11 may be dispensed with.

The release paper 11 may be the same as explained in conjunction with the label for making the first multilayered volume hologram structure of the invention. Upon removal of the release paper, the label is laminated at the first adhesive layer 5' on a substrate 2 with a photograph, etc. pasted thereon, so that a multilayered volume hologram structure can be obtained.

A label of FIG. 27(b) comprises a first adhesive layer 5', a volume hologram layer 6, a second adhesive layer 5" and a surface protective film 7 laminated on the release paper 11 in the described order. Upon removal of the release paper 11, the label is laminated at the first adhesive layer 5' on a substrate 2 with a photograph, etc. pasted thereon, so that a multilayered volume hologram structure can be obtained.

In what follows, the sixth multilayered volume hologram structure of the invention and the label for making the same will be explained with reference to illustrative examples 11 and 12.

Illustrative Example 11

Preparation of Hologram-Recorded Material

A coating solution consisting of 100 parts of Omnidex 352 made by Du Pont (composed of 25 parts of photosensitive material, 55 parts of methyl ethyl ketone and 20 parts of toluene) and 20 parts of fine particles [reactive microgel (an acrylic type high-molecular colloid having an average primary particle diameter of 50 nm)] was coated on a 50 μm thick PET film (Lumirror T-60 made by Toray Industries, Inc.) at a post-drying thickness of 25 μm. Then, a 50 μm thick ethylene-vinyl alcohol copolymer film (Eval EF-E made by Kuraray Co., Ltd.) was laminated on the surface of the obtained recording layer to form a hologram recording medium.

Using a Lippmann hologram making machine (Omnidex Copier manufactured by Du Pont) together with 514 nm Ar laser, a reflection type hologram diffraction grating was fabricated.

Then, the hologram diffraction grating was irradiated with 1 mW/cm$^2$ ultraviolet radiation generated from a high pressure mercury-vapor lamp for 100 seconds, and heat treated at 120° C. for 120 minutes.

Preparation of Silicone Separator/Adhesive Layer

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm.

Preparation of Surface Protective Film/Adhesive Layer/Silicone Separator

An adhesive agent (Nissetsu PE-118 made by Nippon Carbide Co., Ltd.) was coated on a silicone separator (a 50 μm thick SP-PET made by Tokyo Cellophane Paper Co., Ltd.) at a dry thickness of 10 μm, and a polyethylene terephthalate film (a 50 μm thick HP-7 made by Teijin Limited.) was then laminated on the surface of the adhesive layer.

Preparation of Multilayered Volume Hologram Structure-Making Label

The ethylene-vinyl alcohol copolymer film (Eval EF-E made by Kuraray Co., Ltd.) was removed from the hologram-recorded material, and the aforesaid silicone separator/adhesive layer was laminated on the hologram recorded material to obtain a PET film/hologram layer/adhesive layer/silicone separator multilayer structure.

The PET film was removed from this multilayer structure while the silicone separator was removed from the aforesaid surface protective layer/adhesive layer/silicone separator structure. Then, lamination was carried out to obtain a multilayered volume hologram structure-making label of FIG. 27(b), which comprised a surface protective film/adhesive layer/hologram layer/adhesive layer/silicone separator structure.

Preparation of Multilayered Volume Hologram Structure

Upon a release of the silicone separator, the label was laminated at the adhesive layer on a paper substrate with a photograph pasted thereon, as shown in FIG. 26.

After the multilayered volume hologram structure was allowed to stand alone for 24 hours, the multilayer structure was forcibly released therefrom. Consequently, the volume hologram layer fractured into pieces or broke down in the multilayered structure.

Illustrative Example 12

Another sixth multilayered volume hologram structure and a label for making the same were prepared as in illustrative example 11 with the exception that the fine particles in the hologram recording material were changed to glass beads (having a refractive index of 1.5 and a particle diameter of 4.0 μm).

It is here to be noted that when the hologram recording material of illustrative example 11 was formed of the photosensitive material alone, i.e., with no addition of fine particles, the photosensitive material layer was found to have a refractive index of 1.51.

Upon a release of the silicone separator, the label was laminated at the adhesive layer on a paper substrate with a photograph pasted thereon, as shown in FIG. 26.

After the multilayered volume hologram structure was permitted to stand alone for 24 hours, the multilayer structure was forcibly released therefrom. Consequently, the volume hologram layer fractured into pieces or broke down in the multilayered structure.

Next, the seventh multilayered volume hologram structure of the invention and the label for making the same are explained.

Figure 28:
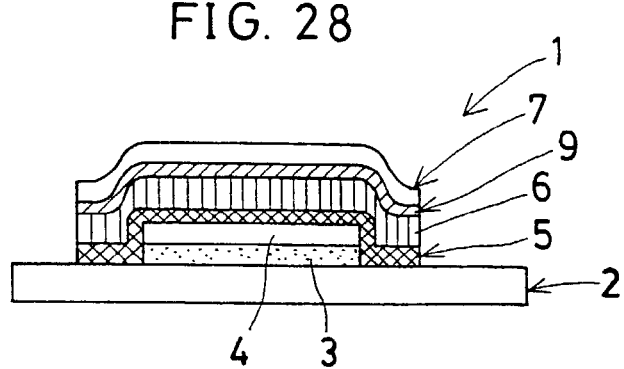
FIG. 28 is a sectional schematic illustrative of one embodiment of the seventh multilayered volume hologram structure of the invention.
Figure 29:
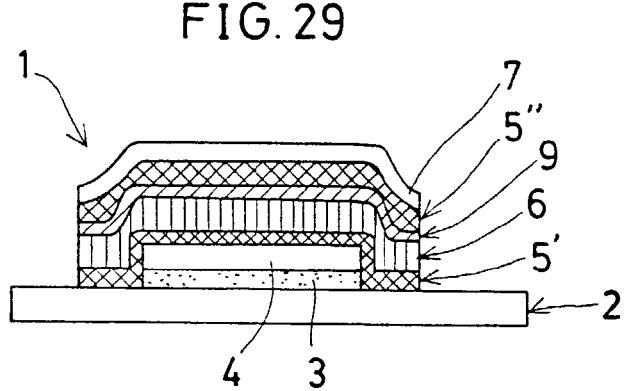
FIG. 29 is a sectional schematic illustrative of another embodiment of the seventh multilayered volume hologram structure of the invention.

The seventh multilayered volume hologram structure of the invention is explained with reference to FIG. 1 that is a front view of the first multilayered volume hologram structure of the invention as well as FIG. 28 that is a sectional view of the seventh multilayered volume hologram structure as taken along the A-A line in FIG. 1 and FIG. 29 that is a sectional view of another embodiment of the seventh multilayered volume hologram structure. In FIGS. 28 and 29, reference numeral 9 stands for a monomer or plasticizer-containing resin or brittle layer. The same numerals as in FIG. 2 indicate the same parts.

One embodiment of the seventh multilayered volume hologram structure comprises a substrate 2 and a personal information area or photograph of face 4 pasted on the substrate 2 with a photographic paste 3, as can be seen from FIG. 28. An adhesive layer 5, a volume hologram layer 6, a monomer or plasticizer-containing resin or brittle layer 9 and a surface protective film 7 are laminated on the substrate 2 and astride the photograph of face 4.

The substrate 2, photographic paste 3, photograph of face or personal information area 4, volume hologram layer 6 and surface protective film 7 may be the same as explained in conjunction with the first multilayered volume hologram structure of the invention, and the adhesive layer may be the same as explained in conjunction with the sixth multilayered volume hologram structure of the invention.

For the resin in the monomer or plasticizer-containing resin layer 9, for instance, use may be made of polyethylene terephthalate, cellulose acetate, polyvinyl chloride, polyethylene, polymethyl methacrylate, and polyvinyl acetate.

For the monomer contained in the resin layer, use may be made of photopolymerizable and photo-crosslinkable monomers, oligomers, and prepolymers having at least one ethylenically unsaturated bond per molecule as already mentioned in conjunction with the hologram-forming material in the first multilayered volume hologram structure of the invention, and their mixtures. For instance, unsaturated carboxylic acids and their salts, esters of unsaturated carboxylic acids and aliphatic polyhydric alcohol compounds, and amide combinations of unsaturated carboxylic acids and aliphatic polyhydric amine compounds may be exemplified. Exemplary monomers for the unsaturated carboxylic acids are acrylic acid, methacrylic acid, itaconic acid, crotonic acid, isocrotonic acid, and maleic acid, which may have halogen substituents as in the case of chlorinated unsaturated carboxylic acids, brominated unsaturated carboxylic acids, and fluorinated unsaturated carboxylic acids. Exemplary salts of the unsaturated carboxylic acids are sodium, and potassium salts of the aforesaid acids. For specific examples, see those mentioned in conjunction with the first multilayered volume hologram structure of the invention.

The monomers may be incorporated in the resin layer in an amount of 1% by weight to 90% by weight, and preferably 5% by weight to 50% by weight, thereby forming a coating solution. For instance, a solution of the resin and monomer dissolved in a mixed solvent (methyl ethyl ketone:toluene=1:1) may be coated on the volume hologram layer at a post-drying thickness of 1 μm to 100 μm, and preferably 3 μm to 30 μm by means of gravure coating, roll coating, blade coating, die coating or the like. Alternatively, the coating solution may be formed into film, which is in turn laminated on the volume hologram layer.

The plasticizer-containing resin layer may be used in place of the monomer-containing resin layer 9. For the resin in the plasticizer-containing resin layer, for instance, use may be made of polyethylene terephthalate, cellulose acetate, polyvinyl chloride, polyethylene, polymethyl methacrylate, and polyvinyl acetate.

For the plasticizer, use may be made of those mentioned in conjunction with the fifth multilayered volume hologram structure of the invention.

The amount of the plasticizer contained in the resin layer is in the range of 0.1% by weight to 50% by weight, and preferably 5% by weight to 30% by weight.

The plasticizer-containing resin layer 9 may be provided by coating a solution of the resin and plasticizer dissolved in a mixed solvent (methyl ethyl ketone:toluene=1:1) on the volume hologram layer at a post-drying thickness of 1 μm to 100 μm, and preferably 3 μm to 30 μm by gravure coating, roll coating, blade coating, die coating or the like. Alternatively, the coating solution may be formed into film, which is in turn laminated on the volume hologram layer.

Another embodiment of the seventh multilayered volume hologram structure of the invention is shown in FIG. 29 wherein 5' and 5''' indicate adhesive layers, and the same numerals as in FIG. 28 indicate the same parts.

In the second embodiment of the seventh multilayered volume hologram structure of the invention, a surface protective film 8 is laminated on a monomer or plasticizer-containing resin layer 9 with the adhesive layer 5' interleaved between them, as shown in FIG. 29. The adhesive layers may be the same as explained in conjunction with the sixth multilayered volume hologram structure of the invention, and the adhesive layers 5' and 5'' may be formed of the same adhesive agent or different adhesive agents.

After constructed as mentioned above, the seventh multilayered volume hologram structure of the invention is preferably heat treated at 80° C. to 160° C. for 1 minute to 300 minutes. This allows the monomer or plasticizer to come out of the resin layer 9, so that the volume hologram layer 6 adjacent to the resin layer 9 can be easily released therefrom, thereby ensuring prevention of falsification. Since the monomer or plasticizer passes into the volume hologram layer, it is possible to alter the peak wavelength of the volume hologram or widen the diffraction wavelength range of the volume hologram.

Next, yet another embodiment of the seventh multilayered volume hologram structure is similar to the first embodiment thereof shown in FIG. 28 with the exception that the monomer or plasticizer-containing resin layer 9 is changed to a brittle layer 9. This embodiment, too, has the ability to prevent falsification.

The brittle layer 9 comprises a resin and fine particles contained therein. For the resin, use may be made of a homopolymer or copolymer resin of styrene resin such as poly-α-methylstyrene; a homopolymer or copolymer resin of acrylic or methacrylic resin such as polymethyl methacrylate, polyethyl methacrylate, polymethyl acrylate, polyethyl acrylate, and polybutyl acrylate; a cellulose derivative such as ethyl cellulose, nitrocellulose, hydroxyethyl cellulose, cellulose acetate propionate, cellulose acetate butyrate, and cellulose acetate; one of polyvinyl alcohol, polyvinyl acetate, polyvinyl chloride, polypropylene, polyethylene and polyether resins or mixtures or copolymers of two or more thereof; and a heat-curing resin such as phenolic resin, urea resin, and melamine resin.

For the fine particles contained in the resin, for instance, use may be made of inorganic fine particles such as calcium carbonate, talc, china clay, kaolin, microsilica, titanium dioxide, glass flakes, asbestos, agalmatolite powders, silica powders, barium sulfate, and chamotte.

Preferably, the amount of the fine particles to be contained in the resin is in the range of 80 parts by weight to 200 parts by weight per 100 parts by weight of resin. The brittle layer has preferably a thickness of 4 μm to 40 μm.

If the seventh multilayered volume hologram structure should be delaminated for the purpose of falsification, the protective film would be easily released from the volume hologram layer with or without the resin layer 9, while the volume hologram layer would remain fixed to the substrate 2 or the photograph 4. If, in this case, the remaining hologram layer 6 should be forcibly stripped from the photograph, the hologram layer would break down certainly because of its softness and brittleness.

In the seventh multilayered volume hologram structure, it is preferable that the adhesive layer, volume hologram layer, resin layer and surface protective film are all transparent.

A label for making the seventh multilayered volume hologram structure is explained with reference to FIGS. 30(a) and 30(b) that are sectional views of the multilayered construction thereof.

Figure 30A:
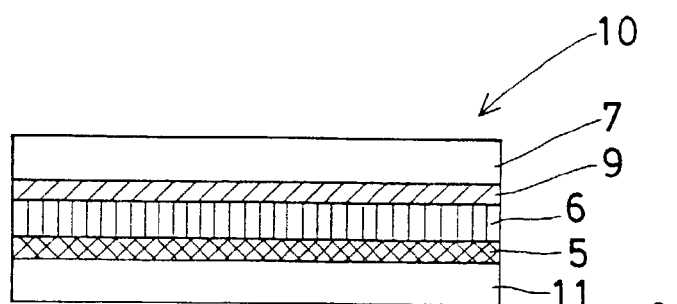
FIGS. 30(a) and 30(b) are sectional schematics illustrative of the label for making the seventh multilayered volume hologram structure of the invention.
Figure 30B:
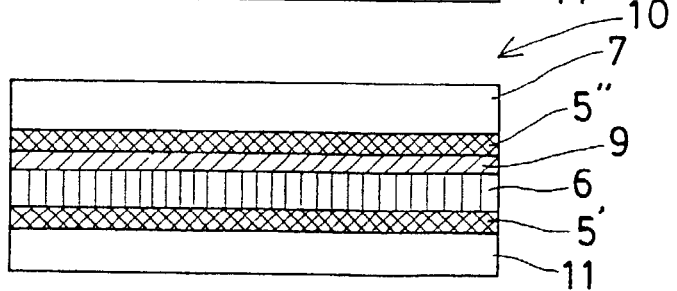

In FIGS. 30(a) and 30(b), reference numerals 10 and 11 represent a multilayered volume hologram structure-making label and a release paper, respectively, and the same numerals as in FIG. 29 indicate the same parts.

A label 10 of FIG. 30(a) comprises an adhesive layer 5, a volume hologram layer 6, a monomer or plasticizer-containing resin layer 9 and a surface protective film 7 laminated on the release paper 11 in the described order.

The release paper 11 may be the same as explained in conjunction with the first multilayered volume hologram structure of the invention. Upon removal of the release paper, the label is laminated at the adhesive layer 5 on a substrate 2 with a photograph, etc. pasted thereon, so that the multilayered volume hologram structure of FIG. 28 can be obtained.

A label of FIG. 30(b) comprises an adhesive layer 5', a volume hologram layer 6, a monomer or plasticizer-containing resin or brittle layer 9, an adhesive layer 5" and a surface protective film 7 laminated on the release paper 11 in the described order. Upon removal of the release paper 11, the label is laminated at the adhesive layer 5' on a certificate or substrate 2 with a photograph, etc. pasted thereon, as shown in FIG. 29, so that a multilayered volume hologram structure is obtained.

In what follows, the seventh multilayered volume hologram structure of the invention and the label for making the same will now be explained with reference to illustrative examples 13, 14 and 15 wherein by "%" is intended "% by weight".

Illustrative Example 13

Preparation of Hologram-Recorded Material

A Lippmann hologram was recorded on a hologram recording film (Omnidex 706 made by Du Pont) comprising a multilayer construction of polyethylene terephthalate (PET) film/hologram recording material/polyvinyl chloride film. Upon removal of the polyvinyl chloride film from this multilayer construction, a film obtained by providing a vinyl acetate resin layer containing 20% of phenoxy acrylate on a polyethylene terephthalate (PET) film was laminated on the hologram-recorded material, followed by a 120-minute heat treatment at 120° C.

Preparation of Silicone Separator/Adhesive Layer

An adhesive agent (Nissetsu PE-118 made by Nippon Carbide Co., Ltd.) was coated on a silicone separator (a 50 μm thick SP-SET made by Tokyo Cellophane Paper Co., Ltd.) at a dry thickness of 10 μm.

Preparation of Surface Protective Film/Adhesive Layer/Silicone Separator

An adhesive agent (Nissetsu PE-118 made by Nippon Carbide Co., Ltd.) was coated on a silicone separator (a 50 μm thick SP-SET made by Tokyo Cellophane Paper Co., Ltd.) at a dry thickness of 10 μm, and a polyethylene terephthalate film (Lumirror T60 made by Toray Industries, Inc.) was laminated on the surface of the adhesive layer.

Preparation of Multilayered Volume Hologram Structure-Making Label

The aforesaid hologram-recorded material, from which the polyvinyl chloride film was removed, was laminated on the aforesaid silicone separator/adhesive layer to obtain a PET film/monomer-containing resin layer/hologram layer/adhesive layer/silicone separator multilayer structure.

The PET film was removed from the multilayer structure while the silicone separator was removed from the aforesaid surface protective film/adhesive layer/silicone separator. Then, lamination was carried out to obtain the multilayered volume hologram structure-making label shown in FIG. 30(b), which comprised a surface protective film/adhesive layer/monomer-containing resin layer/hologram layer/adhesive layer/silicone separator structure.

Preparation of Multilayered Volume Hologram Structure

Upon a release of the silicone separator, the label was laminated at the adhesive layer on a paper substrate with a photograph pasted thereon, as shown in FIG. 29.

After allowed to stand alone for 24 hours, the multilayered volume hologram structure was forcibly delaminated. Consequently, the monomer-containing resin layer was released from the hologram layer at their interface. Then, the hologram layer remaining on the substrate was forcibly stripped therefrom. As a result, the hologram layer broke down.

Illustrative Example 14

A multilayered volume hologram structure-making label and a multilayered volume hologram structure were prepared as in illustrative example 13 with the exception that the following hologram-recorded material was used instead of the hologram-recorded material of illustrative example 13.

Preparation of Hologram-Recorded Material

A Lippmann hologram was recorded on a hologram recording film (Omnidex 706 made by Du Pont) comprising a multilayer construction of polyethylene terephthalate (PET) film/hologram recording material/polyvinyl chloride film. Upon removal of the polyvinyl chloride film from this multilayer construction, a film obtained by providing an acrylic resin layer containing 30 parts by weight of 2-ethylhexyl phthalate (DOP) (of 20 µm in thickness) on a polyethylene terephthalate (PET) film was laminated on the hologram-recorded material, followed by a 120° C. heat treatment for 120 hours.

After allowed to stand alone for 24 hours, the multilayered volume hologram structure was forcibly delaminated. Consequently, the plasticizer-containing resin layer was released from the hologram layer at their interface. Then, the hologram layer remaining on the substrate was forcibly released therefrom. As a result, the hologram layer broke down.

Illustrative Example 15

A multilayered volume hologram structure-making label and a multilayered volume hologram structure were prepared as in illustrative example 13 with the exception that the following hologram-recorded material was used instead of the hologram-recorded material of illustrative example 13.

Preparation of Hologram-Recorded Material

A Lippmann hologram was recorded on a hologram recording medium obtained by laminating a hydroxyethyl cellulose resin layer (of 20 µm in thickness) containing 20% of polystyrene beads, a hologram recording material layer (of 20 µm in thickness, and Omnidex 706 made by Du Pont) and a polyvinyl chloride film on a polyethylene terephthalate (PET) film.

After allowed to stand alone for 24 hours, the multilayered volume hologram structure was forcibly delaminated. Consequently, delamination occurred in the brittle layer. Then, the hologram layer remaining on the substrate was forcibly stripped therefrom. As a result, the hologram layer broke down.

Next, the eighth multilayered volume hologram structure of the invention and the label for making the same are explained.

The eighth multilayered volume hologram structure of the invention is explained with reference to FIG. 1 that is a front view of the first multilayered volume hologram structure of the invention as well as FIG. 31 that is a sectional view of the eighth multilayered volume hologram structure as taken along the A-A line in FIG. 1, FIG. 32 that is a plan view of a pattern example of a patterned layer where adhesion varies in a site-depending manner, FIG. 33 that is a sectional view of another embodiment of the eighth multilayered volume hologram structure, and FIG. 34 that is a sectional view of yet another embodiment of the eighth multilayered volume hologram structure. In these drawings, reference numeral 9 represents a patterned layer where adhesion varies from site to site, and the same numerals as in FIG. 2 indicate the same parts.

Figure 31:
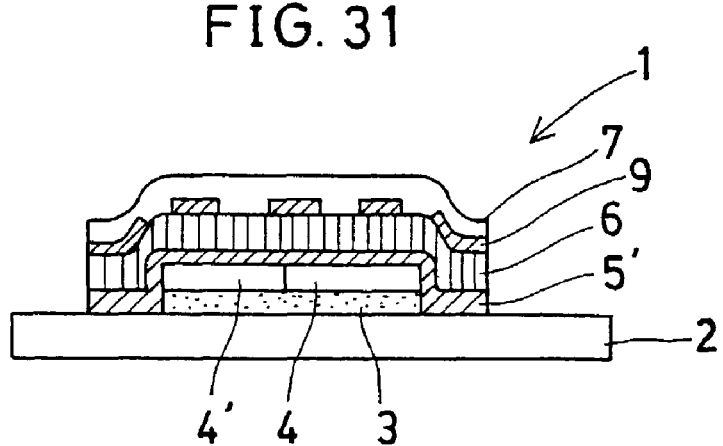
FIG. 31 is a schematic illustrative of the first embodiment of the eighth multilayered volume hologram structure of the invention.

In the first embodiment of the eighth multilayered volume hologram structure of the invention, a personal information area or photograph of face 4 is pasted on a substrate 2 with a photographic paste 3, as shown in FIG. 31. A first adhesive layer 5', a volume hologram layer 6, a patterned layer 9 with varying adhesion and a surface protective film 7 are laminated on the substrate 2 and astride the personal information area or photograph of face 4.

The substrate 2, photographic paste 3, photograph of face or personal information area 4, adhesive layer 5', and volume hologram layer 6 may be the same as explained in conjunction with the first multilayered volume hologram structure of the invention, and the adhesive layer may be the same as explained in conjunction with the sixth multilayered volume hologram structure of the invention.

The surface protective film 7 may be the same as explained in conjunction with the first multilayered volume hologram structure of the invention. When the patterned layer to be described later is a patterned release layer, the surface of the release layer, on which the hologram-recorded layer 6 is to be laminated, is preferably subjected to a primer treatment or adhesion-improving treatment, thereby improving the adhesion between the release layer and the hologram-recorded layer. When the patterned layer is formed of a primer layer or a layer already treated for adhesion-improving purposes, however, such treatments may be dispensed with.

The primer treatment, for instance, may be achieved by the coating of a resin such as silicone resin, acrylic resin, vinyl chloride-vinyl acetate copolymer resin, nitrocellulose, polyester resin, and polyamide resin with an acid treating solution composed mainly of phosphoric acid, and maleic acid or an alkali treating solution composed of shellac.

The adhesion-improving treatment, for instance, may be achieved by sandblasting, chemical etching, flame treatment, ozone treatment, corona discharge treatment, ultraviolet radiation curing treatment, electron beam treatment, radiation treatment, graft polymerization, plasma treatment, plasma graft polymerization, plasma polymerization, vacuum ultraviolet light treatment, and photopolymerization.

The patterned layer 9 is explained.

Between the volume hologram layer 6 and the surface protective film 7 in the eighth multilayered volume hologram structure, there is located the patterned layer 9 for allowing the adhesion between them to vary in a site-depending manner. In FIG. 32, the patterned layer 9 is shown in a bar code form, with reference numeral 9' indicating a non-patterned zone. The patterned layer 9 may be provided not only in a bar code form but also in a round spot or checked form; no particular limitation is imposed on the shape of the patterned layer 9 if patterned and non-patterned zones are simultaneously provided on the volume hologram layer 6.

The patterned layer 9 may be formed of a release agent layer which facilitates a release of the surface protective layer 7. Alternatively or as an example, the patterned layer 9 may be obtained by subjecting the surface of the surface protective film to a pattern-wise primer treatment or an adhesion-improving treatment.

The release agent layer may be formed by the pattern-wise coating of a fluorine release agent, a silicone release agent, a stearate release agent, and a wax release agent. The adhesion-improving primer layer may be formed by the pattern-wise coating of a resin such as silicone resin, acrylic resin, vinyl chloride-vinyl acetate copolymer resin, nitrocellulose, polyester resin, and polyamide resin with an acid treating solution composed mainly of phosphoric acid, and maleic acid or an alkali treating solution composed of shellac. The adhesion-improving treatment, for instance, may be achieved by sandblasting, chemical etching, flame treatment, ozone treatment, corona discharge treatment, ultraviolet radiation curing treatment, electron beam treatment, radiation treatment, graft polymerization, plasma treatment, plasma graft polymerization, plasma polymerization, vacuum ultraviolet light treatment, and photopolymerization.

Instead of using the aforesaid patterned layer 9, it is also acceptable to treat the volume hologram layer and surface protective film in such a manner that the mutual adhesion between them can be increased or decreased upon irradiation with ultraviolet radiation or heating.

When, for instance, the hologram-recorded material or the surface protective film material has a carbon-carbon double bond or a hydroxyl, amino, carboxyl, sulfone or mercapto group, the mutual adhesion between the hologram layer and the surface protective film is increased upon the irradiation of them with ultraviolet radiation or the application of heat thereto because covalent bonds or hydrogen bonds occur or increase between them. On the other hand, the mutual adhesion between the hologram layer and the surface protective film is decreased or lost by a decrease in the area of contact or an increase in the glass transition temperature due to polymerization reactions, etc.

Thus, the mutual adhesion between the volume hologram layer and the surface protective film is increased or decreased upon the irradiation of them with ultraviolet radiation or the application of heat thereto. To this end, the volume hologram layer and surface protective film are exposed to ultraviolet radiation or heated in a pattern-wise manner through a mask, so that the mutual adhesion therebetween can vary between the exposed or heated regions and the unexposed or unheated regions.

If the first embodiment of the eighth multilayered volume hologram structure is delaminated for the purpose of falsification by making a photograph replacement, the volume hologram layer 6 would fracture into two portions, one portion at the exposed or heated regions 9 being released together with the surface protective layer and the other portion at the unexposed or unheated regions 9' remaining fixed on the substrate side. This is because the volume hologram layer is formed of a soft material such as acrylic resin or gelatin. Even if the volume hologram layer 6 would not fracture into such portions, the recorded hologram image would discolor because of an elongation of the volume hologram layer either at the exposed or heated regions or at the unexposed or unheated regions. It is thus absolutely impossible to reuse the first embodiment of the eighth multilayered volume hologram structure of the invention.

Another embodiment of the eighth multilayered volume hologram structure of the invention is then explained with reference to FIG. 33. The second embodiment is similar to the aforesaid first embodiment with the exception that the mutual adhesion between the volume hologram layer and the surface protective film is relatively decreased. To make up for this, a second adhesive layer 5" is interleaved between the volume hologram layer 6 and the surface protective film 7, as can be seen from FIG. 33. A patterned layer 9 may be disposed between the second adhesive layer 5" and the surface protective film 7, as can be seen from FIG. 33. In this case, the patterned layer 9 may be the same as explained in conjunction with the first embodiment mentioned just above, and the surface of the protective layer 7 to be laminated may be treated as in the first embodiment.

Although not illustrated, the patterned layer 9 may be disposed between the volume hologram layer 6 and the second adhesive layer 5". In this case, the patterned layer 9 may be formed of the same pattern form of release agent layer or primer layer as explained in conjunction with the first embodiment, among which the release agent layer is preferred. Preferably, the surface of the protective film 7 is subjected to a primer or adhesion-improving treatment for the purpose of improving adhesion. When the surface protective film contains a plasticizer, it is preferable to provide the second adhesive layer 5", thereby protecting the recorded hologram against the influence of the plasticizer.

In the second embodiment, too, the volume hologram layer 6 may fracture into two portions, one portion at the exposed or heated regions being released together with the surface protective film and the other portion at the unexposed or unheated regions remaining fixed on the substrate side. It is thus absolutely impossible to reuse the volume hologram layer.

Yet another embodiment of the eighth multilayered volume hologram structure of the invention is explained with reference to FIG. 34. This third embodiment is similar to the aforesaid second embodiment with the exception that a patterned layer 9 is disposed between a first adhesive layer 5' and a volume hologram layer 6. The patterned layer 9 may be the same pattern form of release agent layer or primer layer as explained in conjunction with the aforesaid first embodiment, among which the release agent layer is preferred. The surface of the protective film to be laminated is preferably subjected to a primer or adhesion-improving treatment for the purpose of enhancing adhesion. It is here to be noted that the second adhesive layer 5" is provided while both the adhesion between the surface protective film and the volume hologram layer and the adhesion between the substrate and the volume hologram layer are taken into consideration. When the adhesion of the volume hologram layer is high, the second adhesive layer 5" may be dispensed with.

Although not illustrated, the patterned layer 9 may be located between the first adhesive layer 5' and a photograph 4 or personal information area 4'. In this case, the patterned layer 9 may be formed of the same pattern form of release agent layer or primer layer as explained in conjunction with the first embodiment, among which the release agent layer is preferred. Preferably, the surface of the protective film to be laminated is subjected to a primer or adhesion-improving treatment for the purpose of enhancing adhesion. When the surface protective film contains a plasticizer, it is preferable to provide the second adhesive layer 5", thereby protecting the recorded hologram against the influence of the plasticizer.

In the third embodiment, too, the volume hologram layer 6 may fracture into two portions, one portion at the exposed or heated regions being released together with the surface protective film and the other portion at the unexposed or unheated regions remaining fixed on the substrate side. It is thus absolutely impossible to reuse the volume hologram layer.

Throughout the first to third embodiments mentioned above, it is preferable that the adhesive layers, volume hologram layer, patterned layer for achieving varying adhesion from site to site and the surface protective film are all excellent in transparency. Especially if the patterned layer 9 is transparent, it is then possible to achieve ever higher security.

A label for making the eighth multilayered volume hologram structure of the invention is explained with reference to FIGS. 36(a), 36(b) and 36(c) that are sectional views of the multilayer constructions thereof.

Figure 32:
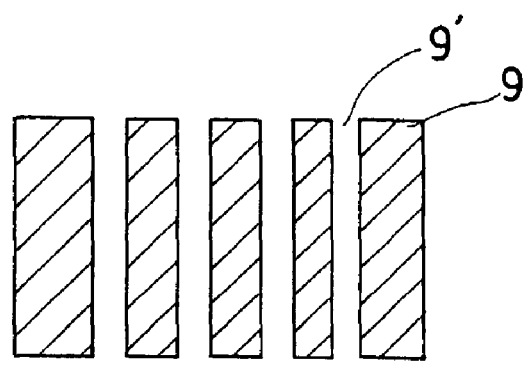
FIG. 32 is a plan schematic illustrative of the patterned area for varying adhesion.
Figure 33:
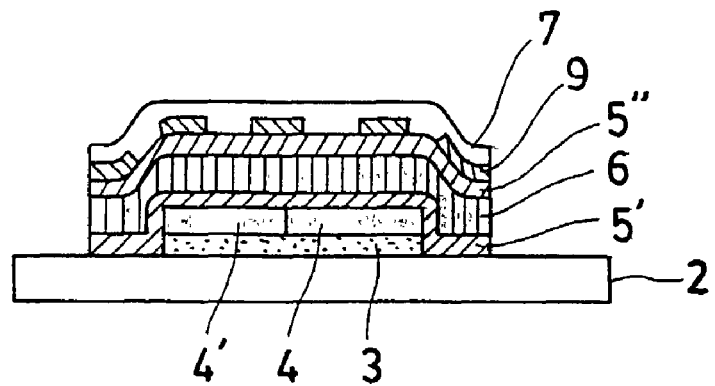
FIG. 33 is a schematic illustrative of the second embodiment of the eighth multilayered volume hologram structure of the invention.
Figure 36:
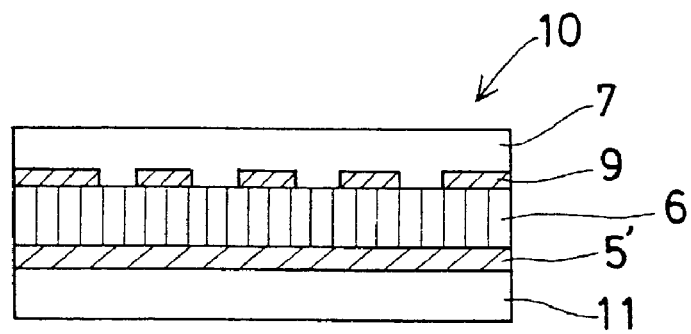
FIGS. 36(a) through 36(c) are sectional schematics illustrative of the label for making the eighth multilayered volume hologram structure of the invention.
Figure 36:
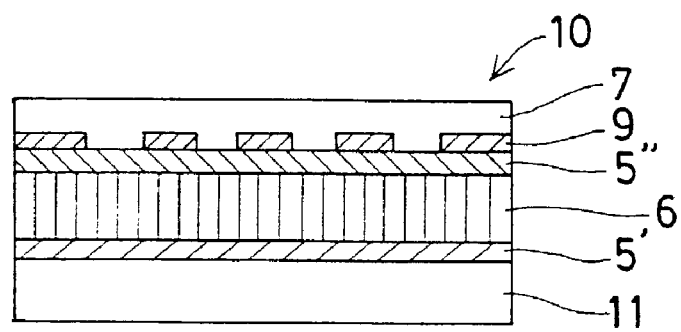
Figure 36:
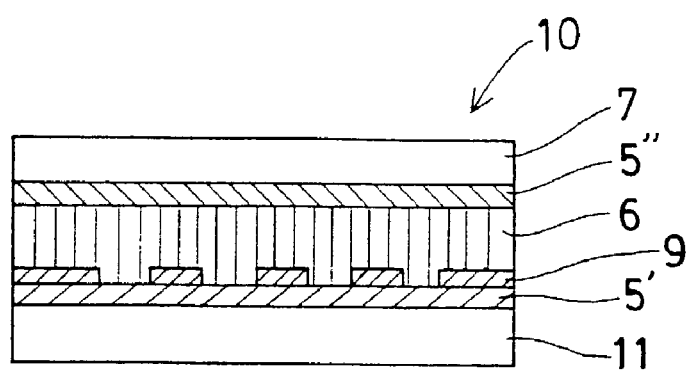

In FIGS. 36(a), 36(b) and 36(c), reference numerals 10 and 11 represent a multilayered volume hologram structure-making label and a release paper, respectively, and the same numerals as in FIGS. 31 to 33 indicate the same parts.

The first embodiment of the label for making the eighth multilayered volume hologram structure of the invention is applied to the fabrication of the first embodiment of the eighth multilayered volume hologram structure of the invention. As shown in FIG. 36(a), a label 10 comprises a first adhesive layer 5', a volume hologram layer 6, a patterned layer 9 for achieving varying adhesion from site to site and a surface protective film 7 laminated on the release paper 11 in the described order.

The release paper 11 may be the same as explained in conjunction with the first embodiment of the eighth multilayered volume structure mentioned above. Upon removal of the release paper, the label is laminated at the first adhesive layer 5' on a substrate 2 with a photograph, etc. pasted thereon, so that the multilayered volume hologram structure shown in FIG. 31 can be obtained.

A label of FIG. 36(b) is a second embodiment of the label for making the eighth multilayered volume hologram structure, and comprises a first adhesive layer 5', a volume hologram layer 6, a second adhesive layer 5", a patterned layer 9 for achieving varying adhesion from site to site and a surface protective film 7 laminated on the release paper 11 in the described order. The release paper and so on may be the same as mentioned above.

A label 10, from which the release paper 11 is removed, is laminated at the first adhesive layer 5' on a substrate 2 with a photograph, etc. pasted thereof, so that the multilayered volume hologram structure shown in FIG. 33 can be obtained.

A label of FIG. 36(c) is a third embodiment of the label for making the eighth multilayered volume hologram structure, and comprises a first adhesive layer 5', a patterned layer 9 for achieving varying adhesion from site to site, a volume hologram layer 5, a second adhesive layer 5" and a surface protective film 7 laminated on the release paper 11 in the described order. The release paper and so on may be the same as mentioned above.

Figure 34:
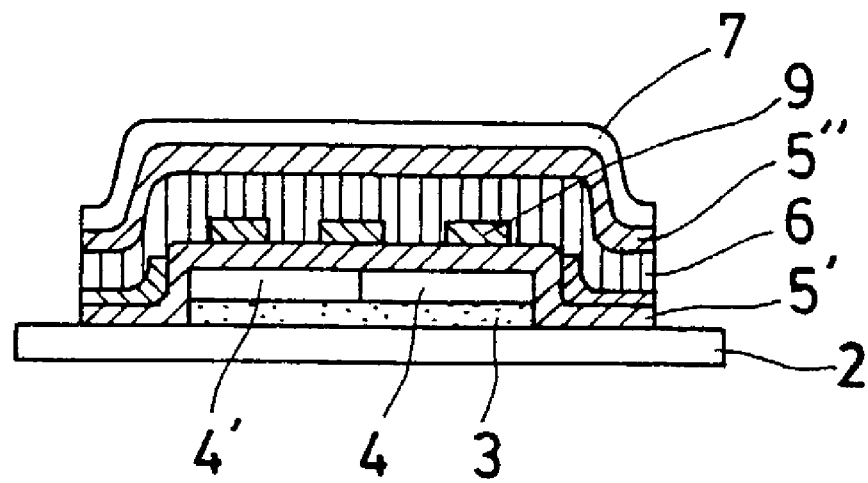
FIG. 34 is a schematic illustrative of the third embodiment of the eighth multilayered volume hologram structure of the invention.
Figure 35:
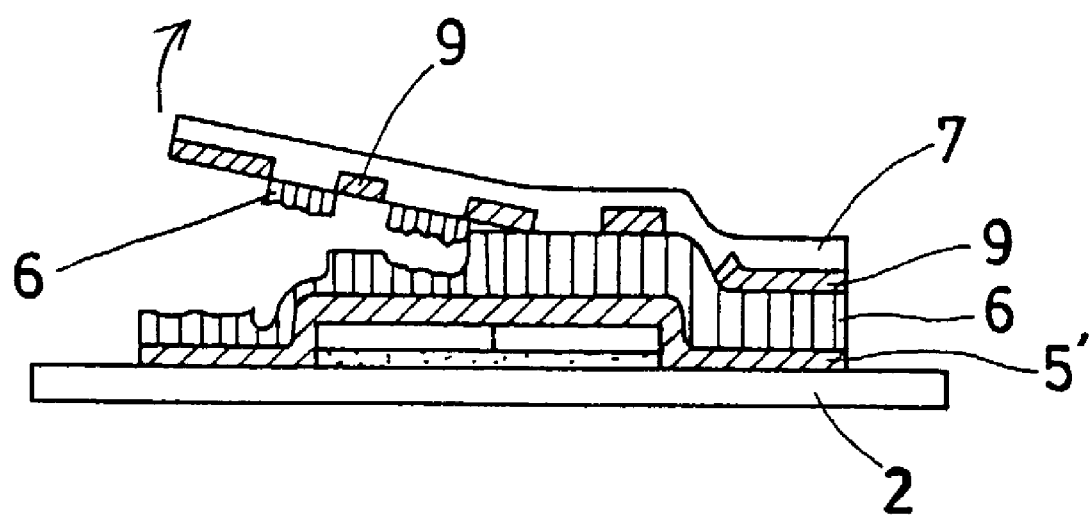
FIG. 35 is a schematic illustrative of how to release the eighth multilayered volume hologram structure of the invention.

A label 10, from which the release paper 11 is removed, is laminated at the first adhesive layer 5' on a substrate 2 with a photograph, etc. pasted thereof, so that the multilayered volume hologram structure shown in FIG. 34 can be obtained.

In what follows, the eighth multilayered volume hologram structure of the invention and the label for making the same will now be explained with reference to illustrative examples 16 to 20.

Illustrative Example 16

Preparation of Hologram-Recorded Layer

A Lippmann hologram was recorded on a hologram recording film obtained by laminating a hologram recording material (a 20 μm thick Omnidex 706M made by Du Pont) and a polyethylene terephthalate (PET) film of 25 μm in thickness on a polyethylene terephthalate (PET) film of 50 μm in thickness in the described order. Thereafter, the 25 μm thick PET film was removed from the hologram-recorded material, and a PET film coated with a polyvinyl acetate layer was laminated on the surface of the hologram-recorded material, followed by a 24-minute heating at 120° C.

Preparation of Surface Protective Film/Patterned Layer/Volume Hologram Layer/PET Film A silicone release agent (KE-42TS made by The Shin-Etsu Chemical Co., Ltd.) was pattern coated on a transparent surface protective film (a 25 μm thick PET film) at a post-drying thickness of 1 μm, as shown in FIG. 32, thereby obtaining a patterned layer comprising an array of treated and untreated regions. This patterned layer was laminated on the surface of the volume hologram layer exposed by releasing the PET film coated with a polyvinyl acetate layer from the hologram-recorded layer, thereby obtaining a surface protective film/patterned layer/volume hologram layer/PET film, which was then heated at 120° C. for 60 minutes for bonding.

Preparation of Silicone Separator A/First Adhesive Layer/Silicone Separator B

An acrylic adhesive agent (Nissetsu PE-118 made by Nippon Carbide Co., Ltd.) was coated on a silicone separator A (a 50 μm thick SP-PET05 made by Tokyo Cellophane Paper Co., Ltd.) at a dry thickness of 15 μm, and a silicone separator B (a 50 μm thick SP-PET02 made by Tokyo Cellophane Paper Co., Ltd.) was laminated on the adhesive layer.

Preparation of Multilayered Volume Hologram Structure-Making Label

The PET film was removed from the surface protective film/patterned layer/volume hologram layer/PET film while the silicone separator A was removed from the silicone separator A/first adhesive layer/silicone separator B. Then, lamination was carried out to obtain a multilayered volume hologram structure-making label comprising a surface protective film/patterned layer/volume hologram layer/first adhesive layer/silicone separator B.

Preparation of Multilayered Volume Hologram Structure

Upon a release of the silicone separator B, the thus obtained multilayered volume hologram structure-making label was laminated at the first adhesive layer on a paper substrate with a photograph, etc. pasted thereon, as shown in FIG. 31, thereby obtaining a multilayered volume hologram structure according to the invention.

After allowed to stand alone for 24 hours, the hologram label was forcibly stripped from the paper substrate. At the patterned regions, the surface protective film could be easily released, but the hologram layer broke down at the non-patterned regions because it was released following the surface protective film. It was thus absolutely impossible to reuse the volume hologram layer.

Illustrative Example 17

Preparation of Hologram-Recorded Layer

A Lippmann hologram was recorded on a hologram recording film (Omnidex 706 made by Du Pont) obtained by laminating a hologram recording material layer and a polyvinyl chloride (PVC) film on a polyethylene terephthalate (PET) film in the described order. Thereafter, the PVC film was removed from the hologram recording film, and a PET film coated with a polyvinyl acetate layer was laminated on the hologram recording material, followed by a 24-minute heating at 120° C.

Preparation of Surface Protective Film/Patterned Layer/Second Adhesive Layer/Silicone Separator An acrylic adhesive agent (Nissetsu PE-118 made by Nippon Carbide Co., Ltd.) was coated on a silicone separator (a 50 μm thick SP-PET05 made by Tokyo Cellophane Paper Co., Ltd.) at a dry thickness of 15 μm.

On the other hand, a silicone release agent (KE-42TS made by The Shin-Etsu Chemical Co., Ltd.) was pattern coated on a stretched polypropylene film (a 30 μm thick OPP film, OPU-1 made by Tokyo Cellophane Paper Co., Ltd.) at a post-drying thickness of 1 μm as in illustrative example 16, and then was laminated on the adhesive layer of the acrylic adhesive layer/silicone separator obtained as just mentioned above to obtain a surface protective film/patterned layer/second adhesive layer/silicone separator multilayer structure.

Preparation of Surface Protective Film/Patterned Layer/Second Adhesive Layer/Volume Hologram Layer/PET film The PET film coated with a polyvinyl acetate layer was removed from the hologram-recorded layer while the silicone separator was removed from the surface protective film/patterned layer/second adhesive layer/silicone separator multilayer structure. Then, lamination was carried out to obtain a surface protective film/patterned layer/second adhesive layer/volume hologram layer/PET film mutlilayer structure.

Preparation of Multilayered Volume Hologram Structure-Making Label

The PET film was removed from the surface protective film/patterned layer/second adhesive layer/volume hologram layer/PET film while the silicone separator A was removed from the silicone separator A/first adhesive layer/silicone separator B prepared in illustrative example 16. Then, lamination was carried out to obtain a multilayered volume hologram structure-making label comprising a surface protective film/patterned layer/second adhesive layer/volume hologram layer/first adhesive layer/silicone separator B multilayer structure.

This multilayered volume hologram structure-making label was used as in illustrative example 16 to make a multilayered volume hologram structure. The hologram label was forcibly stripped from the paper substrate as in illustrative example 16. At the patterned regions, the surface protective film could be easily released, but the hologram layer broke down at the non-patterned regions because it was released following the surface protective film. It was thus absolutely impossible to reuse the volume hologram layer.

Illustrative Example 18

Preparation of Hologram-Recorded Layer

A Lippmann hologram was recorded on a hologram recording film (Omnidex 706 made by Du Pont) obtained by laminating a hologram recording material layer and a polyvinyl chloride (PVC) film on a polyethylene terephthalate (PET) film in the described order. Thereafter, the PVC film was removed from the hologram-recorded layer, and a re-releasable acrylic adhesive film (Sanitechto H225E made by Sanei Kaken Co., Ltd.) was laminated on the hologram-recorded material, followed by a 24-minute heating at 120° C.

Preparation of Surface Protective Film/Second Adhesive Layer/Silicone Separator

An acrylic adhesive agent (Nissetsu PE-118 made by Nippon Carbide Co., Ltd.) was coated on a silicone separator (a 50 μm thick SP-PET05 made by Tokyo Cellophane Paper Co., Ltd.) at a dry thickness of 15 μm. Then, a stretched polypropylene film (a 30 μm thick OPP film, OPU-1 made by Tokyo Cellophane Paper Co., Ltd.) was laminated on the acrylic adhesive layer.

Preparation of Surface Protective Film/Second Adhesive Layer/Volume Hologram Layer/PET Film The silicone separator was removed from the surface protective film/second adhesive layer/silicone separator obtained as mentioned above while the re-releasable acrylic adhesive film was removed from the hologram-recorded layer obtained as mentioned above. Then, lamination was carried out to obtain a surface protective film/second adhesive layer/volume hologram layer/PET film.

Preparation of Silicone Separator B/First Adhesive Layer/Patterned Layer/Silicone Separator A An acrylic adhesive agent (Nissetsu PE-118 made by Nippon Carbide Co., Ltd.) was coated on a silicone separator B (a 50 μm thick SP-PET02 made by Tokyo Cellophane Paper Co., Ltd.) at a dry thickness of 15 μm.

A silicone release agent (KE-42TS made by The Shin-Etsu Chemical Co., Ltd.) was pattern coated on a silicone separator A (a 50 μm thick SP-PET05 made by Tokyo Cellophane Paper Co., Ltd.) at a post-drying thickness of 1 μm as in illustrative example 16, and then laminated on the adhesive layer of the acrylic adhesive layer/silicone separator obtained as just mentioned above to obtain a silicone separator B/first adhesive layer/patterned layer/silicone separator A multilayer structure.

Preparation of Multilayered Volume Hologram Structure-Making Label

The PET film was removed from the surface protective film/second adhesive layer/volume hologram layer/PET film obtained as mentioned above while the silicone separator A was removed from the silicone separator B/first adhesive layer/patterned layer/silicone separator A obtained as mentioned above. Then, lamination was carried out to obtain a multilayered volume hologram structure-making label comprising a surface protective film/second adhesive layer/volume hologram layer/patterned layer/first adhesive layer/silicone separator B.

This multilayered volume hologram structure-making label was used as in illustrative example 16 to make a multilayered volume hologram structure. The hologram label was forcibly stripped from the paper substrate as in illustrative example 16. At the patterned regions, the hologram label could be easily released, but the hologram layer broke down at the non-patterned regions because it was released following the surface protective film. It was thus absolutely impossible to reuse the volume hologram layer.

Illustrative Example 19

Preparation of Hologram-Recorded Layer

A Lippmann hologram was recorded on a hologram recording film (Omnidex 706M made by Du Pont) obtained by laminating a hologram recording material layer and a polyethylene terephthalate film (a 25 µm thick PET film) on a polyethylene terephthalate film (a 50 µm thick PET film) in the described order, followed by removal of the 25 µm thick PET film. Apart from this, a PP film was removed from a color tuning film (CTF 75 made by Du Pont) comprising a PET film (25 µm)/color tuning film (about 20 µm)/polypropylene film (PP film) multilayer structure. Then, this color tuning film was laminated on the hologram recording material layer of the hologram-recorded layer, followed by a 12-minute heating at 120° C. The multilayer structure obtained in this case was composed of a PET film (50 µm)/hologram layer/color tuning layer/PET film (25 µm).

Preparation of Partially Corona Treated Surface Protective Film/Second Adhesive Layer/Silicone Separator A partially corona treated OPP film was prepared by corona treating a stretched polypropylene film (a 20 mm thick OPP film made-by Tokyo Cellophane Paper Co., Ltd.) through a Teflon resin mask in such a manner that a masked portion was corona treated and an unmasked portion was not.
An acrylic adhesive agent (Nissetsu PE-118 made by Nippon Carbide Co., Ltd.) was coated on a silicone separator (a 50 µm thick SP-PET05 made by Tokyo Cellophane Paper Co., Ltd.) at a dry thickness of 20 µm. Then, the partially corona treated OPP film was laminated on the adhesive layer.

Preparation of Partially Corona Treated Surface Protective Film/Second Adhesive Layer/Volume Hologram Layer/Color Tuning Film Layer/PET Film The silicone separator was removed from the surface protective film/silicone separator obtained as mentioned above while the 50 µm thick PET film was removed from the hologram-recorded layer obtained as mentioned above. Then, lamination was carried out to obtain a partially corona treated surface protective film/second adhesive layer/volume hologram layer/color tuning film layer/PET film (25 µm) multilayered structure.

Preparation of Silicone Separator A/First Adhesive Layer/Silicone Separator B

An acrylic adhesive agent (Nissetsu PE-118 made by Nippon Carbide Co., Ltd.) was coated on a silicone separator A (a 50 µm thick SP-PET05 made by Tokyo Cellophane Paper Co., Ltd.) at a dry thickness of 20 µm.
A silicone separator B (a 50 µm thick SP-PET02 made by Tokyo Cellophane Paper Co., Ltd.) subjected to a release treatment on both surfaces was laminated on the adhesive layer to obtain a silicone separator A/first adhesive layer/silicone separator B.

Preparation of Mutlilayered Volume Hologram Structure-Making Label

The color tuning film layer/PET film (25 µm) was removed from the surface protective film/second adhesive layer/volume hologram layer/color tuning film layer/PET film (25 µm) obtained as mentioned above while the silicone separator A was removed from the silicone separator A/first adhesive layer/silicone separator B obtained as mentioned above. Then, lamination was carried out to obtain a partially corona treated surface protective film/second adhesive layer/volume hologram layer/patterned layer/first adhesive layer/silicone separator B.

This multilayered volume hologram structure-making label was used as in illustrative example 16 to obtain a multilayered volume hologram structure. The hologram label was forcibly stripped from the paper substrate as in illustrative example 16. The hologram in the volume hologram layer broke down because of a large adhesion strength difference between the corona treated region and the untreated region. It was thus absolutely impossible to reuse the volume hologram layer.

Illustrative Example 20

Preparation of Hologram-Recorded Layer

A Lippmann hologram was recorded on a hologram recording film obtained by laminating a hydroxyl group-containing hologram recording material layer (of 20 µm in thickness; a product made by Du Pont) and an ethylene-vinyl alcohol copolymer film (EVOH film) laminated on a polyethylene terephthalate film (PET film) in the described order. The hologram recording film was patterned by irradiating and heating the EVOH film with far infrared radiation using a mask. Further, the hologram recording film was uniformly irradiated all over the surface with ultraviolet radiation to obtain a surface protective film/patterned layer/volume hologram layer/PET film multilayer structure, with a partial adhesive force difference between the surface protective film and the volume hologram layer.
At the heated positions, the interaction due to hydrogen bonds between the EVOH film and the hologram recording material is increased so that the adhesion therebetween can be enhanced. As a result, there is obtained a multilayered structure comprising a surface protective film, a hologram layer in partial contact with the surface protective film and a PET film, with a partial adhesion strength difference between the surface protective film and the hologram layer.

Preparation of Silicone Separator A/First Adhesive Layer/Silicone Separator B

An acrylic adhesive agent (Nissetsu PE-118 made by Nippon Carbide Co., Ltd.) was coated on a silicone separator A (a 50 µm thick SP-PET05 made by Tokyo Cellophane Paper Co., Ltd.) at a dry thickness of 20 µm.
A silicone separator B (a 50 µm thick SP-PETB2 made by Tokyo Cellophane Paper Co., Ltd.) subjected to a release treatment on both surfaces was laminated on the adhesive layer to obtain a silicone separator A/first adhesive layer/silicone separator B.

Preparation of Multilayered Volume Hologram Structure-Making Label

The PET film (25 µm) was removed from the partial contact surface protective film/volume hologram layer/PET film (25 µm) obtained as mentioned above while the silicone separator A was removed from the silicone separator A/first adhesive layer/silicone separator B obtained as mentioned above.

Then, lamination was carried out to obtain a partial contact surface protective film/volume hologram layer/first adhesive layer/silicone separator B.

This multilayered volume hologram structure-making label was used as in illustrative example 16 to obtain a multilayered volume hologram structure. The hologram label was forcibly stripped from the paper substrate as in illustrative example 16. The hologram in the volume hologram layer broke down because of a large adhesion strength variation between the sites subjected to the partial contact treatment and the sites not subjected. It was thus absolutely impossible to reuse the volume hologram layer.

APPLICABILITY OF THE INVENTION TO INDUSTRY

The present invention is to determine whether or not a volume hologram image bonded to an ID card or other certificate with a photograph and a personal information area pasted thereof has broke down, thereby preventing falsification of the ID card. When the volume hologram layer is forcibly stripped off for the purpose of making a photograph replacement or falsifying the personal information area, the volume hologram layer can break down certainly. This makes it possible to provide a multilayered volume hologram structure according to which a photograph replacement or falsification of an information area is absolutely impossible, and a label for making the same.

What we claim is:

1. A multilayered volume hologram structure, characterized by comprising a substrate for a certificate or the like, and a first adhesive layer, a volume hologram layer and a surface protective film laminated on said substrate in the described order, wherein said surface protective film is on a viewing side of the multilayered volume hologram structure, and said volume hologram layer has been recorded in a hologram recording material layer comprising a matrix polymer, a photopolymerizable compound, a photopolymerization initiator and a sensitizing dye, wherein said volume hologram layer and said surface protective film are directly laminated on each other and comprise patterned areas of increased or decreased mutual adhesion therebetween, so that upon an intentional release of a multilayer structure from said substrate, said volume hologram layer is broken or elongated while said volume hologram layer is separated into a portion adhering to a substrate side and a portion adhering to a surface protective film side, wherein said volume hologram layer and said surface protective film are laminated on each other in absence of a layer therebetween.

2. A label used for making a multilayered volume hologram structure as recited in claim 1, characterized by comprising a release paper, and a first adhesive layer, a volume hologram layer and a surface protective film laminated on said substrate in the described order, wherein said volume hologram layer has been recorded in a hologram recording material layer comprising a matrix polymer, a photopolymerizable compound, a photopolymerization initiator and a sensitizing dye, and wherein said volume hologram layer and said surface protective film are directly laminated on each other and irradiated with ultraviolet radiation or heated in a patterned state thereby letting both have mutual adhesion or letting adhesion of both decrease, said label being pasted on a substrate for a certificate or the like upon a release of said release paper therefrom.

* * * * *